Dec. 2, 1969  J. T. DENNIS  3,481,608
RECORD CHANGER
Original Filed Jan. 15, 1954  15 Sheets-Sheet 1
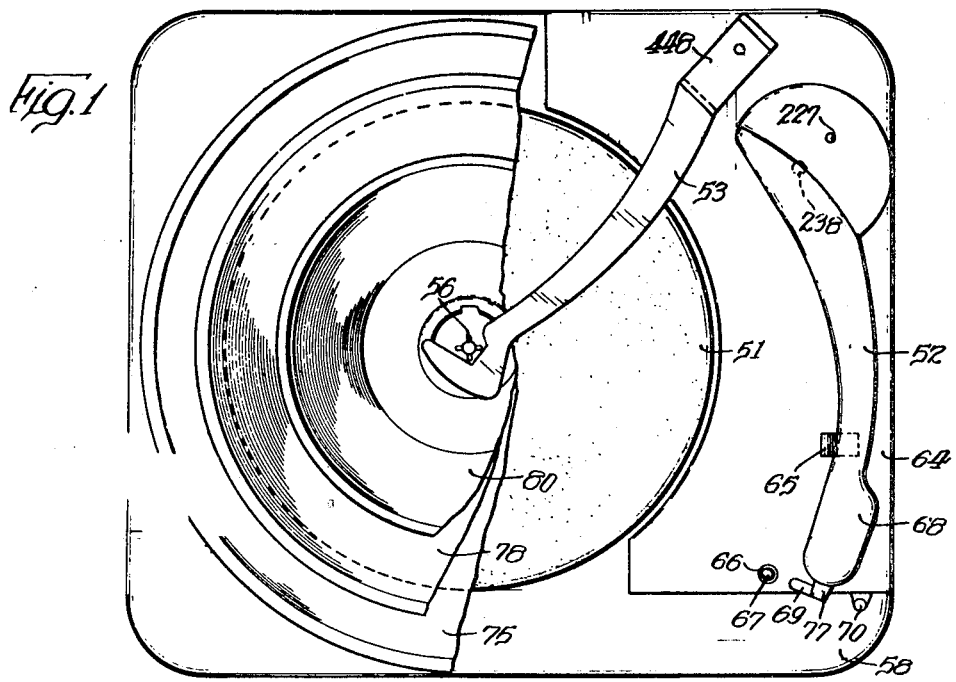
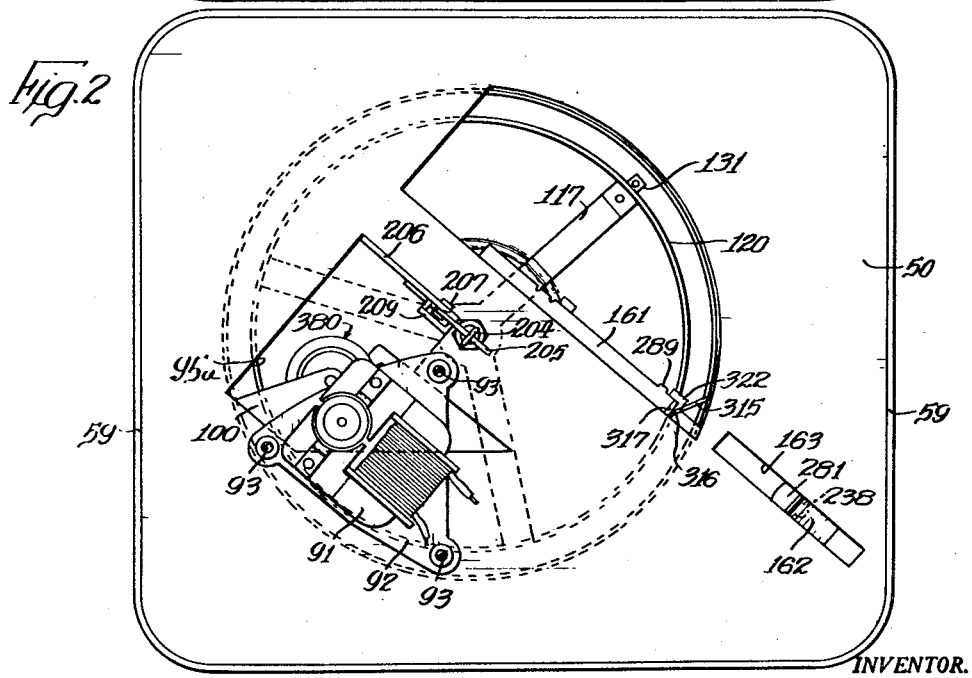
INVENTOR.
James T. Dennis
BY Mason, Kolehmainen,
Rathburn & Wyss
Attys INVENTOR.
James T. Dennis Dec. 2, 1969  J. T. DENNIS  3,481,608
RECORD CHANGER
Original Filed Jan. 15, 1954  15 Sheets-Sheet 3
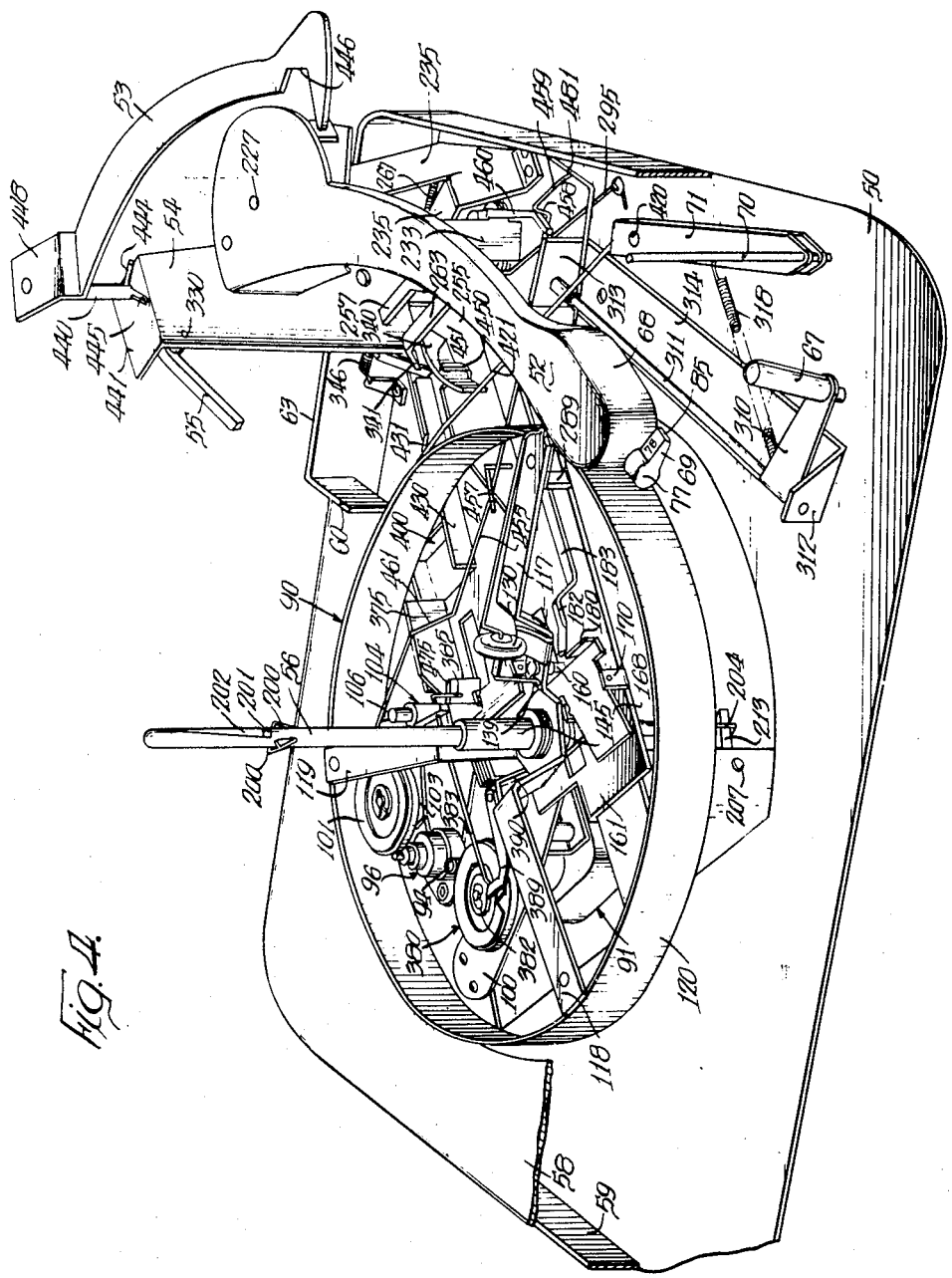
INVENTOR.
James T. Dennis
BY Mason, Kolehmainen,
Rathburn & Wyss
Attys.

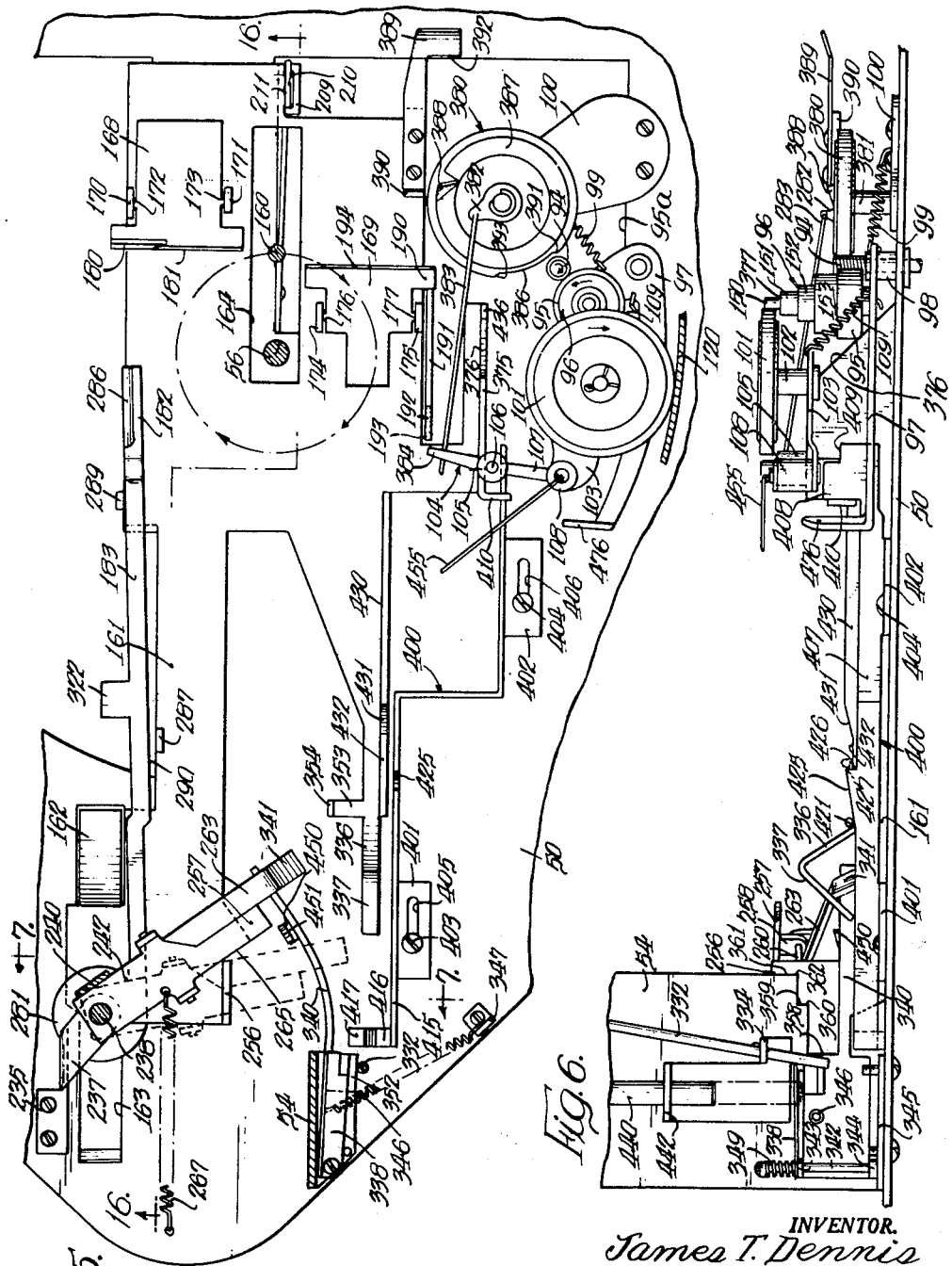

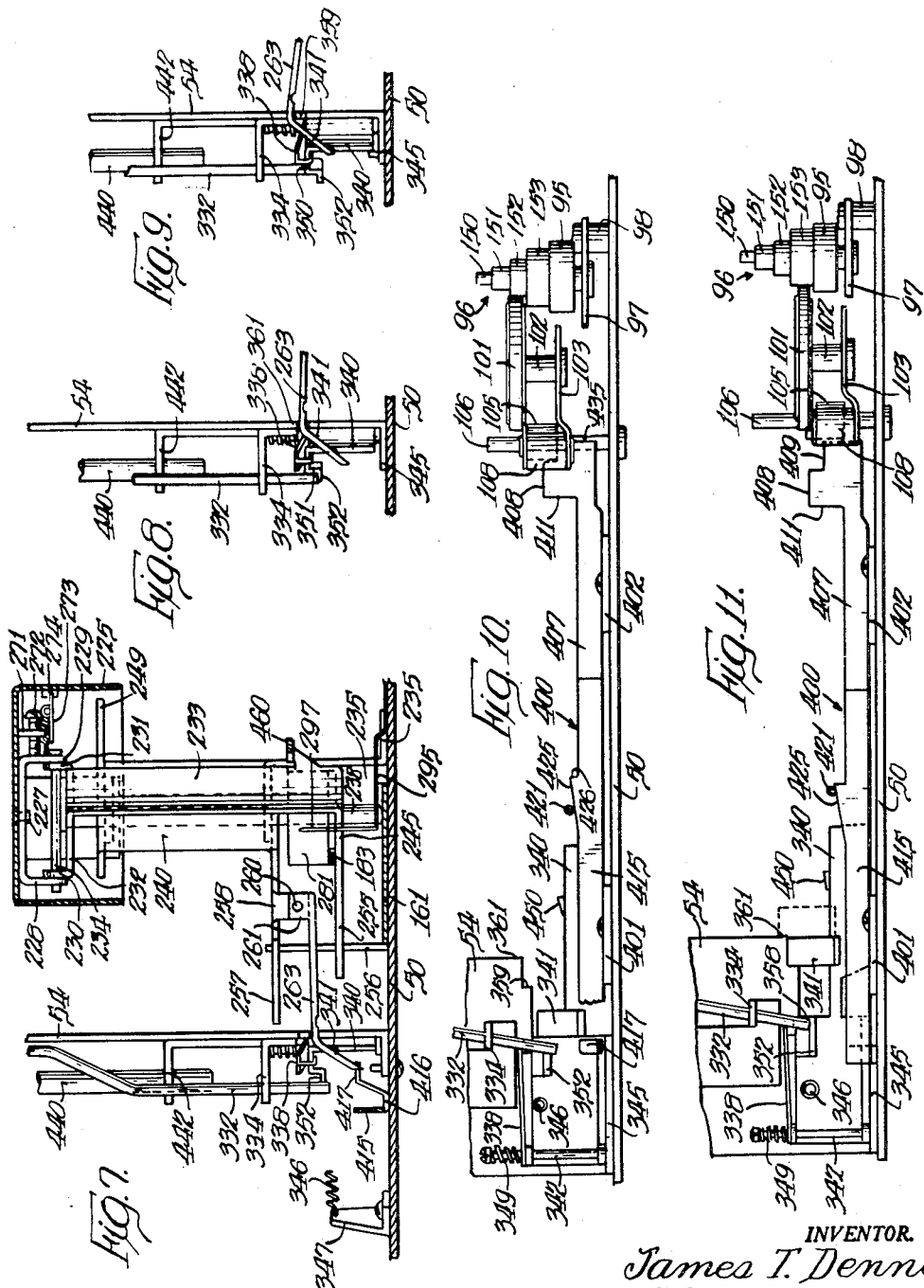

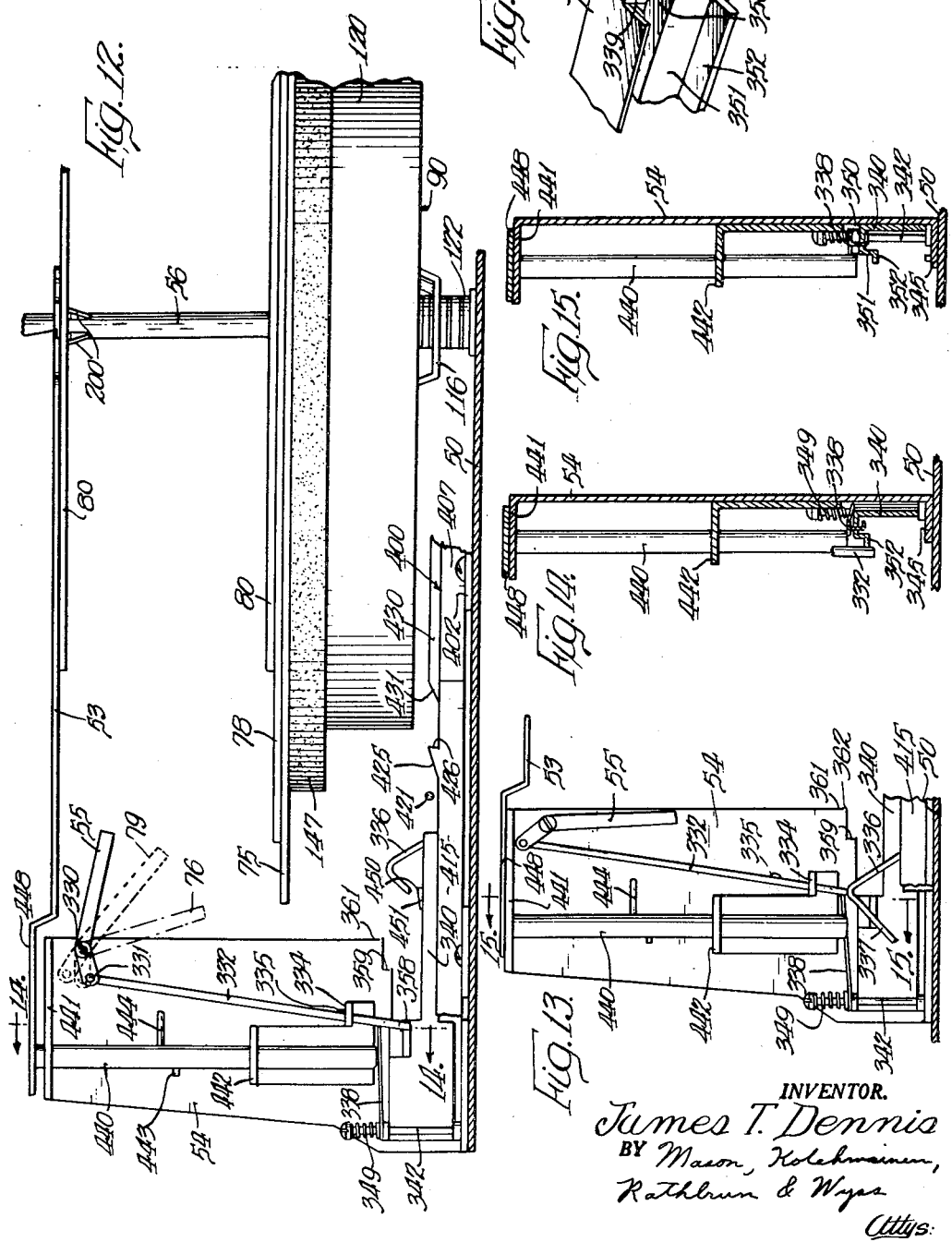

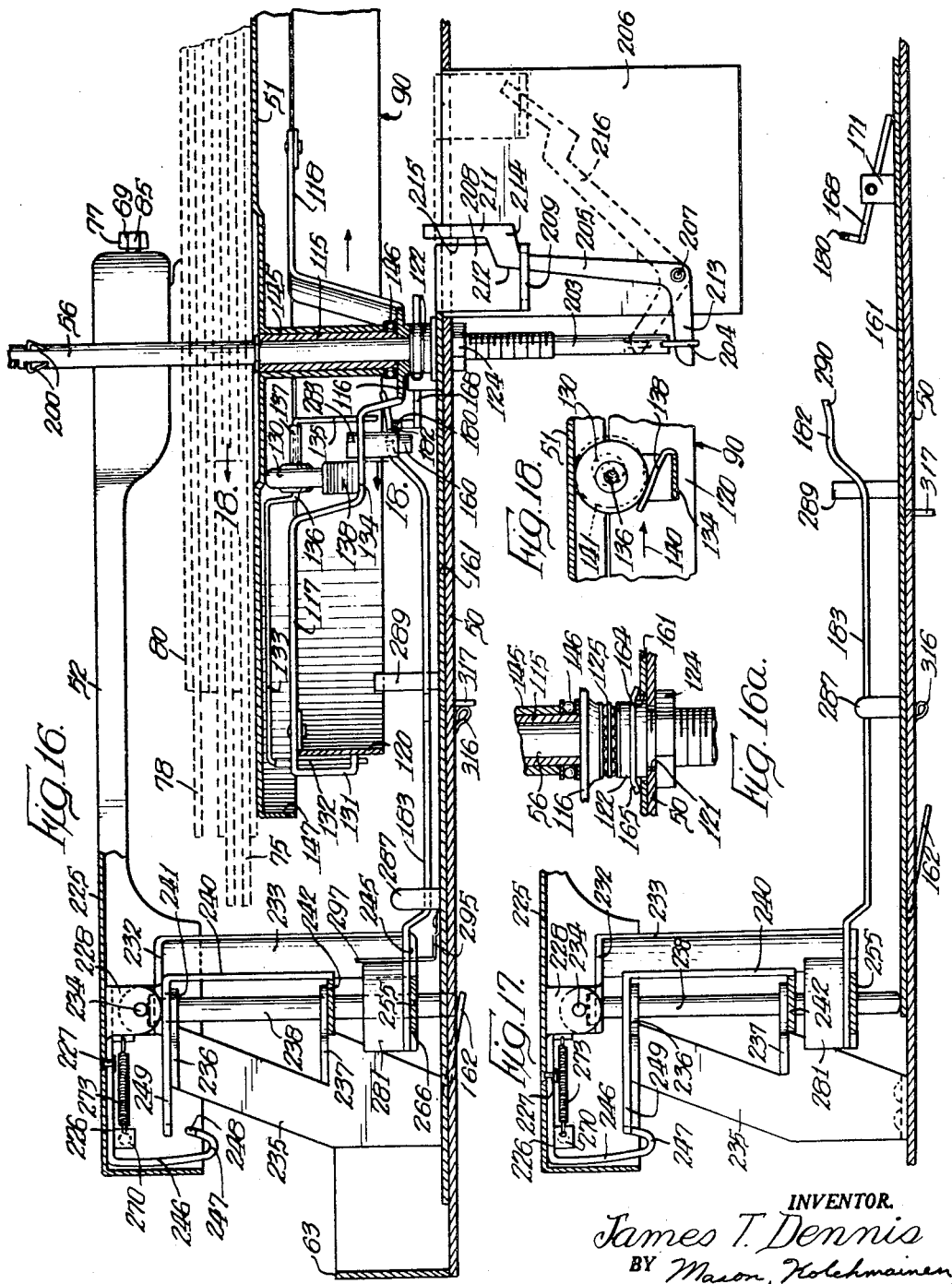

Dec. 2, 1969  J. T. DENNIS  3,481,608
RECORD CHANGER
Original Filed Jan. 15, 1954  15 Sheets-Sheet 8
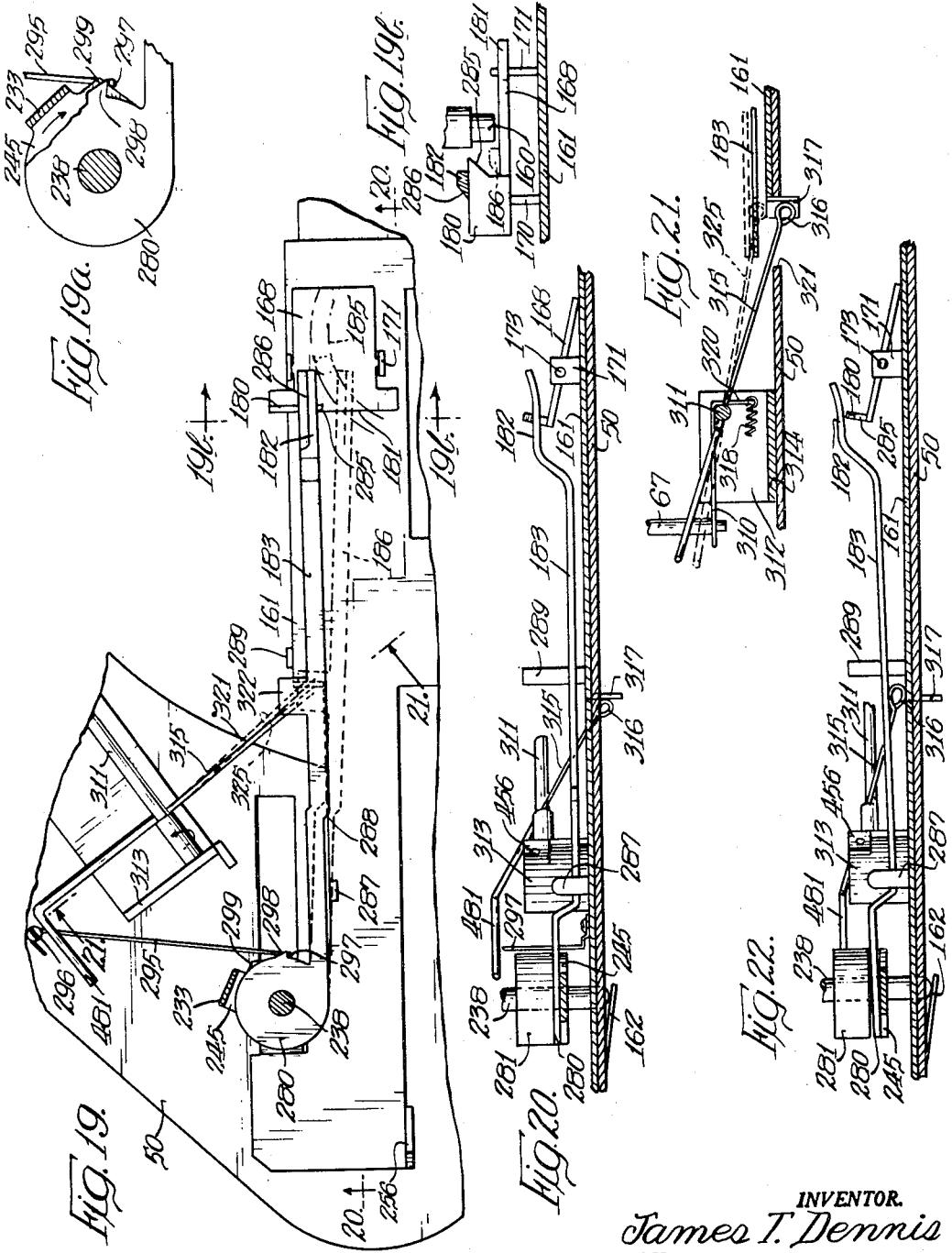
INVENTOR.
James T. Dennis
BY Mason, Kolehmainen,
Rathburn & Wyss
Attys.

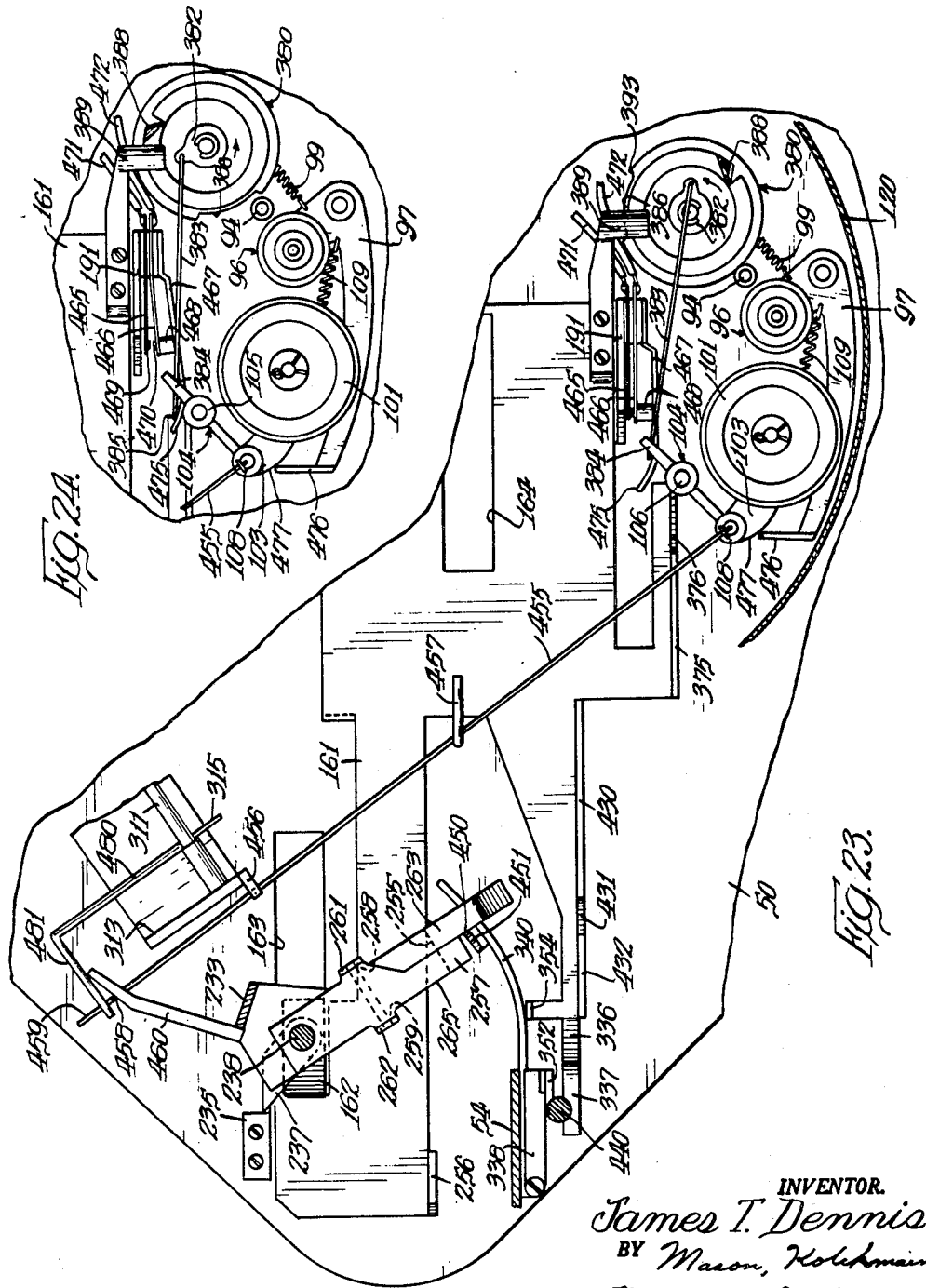

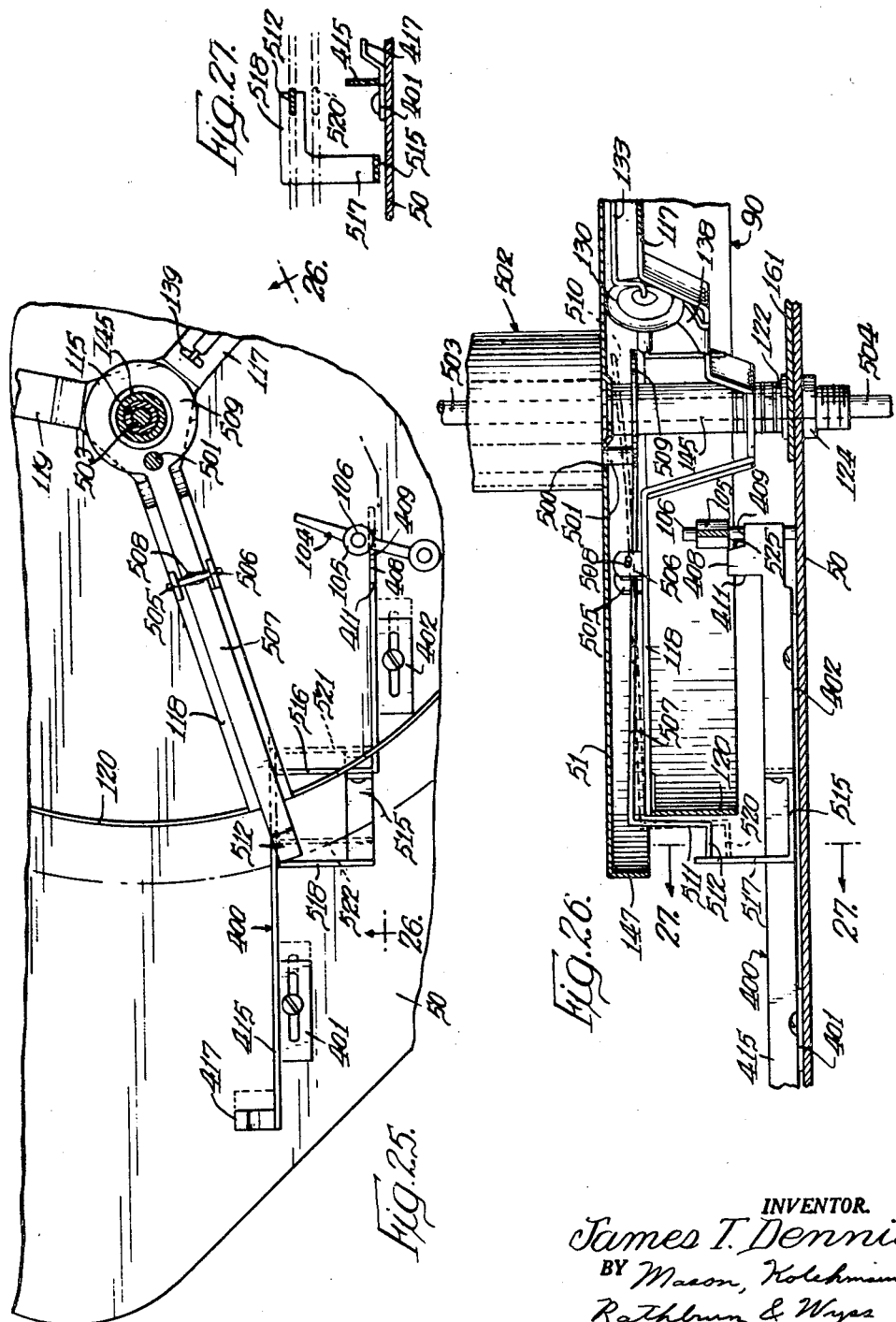

Dec. 2, 1969   J. T. DENNIS   3,481,608
RECORD CHANGER
Original Filed Jan. 15, 1954   15 Sheets-Sheet 11
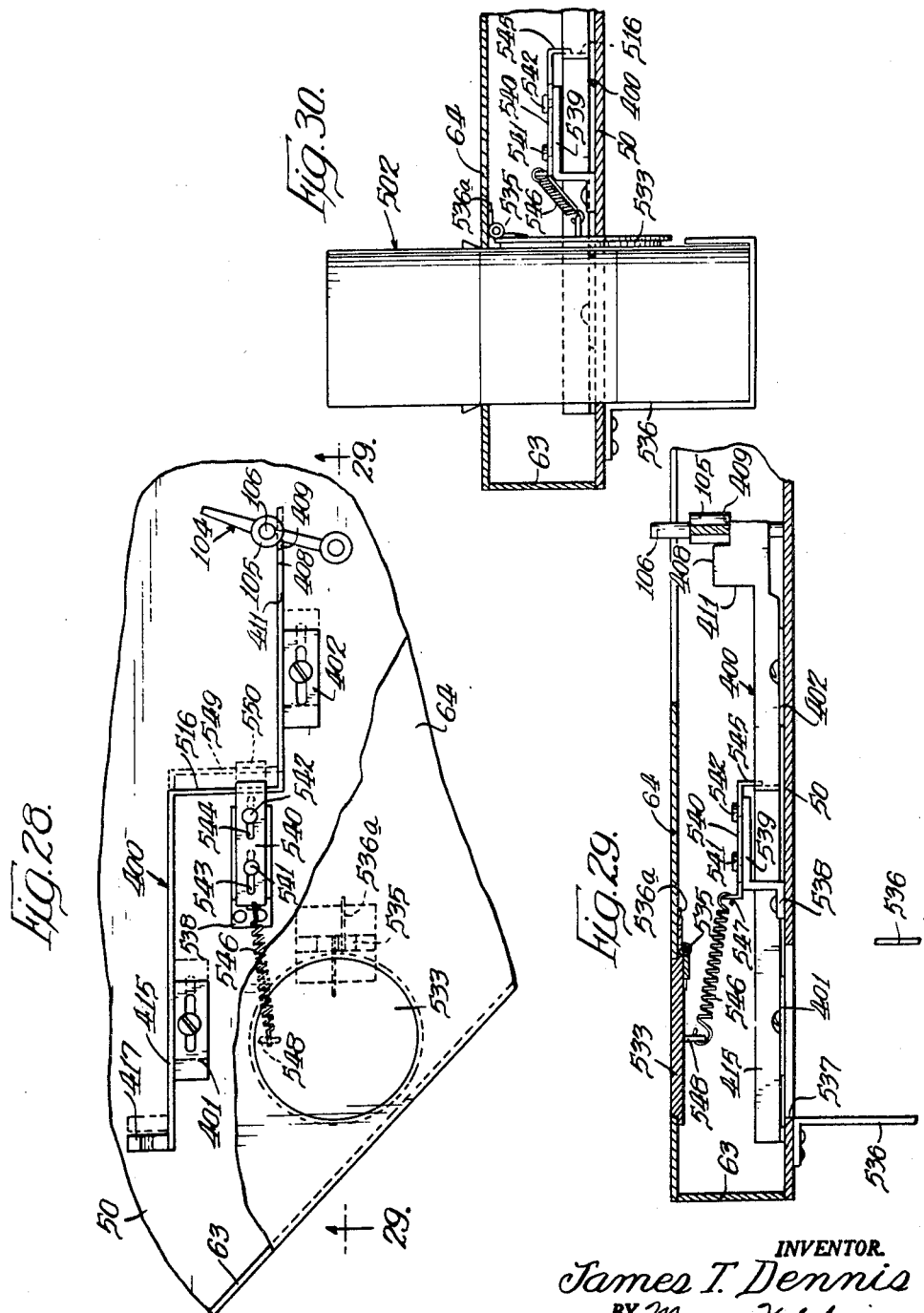
INVENTOR.
James T. Dennis
BY Mason, Kolehmainen,
Rathburn & Wyss
Attys Dec. 2, 1969  J. T. DENNIS  3,481,608
RECORD CHANGER
Original Filed Jan. 15, 1954  15 Sheets-Sheet 12
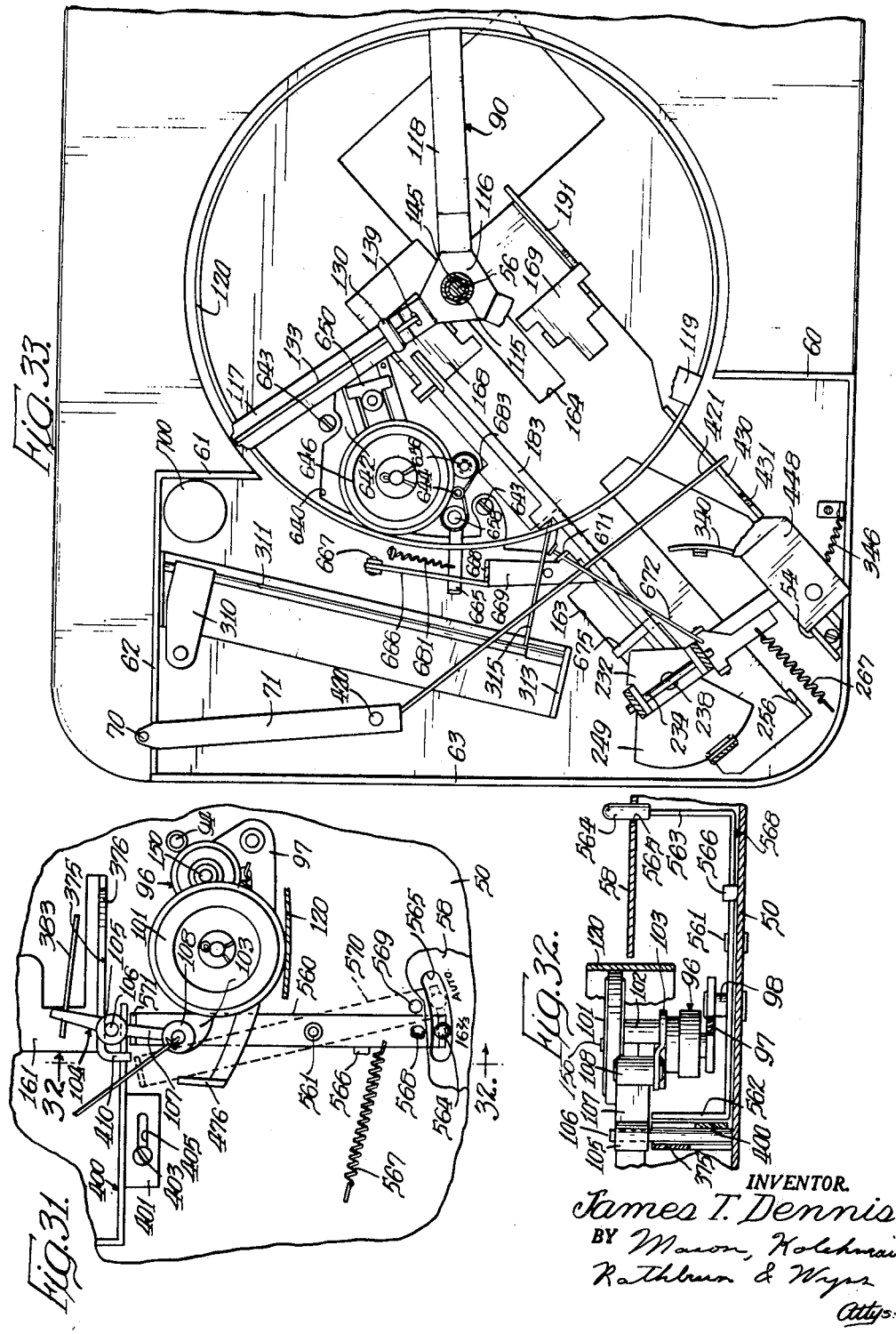
INVENTOR.
James T. Dennis
BY Mason, Kolehmainen,
Rathburn & Wyss
Attys.

Dec. 2, 1969  J. T. DENNIS  3,481,608
RECORD CHANGER
Original Filed Jan. 15, 1954  15 Sheets-Sheet 13
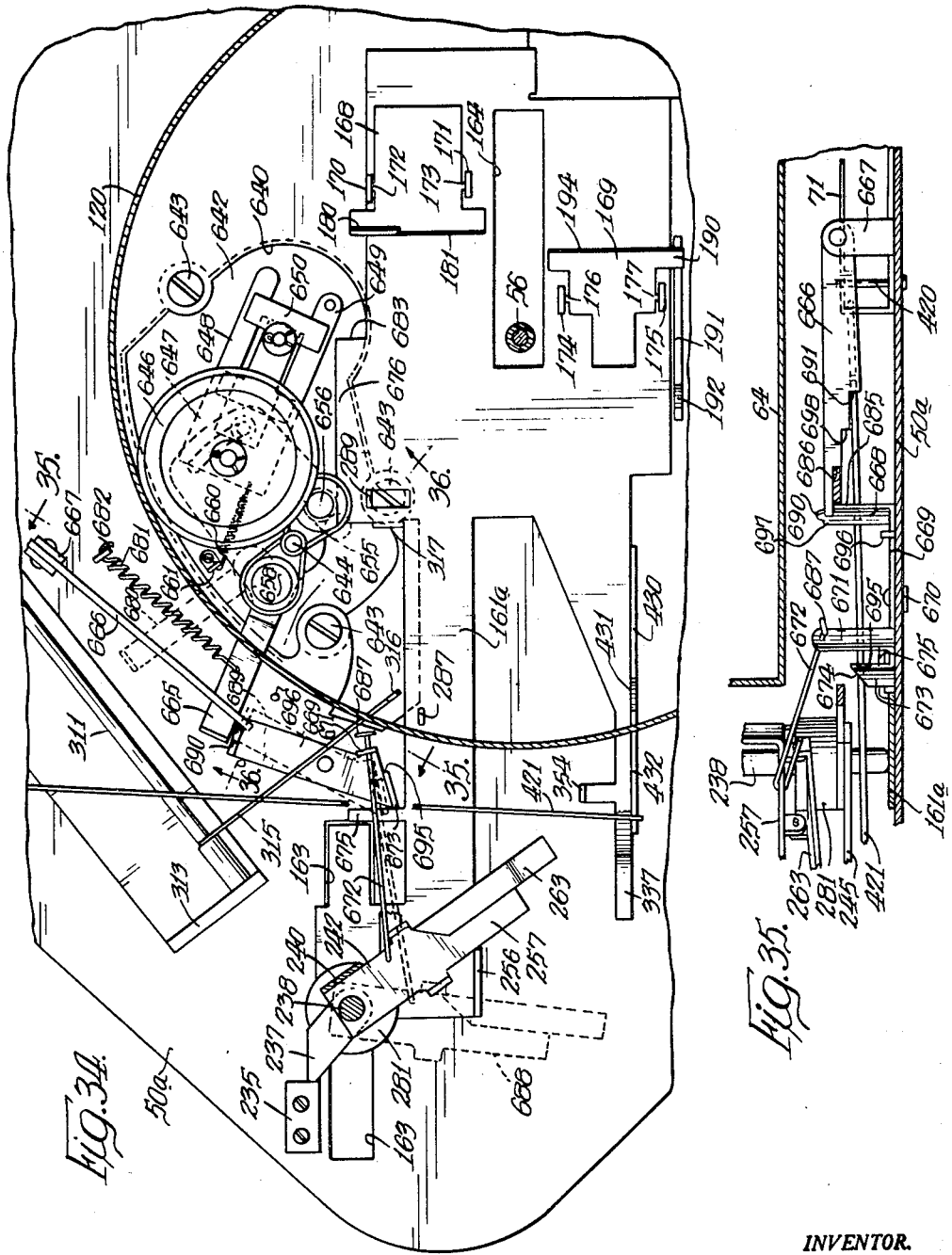
INVENTOR.
James T. Dennis
BY Mason, Kolehmainen,
Rathburn & Wyss
Attys

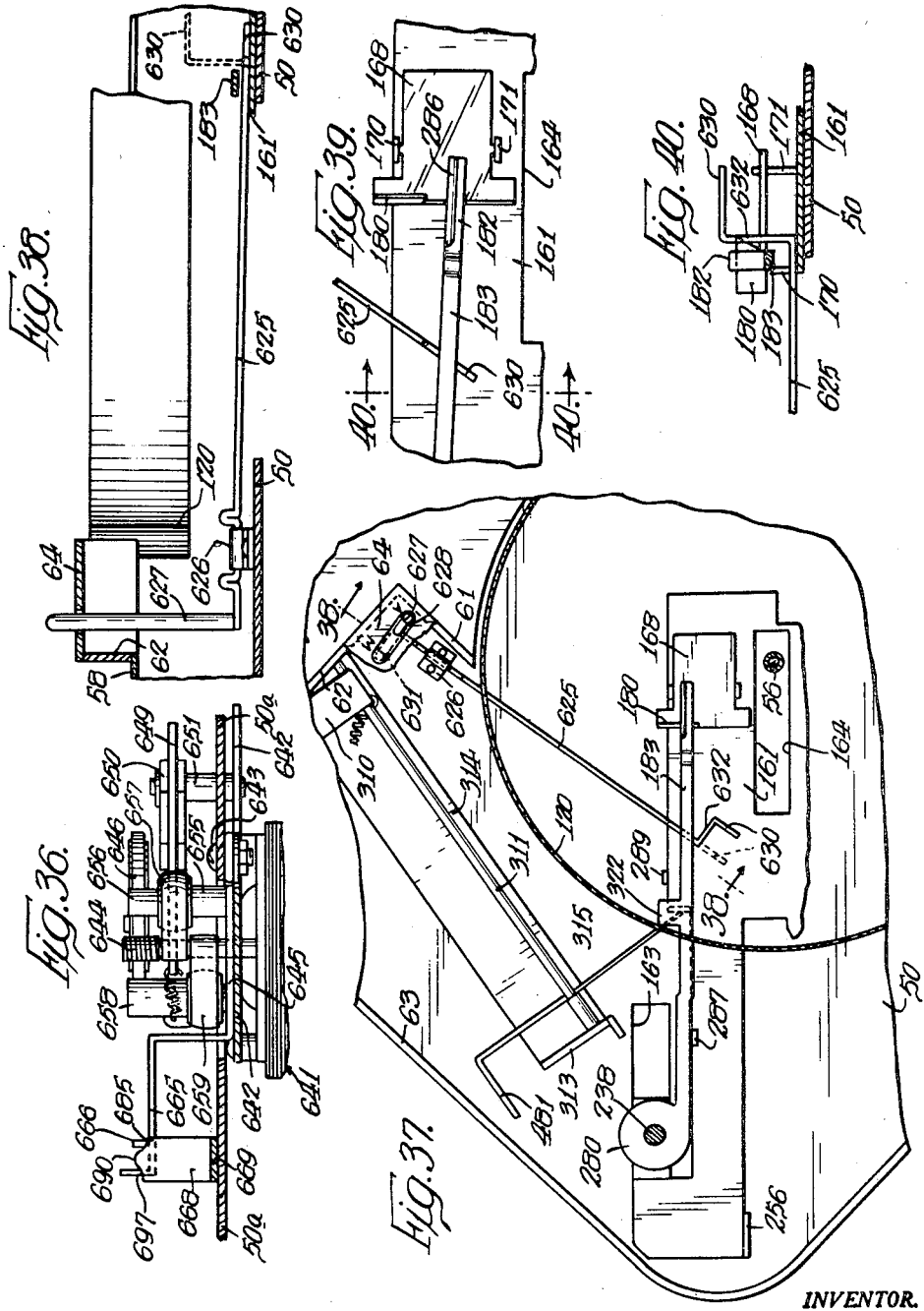

Dec. 2, 1969        J. T. DENNIS        3,481,608
                    RECORD CHANGER
Original Filed Jan. 15, 1954                    15 Sheets-Sheet 15
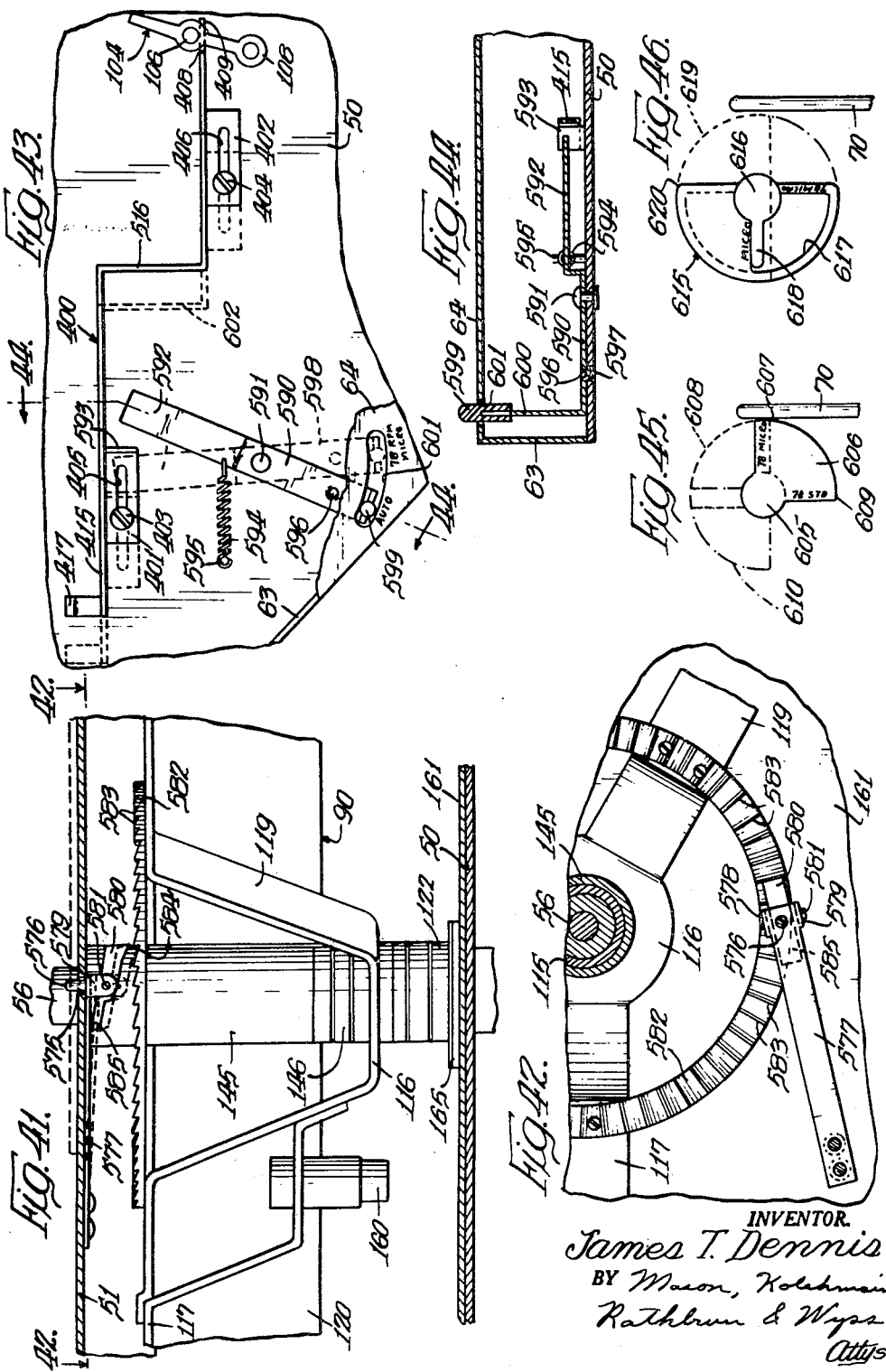

United States Patent Office 3,481,608
Patented Dec. 2, 1969

3,481,608
RECORD CHANGER
James T. Dennis, 812 American National Bldg.,
Oklahoma City, Okla. 73102
Application Jan. 15, 1954, Ser. No. 404,191, now Patent
No. 2,956,830, dated Oct. 18, 1960, which is a division
of application Ser. No. 50,768, Aug. 17, 1960, now
Patent No. 3,232,624, dated Feb. 1, 1966, which in turn
is a division of application Ser. No. 518,567, Jan. 4,
1966, now Patent No. 3,332,689, dated July 25, 1967.
Divided and this application July 7, 1967, Ser. No.
651,839
Int. Cl. G11b 15/44, 17/08
U.S. Cl. 274—10                               4 Claims

ABSTRACT OF THE DISCLOSURE

An automatic record changer in which two different sized stylii are provided on the tone arm for playing records having two different groove sizes which are to be played at two different speeds. When a particular stylus is in playing position, movement of the tone arm during the record changing cycle is employed to control the turntable speed during the next playing cycle so that the turntable is rotated at the current speed to play records corresponding to the particular stylus selected.

---

The present invention is a division of my copending application Ser. No. 518,567, now Patent No. 3,332,689, said application Ser. No. 518,567 being a division of application Ser. No. 50,768, now Patent No. 3,232,624, said application Ser. No. 50,768 being a division of my application Ser. No. 404,191, filed Jan. 15, 1954, now issued as U.S. Patent No. 2,956,830.

The present invention relates to automatic phonograph apparatus, and, more particularly, to a new and improved automatic record changer for phonograph apparatus.

In the present state of the phonograph art there are a number of different types of phonograph records on the market of different sizes and having different playing speeds. However, due to recent developments in this field certain types of records have been discontinued so that it may be generally stated that at a playing speed of 33⅓ r.p.m., 10-inch and 12-inch records are presently available with standard centering apertures; at a playing speed of 45 r.p.m., 7-inch records are available, with either an enlarged centering aperture in which case inserts may be used to adapt these records for a standard centering spindle or a standard centering aperture is provided directly; and at a playing speed of 78 r.p.m., 10- and 12-inch records are generally available with standard centering apertures and 7-inch children's records with standard centering apertures are also available. The phonograph art has also become sufficiently standardized so that it may be stated that the conventional transducer arrangements incorporate two sizes of needles, a one mil needle being used to play 33⅓ r.p.m. records and 45 r.p.m. records and a 3 mil needle being used for 78 r.p.m. records.

Since many selections are not available in each type of record, records of different types are soon collected and automatic record changers must be provided that are capable of playing records of all different sizes and speeds. However, most, if not all of the present day record changers are automatic only in the sense that they automatically deposit records on the turntable of the record changer and position the tone arm for playing the new records and include no facilities for changing the speed of the turntable automatically. As a result, it is impossible with present day phonograph apparatus to play records of the various commercial types in intermixed sequence without making certain manual adjustments such as adjustment for the speed of the turntable, etc., between each record which, of course, removes most of the advantages of automatic operation. In my application Ser. No. 319,975, filed Nov. 12, 1952, which issued June 7, 1960 as United States Letters Patent No. 2,939,714, a fully automatic record changer is shown and described in detail which is adapted automatically to play records of all different sizes and playing speeds in intermixed sequence. While this arrangement is entirely suitable for its intended purpose, it does require the modification of the phonograph records themselves so that they function properly with the automatic speed changing apparatus. It would be desirable to provide an automatic record changer wherein records of different playing speeds may be played in intermixed sequence without modification or adaptation of the phonograph records themselves so that all standard phonograph records may be played on the machine.

Also, while present day phonographs have become standardized to the extent indicated above, there is a definite possibility that 45 r.p.m. records will be put on the market in both 10-inch and 12-inch sizes so that it would also be desirable to provide an automatic record changer which will function automatically with present day phonograph records and 45 r.p.m., 10-inch and 12-inch records. Furthermore, a small quantity of 16⅔ r.p.m. records have been issued, primarily for extended recitations of passages from the Bible, and the like. It is also possible that 78 r.p.m. microgroove records may be put on the market which would require the same one mil needle as the present day 33⅓ r.p.m. and 45 r.p.m. records. It will, therefore, be evident that under present conditions an automatic record changer must be extremely flexible in its operation in order to play existing and contemplated records of all types in a fully automatic manner.

Accordingly, it is an object of the present invention to provide a new and improved automatic record changer wherein the turntable speed is automatically adjusted in accordance with the size of the needle which is selected to engage a record on the turntable.

It is another object of the present invention to provide a new and improved automatic record changer whereby standard phonograph records can be played and the turntable speed is automatically adjusted in accordance with the size of the record being deposited on the turntable.

It is a further object of the present invention to provide a new and improved automatic record changer wherein the turntable speed is automatically adjusted in accordance with the size of the record deposited on the turntable and the size of the needle which is selected to engage a record on the turntable.

It is a still further object of the present invention to provide a new and improved automatic record changer wherein the turntable speed is automatically adjusted in accordance with the diameter of the centering aperture of a selected group of records.

It is another object of the present invention to provide a new and improved automatic record changer wherein records of two different playing speeds may be played in intermixed sequence and the turntable speed is automatically adjusted in accordance with the size of the record and the size of the selected needle.

It is still another object of the present invention to provide a new and improved automatic record changer wherein the turntable speed is mechanically adjusted to conform to the playing speed of the topmost record on the turntable while permitting records of different playing speeds to be played in intermixed sequence.

Another object of the present invention resides in the provision of an automatic record changer wherein a group of 33⅓ r.p.m., 10-inch and 12-inch records and 45 r.p.m., 7-inch records may be played intermixed and a group of 78 r.p.m., 7-inch, 10-inch and 12-inch records may be played intermixed while requiring the operator to select only the desired size of needle and initiate playing of either intermixed group.

A further object of the invention resides in the provision of an automatic record changer wherein the turntable speed is automatically adjusted in accordance with the size of the selected phonograph needle so that the operator is informed by the pitch of the reproduced sound when the size of the selected needle is not the same as the groove size of the selected record and damage to needles and records is avoided.

In order to obviate the necessity of providing inserts for large centering aperture 45 r.p.m. records, a 45-r.p.m. slip-on spindle has been developed which is slipped over the standard centering spindle and positioned on the turntable so that large centering aperture 45 r.p.m. records may be supported on the slip-on spindle and released to the turntable during successive record changing cycles. Since it is entirely possible that 45 r.p.m. records may be put on the market in all three sizes and it is reasonable to expect that these 45 r.p.m. records will have large centering apertures, it would be desirable to provide an automatic record changer which is capable of playing existing records in the fully automatic manner described above and which is also capable of playing all three sizes of large centering aperture 45 r.p.m. records. It would also be desirable to provide an automatic record changer of this type wherein the speed of the turntable is automatically adjusted to 45 r.p.m. whenever a 45 r.p.m. slip-on spindle is positioned on the turntable so that the operator does not have to perform a speed selecting operation at the same time.

It is, therefore, another object of the present invention to provide a new and improved automatic record changer which is adapted to play available phonograph records in intermixed sequence and may be readily adapted to play large centering aperture 45 r.p.m. records of all sizes in intermixed sequence.

Another object of the present invention resides in the provision of a new and improved automatic record changer wherein the turntable speed is automatically adjusted to 45 r.p.m. upon the selection of a slip-on spindle suitable for playing large centering aperture 45 r.p.m. records.

A further object of the present invention resides in the provision of a new and improved automatic record changer wherein the turntable speed is automatically adjusted to 45 r.p.m. when a large centering aperture adapter member is positioned on the turntable.

A still further object of the present invention resides in the provision of a new and improved automatic record changer wherein the duration of each changing cycle is the same regardless of the playing speed of the record and the speed of the turntable is automatically adjusted to the playing speed of the top record on the turntable at substantially the end of each record changing cycle.

It is another object of the present invention to provide a new and improved automatic record changer wherein the turntable speed is mechanically adjusted in accordance with the playing speed of the top record on the turntable while continuously applying power to the changing mechanism during the entire record changing cycle.

In the phonograph field, high fidelity equipment is becoming increasingly important and increasing emphasis is placed upon high fidelity transducers which require a very low needle pressure. On the other hand, the trip mechanism of most of the conventional record changers on the market today is of the velocity trip type wherein the increased velocity of the tone arm when it encounters the run-out groove of the record is employed to actuate the trip mechanism. These trip mechanisms place such a large frictional load on the tone arm that they will not function properly with low needle pressure tone arm arrangements. This is particularly true in the case of extended play 45 r.p.m. records in which the playing portion of the record is increased to a maximum and the run-out groove lasts for only a single revolution of the record so that the velocity trip mechanism must function with only a very brief increase in the velocity of the tone arm.

Accordingly, it is another object of the present invention to provide a new and improved automatic record changer wherein an automatic tripping mechanism is provided which will function with extremely low needle pressure.

It is a further object of the present invention to provide a new and improved automatic tripping mechanism of the velocity type which is extremely simple and economical in construction and which may be readily adjusted to vary the tone arm velocity required to actuate the tripping mechanism.

Another object of the present invention resides in the provision of a new and improved velocity trip mechanism for an automatic reocrd changer in which the frictional loading of the trip mechanism is extremely small so that positive tripping action is provided for very brief increases in tone arm velocity and with very low needle pressures.

In conventional automatic record changers, the tone arm mounting is so arranged that the tone arm is not released until the end of the record changing cycle even though the tone arm is positioned on the record a substantial period before the record changing cycle ends. In such changers, if a large stack of records is positioned on the turntable, the tone arm is held over the lead-in groove of the uppermost record until the record changing cycle is completed and is prevented from moving inwardly as the stylus engages the record groove so that the stylus is twisted and the needle may become damaged thereby. Furthermore, the spring tension which is built up when the tone arm is held and the stylus is twisted, in many instances causes the tone arm to jump several grooves of the record when the tone arm is released at the end of the record changing cycle.

Accordingly, it is another object of the present invention to provide a new and improved record changer having a tone arm mounting arrangement in which the tone arm is released substantially immediately after the needle engages the phonograph record and independently of the number of records positioned on the turntable.

It is a further object of the present invention to provide a new and improved record changer having a tone arm mounting arrangement in which the tone arm is permitted to follow the record grooves immediately after the needle engages the record and independently of the end of the record changing cycle.

It is a still further object of the present invention to provide a new and improved tone arm mounting arrangement for an automatic record changer which may be economically manufactured and may be assembled with a minimum number of operations.

The invention, both as to its organization and method of operation, together with further objects and advantages thereof, will best be understood by reference to the following specification taken in connection with the accompanying drawings, in which:

FIG. 1 is a top plan view of an automatic record changer embodying the features of the present invention;

FIG. 2 is a bottom view of the record changer of FIG. 1;

FIG. 4 is a perspective view of the record changer of FIG. 1 shown with the turntable removed and the base plate of the changer partially exposed;

FIG. 5 is a fragmentary plan view of the record changer of FIG. 1, partly in section, and showing the cycling slide in substantially the mid-point of the changing cycle;

FIG. 6 is a fragmentary side elevational view of the portion of the record changer shown in FIG. 5;

FIG. 7 is a fragmentary side elevational view taken along the line 7—7 of FIG. 5;

FIG. 8 is a fragmentary side elevational view similar to FIG. 7 and showing the tone arm indexing cam in the ten inch position;

FIG. 9 is a fragmentary side elevational view similar to FIG. 7 and showing the tone arm indexing cam in the twelve inch position;

FIG. 10 is a fragmentary side elevational view similar to FIG. 6 and showing the driving mechanism in the 45 r.p.m. position;

FIG. 11 is a side elevational view similar to FIG. 10 and showing the drive mechanism in the 78 r.p.m. position;

FIG. 12 is a fragmentary side elevational view of the record changer of FIG. 3 taken along the line 12—12 thereof and with the turntable added;

FIG. 13 is a fragmentary side elevational view similar to FIG. 12 and showing the size indexing finger withdrawn;

FIG. 14 is a sectional view taken along the line 14—14 of FIG. 12 and showing the relative positions of the parts just after the record holddown arm is seated after the last record;

FIG. 15 is a sectional view taken along the line 15—15 of FIG. 13 and showing the tone arm indexing cam in the last record shut-off position;

FIG. 15a is a fragmentary perspective view of the shut-off spring used in the automatic shut-off mechanism shown in FIG. 13;

FIG. 16 is a sectional view taken along the lines 16—16 of FIG. 5;

FIG. 16a is a sectional view on a larger scale of the turntable and drive wheel mounting arrangement shown in FIG. 16;

FIG. 17 is a sectional side elevational view similar to FIG. 16 and showing the cycling slide in a different position;

FIG. 18 is a sectional view taken along the lines 18—18 of FIG. 16;

FIG. 19 is a fragmentary plan view of a portion of the record changer of FIG. 1 showing the operation of the trip arm and the delay mechanism therefor;

FIG. 19a is a fragmentary plan view on a somewhat larger scale of the delay trip mechanism shown in FIG. 19;

FIG. 19b is a sectional view taken along the line 19b—19b of FIG. 19;

FIG. 20 is a side elevational view taken along the line 20—20 of FIG. 19;

FIG. 21 is a sectional side elevational view taken along the line 21—21 of FIG. 19;

FIG. 22 is a sectional side elevational view similar to FIG. 20 and showing the tripping mechanism in a different position;

FIG. 23 is a fragmentary plan view of the record changer of FIG. 1 showing the details of the last record shut-off mechanism and neutral positioning mechanism;

FIG. 24 is a fragmentary plan view of a portion of FIG. 23 showing the shut-off mechanism in a different position;

FIG. 25 is a fragmentary plan view of an alternative embodiment of the present invention wherein automatic speed change is provided in conjunction with a 45 r.p.m. slip-on spindle;

FIG. 26 is a sectional side elevational view taken along the lines 26—26 of FIG. 25;

FIG. 27 is a sectional side elevational view taken along the line 27—27 of FIG. 26;

FIG. 28 is a fragmentary plan view of a further alternative embodiment of the present invention wherein automatic speed change is provided in conjunction with a 45 r.p.m. slip-on spindle receiving well;

FIG. 29 is a sectional side elevational view taken along the line 29—29 of FIG. 28;

FIG. 30 is a sectional side elevational view similar to FIG. 29 and showing a 45 r.p.m. slip-on spindle positioned within its receiving well;

FIG. 31 is a fragmentary plan view of an alternative embodiment of the invention wherein facilities are provided for playing 16⅔ r.p.m. records;

FIG. 32 is a sectional side elevational view taken along the line 32—32 of FIG. 31;

FIG. 33 is a top plan view of an alternative embodiment of the invention wherein a modified turntable drive and automatic speed changing mechanism is provided;

FIG. 34 is a fragmentary plan view of the embodiment shown in FIG. 33 on a somewhat larger scale;

FIG. 35 is a sectional side elevational view taken along the line 35—35 of FIG. 34;

FIG. 36 is a sectional side elevational view taken along the line 36—36 of FIG. 34;

FIG. 37 is a fragmentary plan view of an alternative embodiment of the invention wherein facilities for manual record playing are provided;

FIG. 38 is a sectional side elevational view taken along the line 38—38 of FIG. 37;

FIG. 39 is a fragmentary plan view of a portion of FIG. 37 and showing the manual control linkage in another position;

FIG. 40 is a sectional view taken along the line 40—40 of FIG. 39 and showing the trip mechanism in a different position;

FIG. 41 is a fragmentary sectional side elevational view of an alternative embodiment of the invention, taken along the center line of the spindle and showing an arrangement for disengaging the turntable from the drive mechanism except during periods when one or more records are positioned on the turntable;

FIG. 42 is a fragmentary sectional plan view taken along the line 42—42 of FIG. 41;

FIG. 43 is a fragmentary plan view of an alternative embodiment of the invention wherein facilities are provided for playing 78 r.p.m. microgroove records;

FIG. 44 is a sectional view taken along the line 44—44 of FIG. 43;

FIG. 45 is a somewhat diagrammatic side elevational view of an alternative 78 r.p.m. microgroove arrangement; and FIG. 46 is a somewhat diagrammatic side elevational view of another alternative 78 r.p.m. microgroove arrangement.

Figure 3:
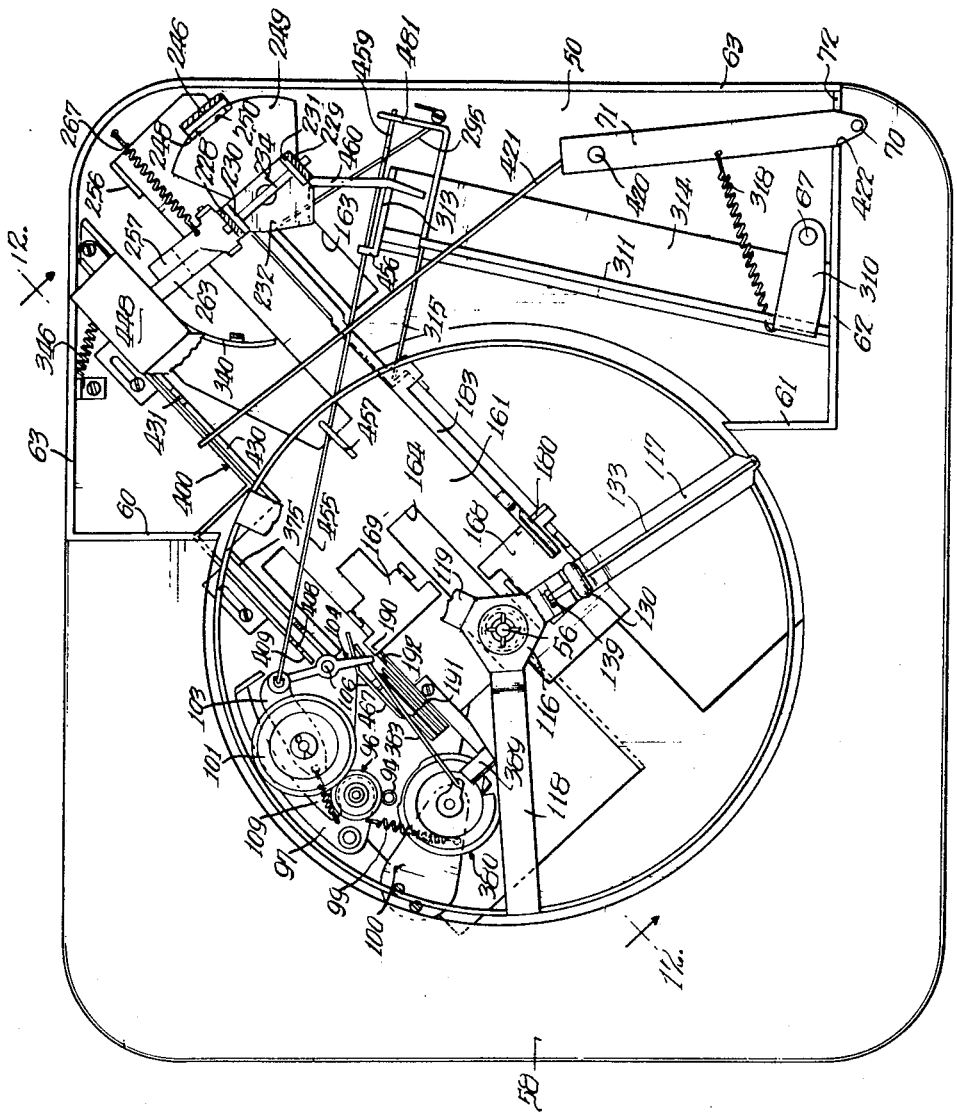
FIG. 3 is a top view of the record changer of FIG. 1 on a somewhat larger scale and shown with the turntable, tone arm and cover plate removed.

Referring now to the drawings, and more particularly to FIGS. 1 to 24, inclusive, thereof, the record changer of the present invention is therein illustrated as comprising a base member, indicated generally at 50, which supports the component parts of the record changer including a rotatable turntable 51, a tone arm 52, and a record hold-down arm 53, the arm 53 being mounted on a supporting member 54 which latter member also houses a size indexing finger 55. A centering spindle 56 is also supported on the base plate 50 and carries a stack of records in non-playing position which may be individually released to the turntable 51 during successive record changing cycles as will be described in more detail hereinafter. In the illustrated embodiment, the base plate 50 is enclosed by a cover member which includes the top plate 58 and sides 59, a raised portion including the side members 60, 61, 62 and 63, and the removable cover plate 64 being provided so that the components which are positioned on the base plate 50 are substantially completely enclosed. The cover plate 64 carries a tone arm rest post 65 on which the tone arm 52 is adapted to be positioned during non-playing intervals. The cover plate 64 is also provided with an opening 66 through which extends a depressible operate button 67, the button 67 comprising the sole operating control of the record changer. The tone arm 52 is provided with a head portion 68 within which is positioned a conventional two position cartridge (not shown) provided with a rotatable needle selecting arm 69 which projects from the front end of the tone arm 52 and may be adjusted manually to select needles of two different sizes, i.e., one mil and three mil needles, in accordance with the groove size of the records which are to be played. When the needle selecting arm 69 is in the position shown in FIG. 1 a one mil needle, which is suitable for playing 33⅓ r.p.m. and 45 r.p.m. records is positioned to engage the grooves of a record on the turntable 51, whereas when the needle selecting arm 69 is in the position shown in FIG. 4, a three mil needle which is suitable for playing 78 r.p.m. records is positioned to engage the grooves of a record on the turntable 51. In this connection it will be understood that suitable indicia are conventionally provided on the opposite sides of the needle selecting arm 69 so as to inform the operator which size of needle is positioned to engage the record. A xertically extending 78 r.p.m. speed indexing rod 70 is supported on the end of a bracket 71 which projects through an opening 72 in the side member 62 and extends upwardly to a point adjacent the needle selecting arm 69 when this arm is in the 78 r.p.m. needle selecting position.

Briefly, to consider the general mode of operation of the record changer described thus far, it is pointed out that the record changer of the present invention is adapted to play seven inch 45 r.p.m. records and ten inch and twelve inch 33⅓ r.p.m. records completely automatically and in intermixed sequence without any adaption of the records themselves, other than the provision of suitable adaptors for the spindle 56. Also, the record changer is adapted to play seven inch, ten inch and twelve inch 78 r.p.m. records completely automatically and in intermixed sequence without any adaptation of the records themselves and without any modification or adjustment of the machine other than the normal adjustment of the needle selecting arm 69 to the 78 r.p.m. needle position. Considering first the situation wherein a group of 33⅓ r.p.m. and 45 r.p.m. records are to be played in intermixed sequence, and assuming that the needle selecting arm 69 is in the corresponding needle position shown in FIG. 1, these records are positioned on the spindle 56 and the hold-down arm is positioned over the topmost record, after which the operator merely depresses the button 67 to initiate a completely automatic playing period during which the above mentioned sizes and speeds of records are played in intermixed sequence without further attention on the part of the operator.

When the button 67 is depressed the turntable 51 starts to rotate and the bottommost record of the stack supported on the spindle 56 is dropped to the turntable 51 after which the tone arm 52 is moved to the correct position over the edge of the record and lowered into engagement with the lead-in groove of the record. Assuming that a twelve inch 33⅓ r.p.m. record 75 (FIG. 1) is dropped to the turntable 51, as this record falls it strikes the size indexing arm 55 and moves it downwardly to the position shown in dotted lines at 76 in FIG. 12 with the result that the tone arm 52 is positioned in the run-in groove of the twelve inch record. At the end of the record changing cycle, the speed of the turntable 51 is automatically adjusted to 33⅓ r.p.m. by means to be described in more detail hereinafter so that the twelve inch 33⅓ r.p.m. record 75 is played at the correct speed. When the tone arm 52 reaches the run-out groove of the record 75 a new record changing cycle is initiated, the tone arm 52 is lifted off of the record and moved outwardly beyond the edge of the record, after which the next record in the stack supported on the spindle 56 is dropped to the turntable 51. In moving outwardly during the record changing cycle the tone arm 52 is controlled so that the hub 77 of the needle selecting arm 69 does not strike the 78 r.p.m. speed indexing rod 70 in the extreme outward position of the tone arm 52.

Assuming that a ten inch 33⅓ r.p.m. record 78 is next dropped to the turntable 51, this record strikes the size indexing arm 55 in dropping to the turntable so that the arm 55 is moved to the position shown in dotted lines at 79 in FIG. 12 and the tone arm 52 is positioned in the run-in groove of the ten inch record 78. At the end of this record changing cycle, the speed of the turntable 51 is automatically adjusted to 33⅓ r.p.m. so that the record 78 is playing at the correct playing speed. When the tone arm 52 has again moved into the run-out groove of the record 78, the next record changing cycle is initiated and the tone arm 52 is removed from the path of the record in the manner described above and the next record is dropped to the turntable, the tone arm 52 again being controlled so that the rod 70 is not moved thereby.

Assuming that a seven inch 45 r.p.m. record 80 is next dropped to the turntable 51, the size indexing arm 55 is not struck by this record and the tone arm 52 is controlled accordingly so that it is positioned in the run-in groove of the seven inch record 80. At the end of this record changing cycle, the speed of the turntable 51 is automatically adjusted to 45 r.p.m. so that the record 80 is played at the correct playing speed. The above described automatic speed change operation is effected on the basis of record size. When the needle selecting arm 69 is in the 33⅓ and 45 r.p.m. position, seven inch records are to be played at 45 r.p.m. and ten and twelve inch records are to be played at 33⅓ r.p.m. Since 33⅓ r.p.m. seven inch records have, for all practical purposes, passed out of existence, and all 45 r.p.m. records now on the market are of the seven inch size, it will be evident that the above described arrangement functions automatically to play all present day 33⅓ r.p.m. and 45 r.p.m. records completely automatically and without requiring any speed adjustment on the part of the operator.

If the operator desires to play 78 r.p.m. records, a group of these records of different sizes may be placed on the spindle 56 and the needle selecting arm 69 is adjusted to the 78 r.p.m. needle position shown in FIG. 4. When the tone arm 52 is positioned on the rest 65 the needle selecting arm 69 is positioned adjacent to but not touching the upper end of the 78 r.p.m. speed indexing rod 70. When the operate button 67 is depressed a record changing cycle is initiated and the first 78 r.p.m. record is dropped to the turntable 51. At substantially the midpoint of this record changing cycle, the tone arm 52 is moved outwardly beyond the rest position shown in FIG. 1 so that the end 85 of the needle selecting arm 69 strikes the upper end of the rod 70 and moves it outwardly. When the rod 70 is thus moved outwardly the record changing mechanism is controlled so that the speed of the turntable 51 is adjusted to 78 r.p.m. at substantially the end of the record changing cycle with the result that when the tone arm 52 is positioned in the run-in groove of the 78 r.p.m. record the turntable 51 is operating at the correct playing speed. In this connection it will be understood that the size indexing arm 55 functions in the manner described above to position the tone arm 52 in accordance with the size of the 78 r.p.m. records deposited on the turntable 51. Since the needle selecting arm 69 remains in the 78 r.p.m. needle position while all 78 r.p.m. records are played, it will be evident that the 78 r.p.m. speed indexing rod 70 is moved outwardly by the tone arm 52 during each record changing cycle so that the speed of the turntable 51 is automatically adjusted to 78 r.p.m. at the end of each record changing cycle.

If the operator now desires to play a stack of 33⅓ and 45 r.p.m. records he merely places these records in random sequence on the spindle 56 and turns the needle selecting arm 69 to the 33⅓ and 45 r.p.m. needle position and depresses the operate button 67 after which the record changer plays the 33⅓ r.p.m. and 45 r.p.m. records completely automatically in the manner described above with proper adjustment of the speed being automatically made for each record. As mentioned before, when the needle selecting arm 69 is in the 33⅓ and 45 r.p.m. needle position the hub 77 does not engage the rod 70 in the extreme outward position of the tone arm 52 so that the arm 70 is not moved when 33⅓ r.p.m. and 45 r.p.m. records are played. It will, therefore, be evident that the record changer of the present invention distinguishes bebetween 78 r.p.m. records and microgroove records, i.e., 33⅓ r.p.m. and 45 r.p.m. records, on the basis of the size of the selected needle and further distinguishes between 33⅓ r.p.m. records and 45 r.p.m. records on the basis of record size so that all records may be played completely automatically and without an separate speed adjustments on the part of the operator. It will also be noted that the record changer of the present invention is so constructed and arranged that the operator is immediately informed by the pitch of the reproduced sound if the wrong needle size has been selected for a given record. Thus, if the needle selecting arm 69 is inadvertently left in the 78 r.p.m. needle position and either a 33⅓ r.p.m. or a 45 r.p.m. record is played, the control rod 70 is moved in the manner described above so as to control the record changing mechanism to shift the speed of the turntable 51 to 78 r.p.m. Accordingly, the microgroove record is played at approximately twice the normal playing speed thereof so that the operator is immediately informed by the abnormally high pitch of the reproduced sound that the wrong needle size has been selected and can change the needle to the correct size before the microgroove needle or record is damaged. On the other hand, if the needle selecting arm 69 is in the 33⅓ and 45 r.p.m. needle position and a 78 r.p.m. record is played, the speed of the turntable is automatically adjusted to either 33⅓ r.p.m. or 45 r.p.m., depending upon the size of the record, and the operator is immediately informed by the abnormally low pitch that the wrong needle size has been selected since the 78 r.p.m. record will be played at approximately one-half its normal playing speed. It will also be noted that the needle selecting arm 69 can only be in one of two positions so that even if the operator is blindfolded he has a 50-50 chance of playing the records correctly by merely putting them on the spindle 56 and depressing the button 67.

Turntable drive mechanism

Considering now in more detail the manner in which the turntable 51 is driven, it will be recalled from the preceding general description that the speed of the turntable 51 is changed in accordance with the playing speed of records deposited on the turntable 51. In order to provide a simplified machine, a single revolution cycling mechanism is provided which is driven at a speed of 16⅔ r.p.m. for one revolution during which the record change is completed. With this arrangement the record changing cycle is of constant duration regardless of the playing speed of the records. While it is possible to slow down the turntable from a playing speed of 33⅓ r.p.m. or 45 r.p.m. to a speed of 16⅔ r.p.m. for one revolution to perform the record changing operation and then speed up the turntable again, such an arrangement has the disadvantage that when the turntable is slowed down during the record changing cycle a considerable amount of brake energy must be provided, particularly if the turntable is heavily loaded, with the result that the wear on the turntable driving means is considerably increased. Furthermore, due to the mass of the turntable and records, the speed of the record changing operation is considerably increased over what it would be if the turntable were driven at a constant speed of 16⅔ r.p.m. for one revolution. When the turntable is driven at a speed of 78 r.p.m. during the playing cycle, it is virtually impossible with conventional driving arrangements to slow down the turntable to 16⅔ r.p.m. in one revolution with eight or ten records on the turntable.

In order to provide an arrangement wherein the mass of the turntable and records thereon has little affect on the wear or speed of the driving means while permitting a single revolution changing mechanism to be used, there is provided a low inertia drive wheel, indicated generally at 90, which is positioned concentrically with the spindle 56 and drives the turntable 51 in the playing direction through a suitable clutch mechanism while permitting the turntable 51 to coast freely when the drive wheel 90 is slowed down. The drive wheel 90 also drives the record changing mechanism and the speed of the drive wheel 90 is reduced to 16⅔ r.p.m. during the record changing cycle after which the speed of the drive wheel 90 is changed to the playing speed of the new record deposited on the turntable 51, and drives the turntable 51 in the playing direction at this playing speed.

In order to drive the drive wheel 90, there is provided a motor indicated generally at 91 (FIG. 2), which is positioned on a mounting bracket 92 which is resiliently mounted on the underside of the base plate 50 by means of the mounting screws 93, the shaft 94 of the motor 91 extending upwardly through an irregular opening 95a in the base plate 50. The upper end of the shaft 94 engages the largest diameter step 95 of a multi-step turret 96 which is rotatably mounted on one end of a bell crank lever 97. The bell crank lever 97 is pivotally supported from the base plate 50 on the post 98 secured thereto and a spring 99 is connected from one arm of the bell crank lever 97 to an intermediate point on a bracket 100 which is secured to the base plate 50 and extends into the opening 95a so that the bottom step 95 of the turret 96 is normally urged into engagement with the upper end of the drive shaft 94. An idler wheel 101 is rotatably mounted on a post 102 secured to one end of a lever 103 the other end of which is pivotally secured to one end of a bell crank lever indicated generally at 104. The bell crank lever 104 is provided with a hub portion 105 which is rotatably mounted on a post 106 secured to the base plate 50, and the arm 107 of the bell crank 104 is provided at the end thereof with an enlarged end portion 108 to which the lever 103 is pivotally secured. A spring 109 is connected from the free end of the lever 103 to a point on the bell crank lever 97 so that the idler wheel 101 is normally urged into engagement with one of the steps on the multi-step turret 96.

The drive wheel 90 is provided with a bearing sleeve 115 (FIG. 16) which is rotatably mounted on the spindle 56 and a hub plate 116 is secured to the bottom end of the sleeve 115 and terminates in the spokes 117, 118 and 119 which project radially outwardly from the hub plate 116 and support at the outer ends thereof a rim 120. The spindle 56 is supported within the opening 121 (FIG. 16a) in the base plate 50 by means of a threaded bushing 122 which is secured to the spindle 56 and is provided with a shoulder which cooperates with the nut 124 to clamp the spindle 56 securely to the base plate 50. A suitable ball bearing ring 125 is provided between the top of the bushing 122 and the hub plate 116 so that the drive wheel 90 may be freely rotated with respect to the spindle 56. The idler wheel 101 is adapted to engage the inner edge of the rim 120 when the record changer is operating so that the drive wheel 90 is driven from the turret 96 through the idler wheel 101 at a speed determined by the particular step of the turret 96 with which the idler wheel 101 is in engagement.

In order to drive the turntable 51 in the playing direction from the drive wheel 90, there is provided a rubber tired clutch wheel 130 which is secured to the spoke 117 of the drive wheel 90 and is adapted to engage the underside of the turntable 51. More particularly, the spoke 117 of the drive wheel 90 extends outwardly beyond the edge of the rim 120 to form a bracket 131 which pivotally supports the end 132 of a wire axle 133. The spoke 117 is provided with an intermediate step portion 134 which is provided with an aperture 139 (FIG. 4) adapted loosely to receive the end portion 135 of the wire axle 133 and the wheel 130 is positioned on a step portion 136 of the wire axle 133 and is held loosely in position by means of the tubular spacer 137. The step portion 134 of the spoke 117 is provided with an inclined flange portion 138 and the wire axle 133 is formed so that the wheel 130 is urged upwardly against the underside of the turntable 51.

When the drive wheel 90 is urged in the direction of the arrow 140 shown in FIG. 18 the clutch wheel 130 is wedged between the underside of the turntable 51 and the inclined surface of the flange 138 so that the drive wheel 90 and turntable 51 are directly locked together and rotate as an integral unit when the drive wheel 90 is driven in the playing direction. However, when the drive wheel 90 is slowed down to 16⅔ r.p.m. during the record changing cycle, the turntable 51 becomes disengaged from the drive wheel 90 since the relative movement between the drive wheel 90 and the turntable 51 is in the opposite direction from the arrow 140 with the result that the turntable 51 coasts freely since the wheel 130 remains in engagement with the underside of the turntable 51 and is moved out of engagement with the inclined surface of the flange 138 to the position shown in dotted lines at 141 in FIG. 18. In this connection it will be understood that while the clutch wheel 130 is normally wedged between the underside of the turntable 51 and the flange 138 when the drive wheel 90 is rotated in the playing direction, if excessive torque is produced between the drive wheel 90 and the turntable 51 the clutch wheel 130 will slip. Accordingly, if the record changer is turned off and the operator attempts to rotate the turntable 51 backwards, the clutch wheel 130 slips so that the drive wheel 90 is effectively disconnected therefrom and force jamming of the cycling mechanism is prevented. Also, in situations where the speed of the drive wheel 90 is abruptly increased during the changing cycle, the clutch wheel 130 will slip somewhat so that the turntable 51 is brought up to speed slowly and is not given too much momentum. This is particularly important in the event that the ultimate speed of the turntable 51 is slow so that overcoasting of the turntable 51 is prevented. It will also be noted that the turntable 51 is driven through the rubber tired clutch wheel 130 so that vibrations of the motor shaft are not transmitted directly to the turntable 51 to any substantial degree but must travel inwardly from the rim of the drive wheel, through the bearings of the drive wheel and turntable, and back out to the pick-up, with the result that "rumble" due to motor drive shaft vibrations tends to be reduced.

The turntable 51 is secured on the upper end of a bearing sleeve 145 which is rotatably mounted on the bearing sleeve 115 and rests on a ball bearing ring 146 which is positioned on the hub plate 116. In this connection it will be understood that while the turntable 51 has been illustrated as provided with a conventional rim 147, the rim 147 is actually unnecessary since the turntable 51 is driven from the drive wheel 90. Also, a relatively inexpensive bearing for the turntable 51 may be provided in place of the bearing sleeve 145 since the turntable is directly connected to and is driven by the drive wheel 90 when the turntable is rotated in the playing direction and the eccentricity of the turntable bearing does not affect reproduction. For example, the turntable may be provided with a pair of thin, annular portions which are positioned edgewise on the sleeve 115 at either end thereof to provide spaced bearing surfaces for the turntable. It will, therefore, be evident that the drive wheel 90 and the turntable 51 together are substantially equivalent, insofar as the weight of metal and bearings are concerned, to a conventional single turntable.

Considering now the operation of the above described turntable drive mechanism, and assuming that the idler wheel 101 may be adjusted vertically by means to be described in more detail hereinafter, the motor drive shaft 94 continuously rotates the multi-step turret 96 by engagement with the lower step 95 thereof when the tone arm 52 is not positioned on the rest 65. If the idler wheel 101 is positioned to engage the topmost step 150 of the multi-step turret 96 as shown in FIGS. 5 and 6, the idler 101 is driven at the correct speed to rotate the drive wheel 90 at 16⅔ r.p.m. by engagement with the rim 120 thereof. If the idler 101 is positioned to engage the next step 151 on the turret 96 the idler wheel 101 is rotated at the correct speed to drive the drive wheel 90 at 33⅓ r.p.m. If the idler wheel 101 engages the third step 152 of the turret 96 the idler wheel 101 is driven at the correct speed to rotate the drive wheel 90 at a speed of 45 r.p.m. and if the idler 101 engages the step 153 of the turret 96 the drive wheel 90 is rotated at a speed of 78 r.p.m. It will be noted that the spring 109 (FIGS. 5 and 6) urges the idler wheel 101 into engagement with the turret 96 and the rim 120 in each of the above described positions so that driving connection to the drive wheel 90 is maintained.

Drive mechanism for cycling slide

As described generally heretofore in connection with the drive mechanism for the turntable 51, the drive wheel 90 also function to drive the record changing mechanism directly. Furthermore, the record changing operation is completed during one revolution of the drive wheel 90 so that an extremely simple and economical record changing mechanism may be employed. More particularly, a connecting pin 160 (FIG. 16) is secured to the intermediate step portion 134 of the spoke 117 on the drive wheel 90 and extends downwardly therefrom. A cycling slide 161 is, in the illustrated embodiment, slidably positioned on the base plate 50 and is arranged to be reciprocated back and forth during one revolution of the connecting pin 160 secured to the drive wheel 90. The slide 161 is provided with an inclined portion 162 which extends downwardly through a slot 163 in the base plate 50 and the slide 161 is also provided with a slot 164 therein (FIG. 5) which is adapted to receive the bushing 122 (FIG. 16a), a retaining plate 165 being secured to the bushing 122 with the edges thereof extending outwardly beyond the slot 164 so that the slide 161 is retained loosely on the base plate 50 and is guided by means of the slots 163 and 164.

In order to drive the cycling slide 161 from the connecting pin 160, a pair of cam riser plates 168 and 169 are tiltably mounted on the cycling slide 161. Thus, a first pair of upstanding ear portions 170 and 171 are struck up out of the slide 161 and are provided with suitable apertures for receiving the trunnion portions 172 and 173 of the cam riser 168. In a similar manner a pair of ear portions 174 and 175 are struck up out of the cycling slide 161 and are provided with suitable apertures for receiving the trunnion portions 176 and 177 of the cam riser 169. The cam riser 168 is provided with an upstanding flange 180 which extends along a portion of the edge 181 of the cam riser 168 and the cam riser 168 is normally held in a horizontal position by engagement of the free end 182 of a trip arm 183 with the top edge of the flange 180, as shown in FIG. 16. When the cam riser 168 is thus held in a horizontal position the connecting pin 160 does not strike the cam riser 168 but instead moves over the top of the riser 168 along the path indicated in dotted lines at 185 in FIG. 19.

When the trip arm 183 is either lifted upwardly as shown in FIG. 22 or moved to the side as indicated in dotted lines at 186 in FIG. 19, by means to be described in more detail hereinafter, the cam riser 168 tilts of its own weight to the position shown in FIGS. 20 and 22 so that the edge 181 of the cam riser 168 is brought up into the path of the connecting pin 160. Accordingly, on the next revolution of the connecting pin 160 this pin engages the edge 181 of the cam riser 168 and moves the cycling slide 161 forwardly toward the spindle 56, i.e., from the position shown in FIG. 3 to the position shown in FIG. 5. In this connection it will be understood that when the trip arm 183 is moved to the position shown in dotted lines at 186 in FIG. 19 the free end 182 thereof is moved beyond the flange 180 so as to permit the cam riser 168 to tilt to the position shown in FIG. 20.

The cam riser 169 is provided with a projecting ear portion 190 and the base plate 50 is provided with an upturned flange 191 having an inclined portion 192 at one end thereof. In the rest position of the slide 161 shown in FIG. 3, the ear portion 190 of the cam riser 169 rests on the step portion 193 of the flange 191 and the cam riser 169 is so pivoted that its own weight tends to hold the cam riser 169 horizontal with the ear 190 resting on the step 193. However, when the record changing cycle is initiated and the cycling slide 161 is moved forwardly by engagement of the connecting pin 160 with the cam riser 168, the ear 190 rides up the incline 192 on the flange 191 so that the edge 194 of the cam riser 169 is tilted upwardly into the path of the connecting pin 160.

As the connecting pin 160 continues to rotate during the second half of the record changing cycle, it strikes the edge 194 of the cam riser 169 and moves the cycling slide 161 back to its rest position. As the cam riser 169 is moved back to the rest position shown in FIG. 3 the ear 190 rides above the incline 192 so that as soon as the connecting pin 160 moves out of engagement with the edge 194 the cam riser 169 drops to the horizontal position so that it is not thereafter struck by the connecting pin 160 until the next record changing cycle. It will be noted that with the above described pivotal arrangement of the cam riser 169 the connecting pin 160 does not strike the edge 194 of the cam riser during the playing cycle so that an objectionable ticking sound is avoided. However, it will be understood that a fixed member may be provided on the slide 161 in place of the cam riser 169 which is adapted to be engaged by the connecting pin 160 during the last half of the record changing cycle, although such an arrangement, while simpler, suffers from the disadvantage that the connecting pin 160 may strike the edge of the fixed member on the slide 161 during each revolution while the records are being played. With the arrangement shown in FIGS. 1 to 24, inclusive, both of the cam risers 168 and 169 are tilted to a horizontal position so that no part of the cycling slide is engaged by the connecting pin 160 during the playing cycle. In this connection it will be noted that the cycling slide 161 is positively driven in both directions during the record changing cycle. Furthermore, power for the cycling slide 161 is applied to the rim of the drive wheel 90 at a speed of 16⅔ r.p.m. during the record changing cycle so that considerable power is available to actuate the record changing mechanism. It will also be understood that the drive wheel 90 may be of considerably smaller diameter and may, if desired, be driven by engagement of the idler wheel 101 with the outside of the rim of the drive wheel, it being necessary only to provide a drive wheel of sufficient diameter that the connecting pin 160 and a suitable turntable clutching mechanism thereon, such as the clutch wheel 130, satisfactorily perform the functions described above.

The centering spindle 56 is actuated by movement of the cycling slide 51 in timed relationship to movement of the tone arm 52 so as to release the bottommost record supported thereon onto the turntable 51 after the tone arm 52 has been moved beyond the diameter of the largest record. While the centering spindle 56 may comprise any suitable arrangement for supporting and releasing the record to the turntable 51, in the illustrated embodiment the spindle 56 is of the type shown and described in detail in my copending application Ser. No. 319,975 filed Nov. 12, 1952 and reference may be had to this copending application for a detailed description of the spindle 56. However, for the purposes of the present invention, it may be stated that the spindle 56 (FIG. 4) is provided with four record supporting shoulders 200 which are spaced equally about the periphery of the spindle 56 and support a stack of records. The spindle 56 is provided with a record supporting shelf 201 and a control blade 202 is pivotally mounted in the upper end of the spindle and is adapted to move all but the bottommost record of the stack onto the shelf 201 during the record changing cycle. As soon as the upper records have been moved onto the shelf 201 the shoulders 200 are cammed inwardly so as to release the bottommost record onto the turntable 51.

The spindle 56 is provided with a tubular member 203 the upper end of which cams the shoulders 200 inwardly to release the bottom record and the control blade 202 is connected to the sleeve 203 (FIG. 16) by means of a control rod (not shown) so that the control blade 202 moves all but the bottom record onto the shelf 201 before the shoulders 200 are withdrawn. A U-shaped retaining loop 204 is secured to the bottom end of the sleeve 203 and the arm 213 of a bell crank lever 205 is positioned within the loop 204 and is adapted to engage the bottom end of the sleeve 203 when the bell crank 205 is pivoted. The base plate 50 is provided with a downwardly extending flange 206 to which the bell crank lever 205 is pivotally secured at 207. The cycling slide 161 is provided with a downwardly extending flange 208 which is provided with a right angle end portion 209 having an aperture 210 (FIG. 5) through which the upper end 211 of the bell crank lever 205 extends. As the flange 208 on the cycling slide 161 is moved away from the spindle 56 during the first half of the record changing cycle the back end of the slot 210 engages the edge 212 of the bell crank 205 and moves the end 213 of the bell crank 205 upwardly. However, the bell crank 205 is provided with an offset portion 214 so that a delay in the movement of the bell crank 205 is provided to give sufficient time for the tone arm 52 to be moved outside of the path of the released records. After this delay interval the back end of the slot 210 engages the upper edge 215 of the bell crank lever and continues to pivot the end 213 upwardly still further to the position shown in dotted lines at 216 in FIG. 16, in which position the shoulders 200 have been cammed inwardly to release the bottommost record to the turntable. On the return half of the record changing cycle the other end of the slot 210 engages the opposite edges of the upper end 211 of the bell crank 205, a similar delay being provided by the offset portion 214. It will be noted that the offset portion 214 of the bell crank 205 effectively provides a lost motion mechanism in a simple and economical manner so that the spindle 56 may be actuated in correct sequence with movement of the tone arm 52. In this connection it will be understood that any other suitable centering spindle which supports and releases the records from the spindle may be employed insofar as the other features of the present invention are concerned, it being understood further that the desired spindle may be actuated by any suitable bell crank arrangement which is driven from the cycling slide 161.

Tone arm mounting mechanism

Considering now in more detail the mechanism provided for mounting and moving the tone arm 52, it will be recalled from the general description that the tone arm is moved upwardly of the record at the start of the record changing cycle and is then moved outwardly beyond the path of the largest record. The tone arm 52 is thereafter moved inwardly to the correct position to engage the lead-in groove of the record which is released to the turntable 51 under control of the size indexing finger 55 and its associated mechanism.

The tone arm 52 includes a hollow tone arm body 225 (FIG. 16) which may be of plastic or other suitable material, and is pivotally connected to a tone arm pivot bracket 226 by means of the pivot pin 227. The pivot bracket 226 is provided with a pair of downwardly extending ear portions 228 and 229 (FIG. 7) which are pivotally connected to a pair of upstanding ear portions 230 and 231, provided on the end flange 232 of a tone arm mounting bracket 233, by means of the hinge pin 234. A tone arm support bracket 235 is secured to the base plate 50 and is provided with a pair of spaced right angle portions 236 and 237 which are provided with aligned apertures for receiving a round elevating rod 238, the end of which rests on the inclined flange 162 of of the cycling slide 161. A tone arm return bracket 240 is rotatably mounted on the elevating rod 238 by means of the end flanges 241 and 242 which are positioned outside of the right angle portions 236 and 237 on the support bracket 235. The tone arm mounting bracket 233 is likewise rotatably mounted on the rod 238 by means of the right angle end flanges 232 and 245 which are provided with aligned apertures for receiving the rod 238, the upper end of the rod 238 engaging and supporting the hinge pin 234 at the center thereof.

The tone arm pivot bracket 226 is provided with a downwardly extending flange 246 which is provided with an upturned hook portion 247 terminating in an upwardly extending tongue portion 248 of less width than the hook portion 247. The end flange 241 of the tone arm return bracket 240 is provided with a fan-shaped extension 249 (FIG. 3) provided with a notch 250 in the periphery thereof. The tone arm mounting bracket 233 is provided with a transversely extending tone arm lever 255 (FIG. 7) which is formed integrally with the end flange 245 and extends outwardly so that it may be engaged by an upstanding flange 256 on the cycling slide 161. The tone arm return bracket 240 is provided with a transversely extending tone arm return lever 257, which is formed integrally with the end flange 242 and is provided with a pair of downturned ear portions 258 and 259 (FIG. 7) which are hingedly connected by means of the pin 260 to a pair of upstanding ear portions 261 and 262 on a tone arm indexing lever 263. With this arrangement, the tone arm indexing lever 263 is mounted on and moves with the tone arm return lever 257. However, it will be noted that the indexing lever 263 is offset from the edge 265 (FIG. 5) of the tone arm return lever 257 and the upstanding flange 256 may strike the edge 265 without engaging the indexing lever 263 so that the lever 263 may be pivoted up and down for indexing purposes as will be described in more detail hereinafter.

Considering now the operation of the above described tone arm mounting arrangement, when the cycling slide 161 is moved forwardly during the first portion of the record changing cycle the elevating rod 238 is moved upwardly along the inclined flange 162 of the slide 161. Since the tone arm pivot bracket 226 is supported on the upper end of the elevating rod 238 the rear portion of the tone arm 52 also moves upwardly. However, the forward end of the tone arm is not moved off of the record until the tongue 248 engages the underside of the fan shaped portion 249. When the elevating rod 238 is moved completely up the inclined flange 162 the tongue 248 has engaged the underside of the fan portion 249 and the pivot pin 234 has been moved upwardly by an amount sufficient to lift the free end of the tone arm 52 off of the record which is uppermost on the stack. As the cycling slide 161 continues to move forwardly the upstanding flange 256 thereon engages the edge 266 (FIG. 16) of the tone arm lever 255 and moves this lever forwardly so that the tone arm mounting bracket 233, and hence the tone arm 52, is pivoted about the elevating rod 238 and the tone arm 52 is moved away from the spindle 56. As the cycling slide 161 continues to move forwardly the flange 256 also engages the edge 265 (FIG. 5) of the tone arm return lever 257 so that the levers 257 and 255 are brought into alignment. When the levers 255 and 257 are thus brought into alignment the tongue 248 moves into the notch 250 in the fan shaped portion 249 of the tone arm return bracket 240 due to the weight of the free end of the tone arm 52. After the tongue 248 is positioned within the notch 250 the brackets 233 and 240 are locked together so that they move as an integral unit and the tone arm may thereafter be positioned for different sized records by controlling the position of the indexing lever 263.

When the cycling slide 161 has been moved to its extreme forward position, i.e., the position shown in FIG. 5, the flange 256 has pivoted the tone arm 52 to its extreme outward position. As the cycling slide 161 is moved back to its rest position during the last half of the record changing cycle, a spring 267 which is connected between the base plate 50 and the tone arm return lever 257, functions to hold the lever 257 in engagement with the flange 256 so that the tone arm 52 is moved inwardly until the indexing lever 263 is engaged by the size indexing mechanism as will be described in more detail hereinafter. When the lever 263 is restrained, inward movement of the tone arm movement is ceased and as the elevating rod 238 moves back down the inclined flange 162 it causes the tone arm 52 to be lowered to the record on the turntable 51. As soon as the tone arm rests on the uppermost record on the turntable and the tongue portion 248 has moved out of engagement with the notch 250, the tone arm 52 is free to follow the run-in groove of the record even though the record changing cycle is not completed. Accordingly, the tone arm is not held after the needle engages the record so that the stylus is not twisted and the tone arm does not tend to jump or skid when released due to spring tension of a twisted stylus. It will also be noted that the tone arm 52 is released from the indexing mechanism independently of the number of records on turntable. Thus, if a large number of records are positioned on the turntable 51, the elevating rod 238 has only to move a short distance down the flange 162 before the tongue 248 is disengaged from the notch 249 and the tone arm 52 is released. On the other hand if a single record is positioned on the turntable 51, the elevating rod 238 is moved substantially completely down the incline 162 before the tone arm comes to rest on the record and is released from the indexing mechanism.

In order to provide an adjustment for the sit-down position of the tone arm 52 so that the tone arm may be adjusted to engage the run-in groove of the record, the tone arm pivot bracket 226 is provided with a downwardly extending flange 270 (FIG. 16) and the tone arm body 225 is provided with a flange 271 (FIG. 7) through which is threaded a screw 272 which engages the side of the flange 270. A spring 273 is connected between the flange 270 and a projection 274 on the inside of the tone arm body 225 so that the end of the screw 272 is biased against the flange 270. By adjustment of the screw 272 the position of the free end of the tone arm 52 may be adjusted relative to the tone arm mounting bracket 233 on which it is pivotally supported so that the sit-down position for the run-in groove may be adjusted. It will be noted that with the above described tone arm mounting arrangement the tone arm 52 may be held during the record changing cycle without jamming the cycling mechanism or causing damage to the tone arm mounting mechanism since the tone arm is pivotally connected to the pivot bracket 226 by means of the pivot pin 227 and these members may be moved relative to one another against the force of the biasing spring 273.

Automatic tripping mechanism

Considering now in more detail the automatic tripping mechanism of the present invention, it will be recalled from the above description of the cycling drive mechanism that the trip arm 183 is either moved upwardly or sidewardly to permit the cam riser 168 to be tilted up into the path of the connecting pin 160 to initiate the record changing cycle. More particularly, when the tone arm 52 engages the run-out groove of the record being played the trip arm 183 is moved sidewardly by means of a velocity tripping mechanism to initiate the record changing cycle and the trip arm 183 may also be moved upwardly by depressing the button 67 in the event that a manual reject operation is desired.

Considering first the velocity tripping mechanism, the trip arm 183 is provided with a hub portion 280 (FIG. 19) which rests on the end flange 245 of the tone arm mounting bracket 233, and a weight 281 (FIG. 20) is positioned on top of the hub 280, the elevating rod 238 extending through both of the members 280 and 281. As the tone arm 52 moves inwardly toward the spindle 56 during the playing cycle the trip arm 183 is urged in the same direction due to the frictional contact between the hub portion 280 of the trip arm 183 and the end flange 245 on the tone arm mounting bracket 233. The connecting pin 160 on the drive wheel 90 is provided with a rubber sleeve 283 (FIG. 16), which strikes the tip of the trip arm 183 during each revolution of the drive wheel 90, as is best illustrated in FIG. 19. Accordingly, during the playing cycle, the trip arm 183 is moved inwardly at a sufficiently gradual rate to permit the pin 160, which moves in the path indicated in dotted lines at 185 in FIG. 19, to maintain the end 182 of the trip arm 183 positioned on the flange 180 of the cam riser 168 so that the riser 168 is held horizontal and the record changing cycle is not initiated. However, when the tone arm engages the run-out groove of the record it moves inwardly with sufficient velocity to cause the trip arm end 182 to move inwardly beyond the end of the flange 180 during one revolution of the drive wheel 90 so that the cam riser 168 is permitted to tilt to the position shown in FIG. 20. When the cam riser is tilted to the position shown in FIG. 20 the connecting pin 160 engages the edge 181 thereof so that the record changing cycle is initiated in the manner described in detail above.

In order that the end 182 of the trip arm will not become wedged between the flange 180 and the connecting pin 160 as the pin 160 rotates, the flange 180 is provided with an undercut portion 285 (FIG. 19b) and the portion 182 is provided with an inclined edge 286 so that if the end portion 182 is moved off of the edge of the flange 180 and the riser 168 tilts, the end 182 may be pushed back into the undercut portion 285, so that the end of the trip arm 183 is not bent or damaged. As the cycling slide 161 is moved forwardly by the pin 160 during the record changing cycle, an upstanding lug 287 on the cycling slide 161 strikes the offset edge portion 288 on the trip arm 183 and moves the trip arm back to its playing position, i.e., the position shown in full lines in FIG. 19. At the same time the tone arm mounting bracket 233 is moved upwardly to lift the tone arm 52 off of the record so that the trip arm 183 is lifted bodily to the position shown in FIG. 17 since the trip arm 183 is supported on the end flange 245 of the tone arm mounting bracket 233. As the tone arm is moved outwardly during the record changing cycle to permit the next record to be dropped, the trip arm 183 is also moved in the same direction due to the frictional contact between the surfaces of the members 280 and 245. However, an upstanding lug 289 on the cycling slide 161 prevents the trip arm 183 from moving outwardly by an amount sufficient to clear the outer edge of the flange 180, as is best illustrated in FIG. 5. Accordingly, as the cycling slide 161 is returned to its rest position during the last half of the record changing cycle, the flange 180 on the cam riser 168 is moved under the end 182 of the trip arm 183 at the same time as the trip arm 183 is bodily lowered when the elevating rod 238 moves back down the flange 162. In this connection it will be noted that the end 182 of the trip arm 183 is provided with an upwardly curved tip portion 290 (FIG. 17) which facilitates camming the cam riser 168 back to a horizontal position by engagement of the end 182 with the top edge of the flange 180 on the cam riser 168.

When the cycling slide 161 has returned to its rest position the end 182 of the trip arm 183 rests on the flange 180 with sufficient force to hold the cam riser 168 horizontal so that the connecting pin 160 passes over the top of the cam riser 168 during the next playing cycle. It will be noted that the lug 287 engages the edge portion 290 (FIG. 5) of the trip arm 183 during the first part of the last half of the record changing cycle so that as the tone arm is moved inwardly to position the same over the run-in groove of the next record, the lug 287 prevents the trip arm 183 from moving to the trip position, i.e., the position shown in dotted lines at 186 in FIG. 19. However, after inward movement of the tone arm has ceased and the tone arm is being lowered to the record, the lug 287 moves away from the offset edge portion 288 of the trip arm 183 so as to permit the trip arm to be moved to the trip position by means of the above described velocity trip mechanism when the run-out groove of the record is encountered. In this connection it will be noted that the velocity required to initiate a record changing cycle may be readily adjusted by bending the outer end 182 of the trip arm 183 so that it occupies a different rest position on the flange 180. If the end 182 is bent toward the spindle 56 a greater tone arm velocity is required to move the end 182 off of the flange 180 during one revolution of the drive wheel 90, and vice versa.

In order to provide a delayed trip action so that the tone arm may be moved back and forth over the playing portion of the record by the operator without actuating the automatic tripping mechanism, there is provided means for effectively disenagaging the frictionally contacting surfaces of the members 280 and 245 during periods when the tone arm is positioned on or over the playing portion of the record. More particularly, a flexible control wire 295 is secured at one end thereof to the base plate 50 under the head of a screw 296 and is provided with an upstanding end poriton 297 which is adapted to engage a projecting shoulder 298 (FIG. 19a) extending outwardly beyond the periphery of the hub portion 280 of the trip arm 183. The end flange 245 of the tone arm mounting bracket 233 is also provided with a projecting camming portion 299 which projects beyond the periphery of the hub portion 280 to the same extent as the shoulder 298.

The end portion 297 of the delay control wire 295 prevents the trip arm 183 from being moved to the trip position by engagement with the shoulder 298. Accordingly the tone arm may be moved back and forth over the playing portion of the record without actuating the tripping mechanism since the hub portion 280 of the trip arm is restrained from movement in the tripping direction by the end 297 of the delay control wire 295 so that the members 280 and 245 slide on one another. In this connection it will be understood that if the tone arm is moved outwardly the control wire 295 has no effect, since the shoulder 298 moves away from the end 297 of the control wire 295. However, the lug 289 on the cycling slide 161 prevents the trip arm 183 from moving outwardly beyond the flange 180 during outward movements of the tone arm. When the tone arm has moved inwardly over substantially the full playing portion of the record, the camming shoulder 297 on the end flange 245 has been moved into engagement with end 297 of the control wire 295 and moves the end 297 outwardly beyond the edge of the shoulder 298 on the hub portion 280. When this occurs, friction between the hub portion 280 and the end flange 245 is again effective so that further inward movement of the tone arm causes a corresponding movement of the trip arm 183. When the run-out groove of the record is engaged the trip arm 183 moves inwardly to the trip position 186 with the result that the record changing cycle is initiated in the manner described in detail above.

The automatic tripping mechanism described above may also be actuated manually by the operator at any time during the playing cycle so that the record which is being played may be rejected and a new record changing cycle initiated. More particularly, when the operate button 67 is depressed by the operator, means are provided for lifting the trip arm 183 to the position shown in FIG. 22 so that the cam riser 168 is permitted to tilt upwardly into the path of the connecting pin 160, thereby initiating the record changing cycle in the manner described above. The operate button 67 is secured to one end of a right angle bracket 310 (FIG. 21) which is secured to one end of a control rod 311. The control rod is rotatably mounted in the end flanges 312 and 313 of a bracket 314 which is secured to the base plate 50. A reject control wire 315 is secured to the control rod 311 adjacent the end flange 313 and extends transversely away from the rod 311. The reject control wire 315 is provided with an enlarged end portion 316 which rests against a down turned flange 317 on the cycling slide 161 when the control wire 315 is in the non-reject position. A spring 318 is connected between a downturned flange 320 on the bracket 310 and a point on the 78 r.p.m. speed indexing lever 71 so that normally the operate button 67 is biased upwardly and the control wire 315 rests against the edge 321 (FIG. 19) of the base plate 50. When the cycling slide 161 is in its rest position the flexible control wire 315 is bowed slightly by engagement of the end 316 thereof with the flange 317.

When the operator wishes to initiate a record changing cycle he depresses the operate button 67 so that the end portion 316 of the control wire 315 moves upwardly and engages the underside of the trip arm 183. In this connection it will be noted that the trip arm 183 is provided with a side flange 322 so that the end portion 316 will strike the trip arm 183 in all positions thereof. As the end 316 of the control wire 315 is moved upwardly it lifts the trip arm 183 to the positon shown in FIG. 22 in which position the end 183 of the trip arm is moved upwardly so that it no longer presses on the flange 180 and the cam riser 168 is permitted to tilt upwardly into the path of the connecting pin 160 so that the record changing cycle is initiated. When the end portion 316 has been upwardly by an amount sufficient to clear the upper surface of the cycling slide 161 it moves laterally to its unstressed position shown in dotted lines at 325 in FIG. 19, in which position the end portion 316 has moved beyond the flange 317 and rests on the upper surface of the cycling slide 161 so that the end portion 316 supports the trip arm 183 in the position shown in FIG. 22. With this arangement the cam riser 168 is maintained in a tilted position until engaged by the connecting pin 160 even though the operate button 67 has been released by the operator. However, as soon as the record changing cycle has been initiated and the slide 161 moves forwardly during the first part of the record changing cycle, the support for the end portion 316 is removed so that the spring 318 returns the control wire to the positon shown in full lines in FIG. 21. In this connection it will be understood that by the time the end portion 316 is dropped, the cam riser 168 has been engaged by the connecting pin 160 thus holding the riser in a tilted position. As the cycling slide 161 returns to its rest position at the end of the record changing cycle the flange 317 pushes the end portion 316 and flexes the control wire 315 so that it is bowed properly for the next reject operation.

Tone arm positioning mechanism

Considering now in more detail the manner in which the tone arm 52 is positioned correctly for records of different sizes, it will be recalled from the general description of the changer and the description of the tone arm mounting mechanism that the index finger 55 is employed to detect the size of the record which is deposited on the turntable 51 and a suitable mechanism is provided for positioning the tone arm 52 in accordance with movement of the size indexing finger 55. More particularly, the size indexing finger 55 is pivotally mounted on the side of the housing member 54 by means of the pivot pin 330 (FIG. 12) and the right angle end portion 331 of an indexing control rod 332 is positioned in a suitable opening in the end of the size indexing finger 55 so that movement of the size indexing finger 55 to the dotted positions 76 and 79 causes substantially vertical movement of the control rod 332. The bottom end of the rod 332 is loosely positioned in an opening in the right angle flange 334 of the housing member 54 and a lug 335 on the rod 332 is adapted to engage the flange 334 when the finger 55 is in the full line position shown in FIG. 12.

In order to withdraw the finger 55 at all times except during the record changing cycle so that records may be removed from the turntable without interference by the finger 55, there is provided an extension arm 336 on the cycling slide 161 which extends upwardly therefrom and is provided with an inclined end portion 337. When the cycling slide is in its rest position, the end of the rod 332 rests on the uppermost part of the inclined end portion 337 so that the finger 55 is completely withdrawn within the edge of the housing 54. However, as soon as the record changing cycle is initiated, the inclined end portion 337 moves forwardly so as to permit the rod 332 to move downwardly until the lug 335 strikes the flange 334 so that the finger 55 is moved to the position shown in full lines in FIG. 12 during the initial portion of the record changing cycle, it being understood that the weight of the rod 332 is sufficient to counter-balance the weight of the finger 55 to move it to the full line position shown in FIG. 12 when the inclined end portion 337 is moved forwardly.

In order to control the movement of the tone arm indexing lever 263 so that the tone arm may be positioned correctly for records of different sizes, there is provided a curved indexing cam 340 which is adapted to engage an inclined end portion 341 of the tone arm indexing lever 263 and adjust the vertical position of the end of the indexing lever 263. The curved indexing cam 340 is pivotally mounted on the verticaly extending pin 342 secured to the base plate 50, by means of the right angle ear portions 343 and 344 (FIG. 6) formed at the end of the curved cam 340, the ear portion 344 resting on the mounting flange 345 of the housing member 54. The curved cam 340 is spring biased away from the housing member 54 by means of the spring 346 (FIG. 5) which is connected between the curved cam 340 and a bracket 347 on the base plate 50. The curved cam 340 is provided with a sidewardly extending positioning flange 350 (FIG. 15) having a downwardly extending step portion 351 and terminating in a sidewardly extending end portion 352. The curved cam 340 is held against the side of the housing member 54, i.e., the position shown in FIG. 15, between record changing cycles by means of a sidewardly extending arm 353 on the cycling slide 161 which is provided with an upturned lug 354 which is adapted to engage the curved cam 340 in the manner shown in FIG. 23. A flat shut-off spring 338 is supported at one end of the ear portion 343 and is provided at the other end thereof with a depending tab portion 339 (FIG. 15a) which extends through a slot in the flange 350 and is provided with a laterally extending end portion 348 which limits the upward movement of the spring 338. A coil spring 349 (FIG. 6) is positioned between the head of the pin 342 and the supported end of the spring 338 and the spring 338 is provided with a slight bend adjacent the supported end portion thereof so that the pressure of the spring 349 on the supported end of the spring 338 biases the free end of the spring 338 to a position in which the flange 348 engages the underside of the flange 350.

When the record changing cycle is initiated, the inclined end portion 337 moves forwardly so as to permit the control rod 332 to drop to the position shown in FIGS. 6 and 7, in which position the size indexing finger 55 is positioned as shown in full lines in FIG. 12. Just slightly thereafter, the lug 354 on the cycling slide 161 moves forwardly by an amount sufficient to permit the curved cam 340 to move sidewardly due to the force exerted by the spring 346 so that the edge of the end portion 352 comes to rest against the end of the control rod 332 with the result that the curved cam 340 is held in the position shown in FIG. 7. Assuming that a seven inch record is released to the turntable, this record does not strike the size indexing finger 55 so that the rod 332 remains in the position shown in FIG. 7 for the remainder of the record changing cycle. As the cycling slide 161 returns to its rest position during the last half of the record changing cycle, the tone arm 52 is moved inwardly by the biasing action of the spring 267 and the inclined end portion 341 of the tone arm indexing lever 263 rides along the curved surface of the curved indexing cam 340. When the cam 340 is held in the position shown in FIG. 7, the inclined portion 341 is so positioned that the end of the indexing lever 263 is at the correct height to engage the edge 358 (FIG. 6) of a recessed portion of the housing member 54 and the indexing lever 263 is held in engagement with the edge 358 by the spring 267 so that the tone arm is lowered in the correct position to engage the run-in groove of the seven inch record on the turntable 52. As the cycling slide 161 returns to its rest position the lug 354 again engages the curved cam 340 and moves it against the side of the housing member 54. However, the indexing lever 263 remains engaged with the edge 358 until the next record changing cycle due to the bias of the spring 267. At the same time the inclined end portion 337 again elevates the rod 332 so that the finger 55 is withdrawn.

When the next record changing cycle is initiated, the inclined end portion 337 is withdrawn so that the rod 332 drops down to the position shown in FIGS. 6 and 7, it being recalled that the lug 354 holds the curved cam 340 against the member 54 until after the rod 332 has dropped down beyond the edge of the end portion 352. Assuming that a ten inch record is now released to the turntable, this record strikes the finger 55 and moves it to the position shown in dotted lines at 79 in FIG. 12, so that the rod 332 is moved upwardly to the position shown in full lines in FIG. 11. When the rod 332 is moved upwardly beyond the end portion 352, the spring 346 moves the curved cam 340 sidewardly until the step 351 engages the end of the rod 332, as shown in FIG. 8. When the curved cam 340 is in the position shown in FIG. 8 it cams the inclined end 341 of the tone arm indexing lever 263 upwardly to such a position that the lever 263 engages the step 359 (FIG. 6) on the housing member 54. As the cycling slide 161 continues to move back to its rest position the lug 354 again cams the curved cam 340 against the member 54. However, the spring 267 functions to hold the indexing lever 263 against the step 359 so that the tone arm is lowered in the correct position to engage the run-in groove of the ten inch record. Preferably, the step 359 is provided with a projecting bottom lip 360 so that the indexing lever 263 cannot be moved off of the step 359 by jarring the machine. It will also be understood that the spring 267 holds the lever 263 against the step 359, even though the curved cam 340 has been moved away from the inclined portion 341 at the end of the record changing cycle.

During the next record changing cycle the finger 55 is again moved to the indexing position in the manner described above. Assuming that a twelve inch record is now released to the turntable 51, the finger 55 is struck by this record and is moved to the position shown in dotted lines at 76 in FIG. 12. When the finger 55 is moved to the position 76, the rod 332 is moved upwardly beyond the upper edge of the flange 350 to the position shown in FIG. 9, and the curved cam 340 is moved sidewardly by the spring 346 until the end of the rod 332 strikes the tab portion 339 of the shut-off spring 338, the curved cam 340 being held in this position until the latter part of the record changing cycle. When the cam 340 is moved to the position shown in FIG. 9, the outer end of the indexing lever 263 is moved upwardly by the camming action of the cam 340 on the inclined portion 341 so that the indexing lever 263 strikes the edge 361 of the frame member 54 as the tone arm is moved inwardly. The spring 267 again functions to hold the lever 263 against the edge 361 as the curved cam 340 is moved back to its rest position at the end of the record changing cycle. Preferably, a lip 362 is provided at the bottom corner of the edge 361 so that the indexing lever 263 cannot be jarred off of the edge 361. When the indexing lever 263 strikes the edge 361 the tone arm is positioned so that when it is lowered to the record, it engages the run-in groove of a twelve inch record on the turntable 51.

Automatic speed control mechanism

Considering now in more detail the automatic speed control mechanism of the present invention, it will be recalled from the general description of the changer that the speed of the turntable 51 is automatically controlled in accordance with the size of the record deposited on the turntable and the position of the needle selecting arm 69 so that seven inch 45 r.p.m. records and ten inch and twelve inch 33⅓ r.p.m. records may be played in intermixed sequence and seven inch, ten inch and twelve inch 78 r.p.m. records may also be played in intermixed sequence. It will also be recalled that the drive wheel 90 is slowed down to a speed of 16⅔ r.p.m. during each record changing cycle so that the record changing cycle may be completed during one revolution of the drive wheel 90, thereby permitting the above described single revolution cycling drive mechanism to be employed, while at the same time providing sufficient time for the record changing cycle so that the tone arm 52 may be moved smoothly throughout the record changing cycle.

In order to change the speed of the drive wheel 90 to 16⅔ r.p.m. substantially immediately after the record changing cycle is initiated, there is provided means for moving the idler wheel upwardly along the steps of the multi-step turret 96 so the idler wheel 101 engages the 16⅔ r.p.m. step 150. More particularly, there is provided an upturned flange 375 (FIGS. 4, 5 and 6) on the cycling slide 161 which is positioned to move alongside the post 106 and is provided with a sloping cam portion 376. As soon as the record changing cycle is initiated and the cycling slide 161 moves forward, the cam portion 376 engages the underside of the hub 105 of the bell crank lever 104 at a point adjacent the post 106 and cams the hub 105 upwardly until it rests on the upper edge of the flange 375, i.e., the position shown in FIGS. 5 and 6. As the hub 105 is thus moved upwardly to the top edge of the flange 375, the idler wheel 101, which is pivotally supported on the outer end of the arm 107 of the bell crank 104, is moved bodily upwardly until the edge of the idler 101 engages the step 150. In this connection is will be understood that the spring 109 maintains the idler wheel 101 continuously engaged with one of the steps of the turret 96 as it is moved upwardly to the step 150 so that power is at all times applied to the drive wheel 90. Furthermore, since the turret 96 is continuously rotating, very little force is required to move the idler wheel 101 up the steps of the turret 96 since only sideward rolling friction is involved. As the idler 101 moves off of the edge of one of the larger steps, the spring 109 biases the idler 101 inwardly against the next smaller step as the bell crank 104 is moved upwardly on the post 106 in the manner described above. It will, therefore, be evident that as soon as the hub 105 is moved upwardly to the edge of the flange 375 the idler wheel 101 is moved into engagement with the step 150 so that the drive wheel 90 is driven at a speed of 16⅔ r.p.m. The hub 105 remains supported on the upper edge of the flange 375 until the cycling slide 161 has been returned to the point at which the cam portion 375 is positioned beneath the hub 105. At this point in the record changing cycle the support for the hub 105 is removed so that the idler wheel 101 supported by engagement of the edge thereof with the horizontal portion 377 (FIG. 6) of the turret 96 between the steps 150 and 151 so that the idler 101 continues to rotate at 16⅔ r.p.m., it being understood that the spring 109 prevents the idler wheel 101 from moving outwardly to one of the larger steps on the turret 96.

In order to position the idler 101 at the desired speed for the next playing cycle, there is provided means for moving the idler wheel 101 outwardly away from the 16⅔ r.p.m. step 150 and downwardly to a position opposite the desired step on the turret 96 in accordance with the desired speed of the next playing cycle. In order to move the idler 101 outwardly against the force of the biasing spring 109, there is provided a reset wheel 380 which is rotatably mounted on a post 381 which is supported on the outer end of the bracket 100 secured to the base plate 50. The reset wheel 380 is provided with an eccentric plate 382 which is secured to the reset wheel 380 and rotatably mounts one end of a connecting link 383. The other end of the connecting link 383 extends through a clearance hole in the arm 384 of the bell crank 104 and is provided with a downturned end portion 385, (FIG. 4). The rim of the reset wheel 380 is provided with a notched portion 386 of reduced diameter and the wheel 380 is so positioned on the bracket 100 that the upper end of the motor drive shaft 94 will engage the edge of the wheel 380 except in the reduced diameter portion defined by the notch 386.

In order to move the reset wheel into engagement with the motor drive shaft 94 at the appropriate point in the record changing cycle, the upper end flange 387 of the reset wheel 380 is provided with an upturned lug portion 388 and a flexible reset trip arm 389 is supported on the end of offset extension arm 390 on the cycling slide 161. As the cycling slide 161 is moved forwardly during the initial portion of the record changing cycle, the outer end of the arm 389 engages the lug 388 and moves the reset wheel 380 clockwise as viewed in FIG. 5 until the motor drive shaft 94 engages the edge 391 of the notch 386 at which point the wheel 380 is prevented from further clockwise movement by engagement with the motor drive shaft 94 and the flexible end portion of the trip arm 389 rides up over the lug 388 and moves to the position shown in FIG. 5. In this connection it will be understood that the motor drive shaft 94 is turning in the opposite direction from the above described initial movement of the reset wheel 380 so that as soon as the shoulder 391 is engaged by the motor drive shaft 94 the reset wheel 380 is urged away from the drive shaft 94.

When the cycling slide 161 has been moved almost back to its rest position, the edge 392 (FIG. 5) of the reset trip arm 389 engages the lug 388 and moves the reset wheel 380 so that the shoulder 393 is moved into engagement with the motor drive shaft 94 with the result that the reset wheel 380 is driven in the counter-clockwise direction as viewed in FIG. 5 by the motor drive shaft 94 until the notch 386 is again encountered so that the reset wheel 380 is rotated somewhat less than one revolution at substantially the end of the record changing cycle. During this single revolution of the reset wheel 380 the eccentric plate 382 functions to reciprocate the connecting link 383 so that the end portion 385 thereof engages the arm 384 of the bell crank 104 and pivots the bell crank 104 on the post 106 to the position shown in FIG. 23 in which position the idler wheel 101 is moved outwardly beyond the largest step on the turret 96. In this connection it will be noted that the reset wheel 380 is driven directly from the motor drive shaft 94 so that the above described single revolution of the wheel 380 by engagement with the shaft 94 takes place in a small fraction of a second. When the bell crank 104 is pivoted by the connecting link 383 in the manner described above, the idler wheel 101 is moved off of the horizontal step 377 of the turret 96 with the result that the bell crank 104 is then free to drop downwardly on the post 106 and the amount which the bell crank 104 is permitted to drop is controlled so that the idler 101 is positioned opposite the desired step on the turret 96 and the drive wheel 90 will be driven at the correct playing speed for the next playing cycle.

In order to control the vertical position of the bell crank 104 for the next playing cycle, there is provided a speed control slide 400 (FIG. 11) which is slidably mounted edgewise on the base plate 50 by means of the side flanges 401 and 402 which are positioned under the heads of the guide screws 403 and 404 respectively, in the slots 405 and 406. The speed slide 400 includes a flat edgewise mounted forward portion 407 having a top step 408 and an intermediate step 409 at the end thereof. In this connection it will be understood that the speed slide 400 in preferably mounted for minimum frictional engagement with the base plate 50 so that it may be readily moved in a direction generally parallel to the cycling slide 161 to the desired speed control position.

As the cycling slide 161 is moved forwardly during the first half of the record changing cycle, the hub portion 105 of the bell crank 104 is cammed upwardly to the top edge of the flange 375 in the manner described above so that the bottom surface of the hub 105 is positioned above the top surface of the upper step 408 on the speed slide 400. As the cycling slide 161 approaches the midpoint position shown in FIG. 5, a sidewardly extending flange 410 on the cycling slide 161 engages the rear edge 411 of the step 408 and moves the cycling slide 400 forwardly so that the step portion 408 is positioned under the hub 105, as shown in FIGS. 5 and 6. In this connection it will be noted that the speed slide 400 moves under the hub 105 on the other side of the post 106 from the point of engagement of the flange 375 so that these members may be moved independently and the flange 375 may be employed to lift the hub 105 upwardly on the post 106 whereas the speed slide 400 may be used to control the extent of the downward movement of the hub 105 on the post 106.

Assuming that a ten inch or twelve inch 33⅓ r.p.m. record is released onto the turntable and the needle selecting arm 69 is in the correct needle position to play this record, the speed control slide 400 remains in the position shown in FIGS. 5 and 6 as the cycling slide 161 is moved back to its rest position. Accordingly, when the reset wheel 380 is tripped in the manner described above and the bell crank lever 104 is pivoted by means of the connecting link 383, the hub portion 105 of the bell crank 104 is permitted to drop onto the upper step 408 of the speed control slide 400 so that the idler wheel 101 is moved into engagement with the 33⅓ r.p.m. step 151 on the turret 96. In this connection it will be understood that the spring 109, which is connected between the arm 103 which supports the idler wheel 101 and a point on the bracket 97, tends to move the bell crank hub 105 downwardly on the post 106 as soon as the idler wheel 101 is pivoted away from the steps on the turret 96 by movement of the reset wheel 380. Accordingly, the hub 105 becomes seated on the upper step 408 of the speed slide 400 shortly after pivotal movement of the bell crank 104 begins. However, the action of the reset wheel 380 is sufficiently fast that the edge of the idler wheel 101 does not engage the edges of the steps 150, 151, etc., on the turret 96 as it is moved outwardly and downwardly in the manner described above. It wil also be understood that at the time the reset wheel 380 is tripped the cycling slide 161 has moved back substantialy to its rest position so that the flange 375 is removed from beneath the hub 105 of the bell crank 104, thereby permitting the bell crank to drop to the desired position on the post 106. It will also be noted that the connecting link 383 only pivots the idler 101 away from the turret 96 since on the return stroke of the link 383 this link merely slides through the clearance hole in the arm 384 of the bell crank 104.

Therefore, while the idler 101 is moved away from the turret 96 very rapidly, it is biased back into engagement with the turret 96 by the spring 109 so that sufficient time is allowed to permit the idler to drop to the desired step on the turret 96. Also, the clearance hole in the arm 384 is sufficiently large that the link 283 does not interfere with positioning of the idler wheel 101, regardless of the diameter of the step with which the idler wheel 101 is engaged.

If a seven inch record is released to the turntable 51, means are provided for moving the speed control slide so that the step 409 thereon is positioned beneath the hub 105, in which position the screws 403 and 404 are positioned substantially in the middle of the slots 405 and 406. More particularly, the rear portion 415 of the slide 400 is provided with a laterally extending flange 416 at the rear end thereof which is provided with an offset portion 417 which is positioned in the path of movement of the inclined end portion 341 on the tone arm indexing lever 263. Accordingly, when the tone arm 52 is moved to the seven inch position, i.e., when the tone arm indexing lever 263 is moved into engagement with the edge 358 on the frame 54, the tip of the inclined portion 341 engages the offset portion 417 on the speed control slide 400 (FIG. 7) and moves the slide 400 rearwardly to the position shown in FIG. 10, in which position the step 409 is positioned beneath the hub 105 of the bell crank 104. Accordingly, when the reset wheel 380 is tripped at substantially the end of the record changing cycle, the hub 105 is permitted to drop onto the step 409 with the result that the idler wheel 101 is moved into engagement with the 45 r.p.m. step 152 on the turret 96. In this connection it will be understood that the flange 410 on the cycling slide 161 is moved away from the edge 411 on the speed control slide 400 after the midpoint of the record changing cycle so that the speed control slide 400 is free to move to the 45 r.p.m. position shown in FIG. 10 when the tone arm is position for a seven inch record in the manner described above. It will also be understood that the reset wheel 380 again functions during the single revolution thereof to pivot the bell crank 104 so that the idler wheel 101 is permitted to move outwardly and downwardly to the 45 r.p.m. step 152.

In order to permit playing of all sizes of 78 r.p.m. records in intermixed sequence, there is provided means responsive to movement of the needle selecting arm 69 to the 78 r.p.m. needle position for automatically adjusting the speed of the turntable 51 to 78 r.p.m. at the end of the record changing cycle. More particularly, it will be recalled that the 78 r.p.m. speed indexing rod 70 (FIG. 4) is positioned in the path of movement of the end 85 of the needle selecting arm 69 when the arm 69 is in the 78 r.p.m. needle position so that the rod 70 is moved outwardly as the tone arm 52 moves to its extreme outward position. The bracket 71 which supports the indexing rod 70 is pivotally mounted on the base plate 50 by means of the pivot pin 420 (FIG. 3) and a flexible control rod 421 is secured to the end of the bracket 71 adjacent the pivot 420 and extends transversely across the cycling slide 161 and the speed control slide 400. The lever 71 and the control rod 421 thus form a bell crank so that movement of the control rod 70 away from the spindle 56 causes the end of the rod 421 to move along the speed control slide 400 toward the spindle 56 and in a direction generally parallel to the slide 400. The bracket 71 is normally biased against the edge 422 of the opening 72 in the member 62 so that the speed indexing rod 70 is normally held in the position shown in FIG. 3. In this connection it will be understood when the rod 70 is in the position shown in FIG. 3 and the needle selecting arm 69 is in the 33⅓ and 45 r.p.m. needle position the hub portion 77 (FIG. 4) thereof does not strike the rod 70 in the extreme outward position of the tone arm 52 so that the rod 70 is not moved when playing 33⅓ r.p.m. and 45 r.p.m. records.

When the needle selecting arm 69 is in the 78 r.p.m. needle position there is provided means responsive to outward movement of the control rod 70 for moving the speed control slide rearwardly so as to remove the stepped portion 408, 409 thereof from the path of the hub 105 and permit this hub to drop downwardly to the position shown in FIG. 11 in which position the idler wheel 101 engages the 78 r.p.m. step 153 on the turret 96. More particularly, the portion 415 of the speed control slide 400 is provided with an upwardly extending inclined portion 425 which terminates in the abrupt shoulder 426. The control wire 421 is normally positioned so that the tip thereof rests on the inclined portion 425 just slightly behind the shoulder 426 so that as the speed control slide 400 is moved forwardly by the flange 410 to the 33⅓ r.p.m. position and is moved rearwardly by engagement of the end portion 341 with the offset flange 417 to the 45 r.p.m. position the tip of the control rod 421 rides up and down the inclined portion 425 on the speed control slide 400. Accordingly, the control rod 421 does not interfere with movement of the speed control slide 400 to the 33⅓ r.p.m. and 45 r.p.m. positions in the manner described above when microgroove records are being played. However, when the needle selecting arm 69 is moved to the 78 r.p.m. needle position the rod 70 is struck by the arm 69 at substantially the midpoint of the record changing cycle, i.e., when the tone arm 52 is moved to its extreme outward position, at which time the end of the rod 421 moves forwardly along the speed slide 400 and drops down in front of the shoulder 426 to the position shown in dotted lines at 427 in FIG. 6. As the tone arm 52 moves back to the edge of the record the bracket 71 is biased back against the edge 422 by means of the spring 318 so that the end of the control rod 421 moves the speed control slide rearwardly to the 78 r.p.m. position shown in FIG. 11. However, the tip of the rod 421 remains in front of the shoulder 426, and is flexed slightly since its normal position is slightly behind the shoulder 426.

In order to unhook the tip of the control rod 421 from the shoulder 426, there is provided an upstanding flange 430 (FIG. 6) on the cycling slide 161 having an inclined edge portion 431 thereon. When the cycling slide 161 is in its rest position during the playing cycle, the tip of the control rod 421 rests on the upper edge of the flange 430 as shown in FIG. 3. However, when the cycling slide 161 is moved forwardly the inclined portion 431 of the flange 430 is moved ahead of the shoulder 426 on the speed control slide 400, as best illustrated in FIG. 5, so as to permit the tip of the control rod 421 to be moved into engagement with the shoulder 426 in the manner described above when the rod 70 detects a 78 r.p.m. needle position. As the cycling slide 161 returns to its rest position the rod 421 moves the speed control slide 400 back to the 78 r.p.m. position shown in FIG. 11 and since the spring 318 continually exerts a biasing force tending to move the tip of the rod rearwardly the speed control slide 400 and the cycling slide 161 move rearwardly as a unit until the 78 r.p.m. position of the slide 400 is reached. However, in this position the screws 403 and 404 are positioned at the ends of the slots 405 and 406 so that further rearward movement of the slide 400 is prevented with the result that the inclined portion 431 on the flange 430 continues to move rearwardly and cams the tip of the control rod 421 upwardly above the edge of the shoulder 426. When the tip of the control rod 421 is thus unhooked from the shoulder 426 it returns to its unstressed position shown in FIG. 3 in which it is positioned slightly behind the shoulder 426 so as not to interfere with movement of the speed control slide 400 unless the control rod 70 is again engaged by the tone arm, thereby indicating that another 78 r.p.m. record is to be played. In this connection it will be understood that the end portion 432 of the flange 430 does not extend upwardly by an amount sufficient to interfere with movement of the control rod 421 and the portion 432 is provided primarily to strengthen the extension 336 on the cycling slide 161. It will be noted that when the speed control slide 400 is moved rearwardly to the 78 r.p.m. position in the manner described above, the forward edge 435 (FIG. 10) thereof is moved clear of the hub 105 so as to permit the hub 105 to drop downwardly on the post 106 until the hub 105 engages the flat end portion 436 on the flange 375 in which position the idler 101 is held in engagement with the 78 r.p.m. step 153 on the turret 96. It will also be noted that the 78 r.p.m. speed indexing rod 70 only functions to move the speed control slide 400 during the actual record changing cycle. Thus, if the rod 70 is moved while a record is being played, the rod 70 would have no effect since the control rod 421 cannot engage the shoulder 426 due to the upturned flange 430 which holds the tip of the control rod 421 above the shoulder 426.

Last record shut-off mechanism

Considering in more detail the last record shut-off mechanism of the present invention, it will be recalled from the general description of the changer that means are provided responsive to dropping of the hold-down arm 53 when the last record is released onto the turntable 52 for lowering the tone arm 52 onto the rest 65 and shutting off the electrical power to the motor 91 so that the machine is turned off. In addition, the driving gears are disengaged so as to prevent flats from forming on the edges thereof by continued pressure when the machine is not in use. It will also be recalled that the machine may be again placed in operation by merely depressing the operate button 67.

Considering first the manner in which movement of the hold-down arm 53 is employed to position the tone arm 52 on the rest 65, the hold-down arm 53 is supported on the end of a post 440 which is rotatably mounted in an end flange 441 and an intermediate flange 442 of the housing member 54. The post 440 is provided with a projecting pin 443 which is adapted to engage the underside of the flange 441 to limit the maximum upward movement of the hold-down arm 53 and a locating pin 444 on the post 440 is adapted to pass through a slot 445 in the end flange 441 (FIG. 4) so that the hold-down arm 53 may be moved outwardly beyond the edge of the largest record when the pin 444 rests on the upper surface of the end flange 441. After the records are loaded onto the spindle 56 the hold-down arm 53 is moved inwardly until the notch portion 446 in the free end thereof strikes the spindle 56 at which point the pin 444 is positioned over the slot 445 so that the hold-down arm 53 drops down onto the topmost record supported on the spindle 56. In this connection it will be understood that the hold-down arm 53 performs the function of holding the record stack substantially horizontal on the spindle 56 while the bottommost record of the stack is being released to the turntable 52.

When playing of the next to last record is completed, a record changing cycle is initiated in the manner described above and at substantially the mid-point of this record changing cycle the record supporting shelves 200 are withdrawn so that the last record is dropped onto the turntable 52. When this occurs the base portion 448 of the hold-down arm 53 rests on the top surface of the end flange 441, as shown in FIG. 14. Assuming that a seven inch record is the last record to be dropped to the turntable, the size indexing finger 55 remains in the position shown in full lines in FIG. 12 so that the curved indexing cam 340 is held in the position shown in FIG. 14 by engagement of the end of the rod 332 with the edge of the flange portion 352 on the curved cam 340. When the hold-down arm 53 drops onto the end flange 441 after the last record is released, the end of the post 440 moves downwardly by an amount sufficient to depress the shut-off spring 338 to the position shown in FIG. 14. However, it will be noted that the end of the rod 440 does not rest upon the flange portion 350 of the curved cam 340 so that the weight of the rod 440 is not borne by the curved cam 340 and sideward movement of the cam 340 is not impeded. In this connection it will be understood that if a ten inch or twelve inch record is the last record to be released to the turntable 52 the curved cam 340 occupies one of the positions shown respectively in FIG. 8 and FIG. 9, in both of which positions the end of the post 440 engages the shut-off spring 338 and depresses the same to substantially the same extent as shown in FIG. 14.

As the cycling slide 161 returns to its rest position during the last half on the next to last record changing cycle, the lug portion 354 on the cycling slide 161 strikes the curved cam 340 and moves it against the member 54, i.e., to the position shown in FIG. 15. When the cam 340 is thus moved against the side of the member 54 the shut-off spring 338 is moved away from the end of the post 440 so that it is released and springs upwardly between the end of the post 440 and the housing member 54, as shown in FIG. 15. When the shut-off spring 338 moves upwardly inside the end of the post 440 to the position shown in FIG. 15 the curved cam 340 is thereafter prevented from moving away from the housing member 54 so that the curved cam 340 is locked in the extreme position in which the cam 340 is positioned against the housing member 54. After playing of the last record is completed, the last record changing cycle is initiated and the cycling slide 161 is moved forwardly in the manner described above. As the cycling slide 161 moves forward the lug portion 354 thereof moves away from the curved cam 340. However, the curved cam remains in the position shown in FIG. 15 by virtue of the fact that the edge of the shut-off spring 338 strikes the end of the post 440 so that the curved cam 340 is not permitted to move to a seven inch, ten inch or twelve inch playing position.

In order to restrain the tone arm 52 in such position that it may be lowered to the rest 65 during the last record changing cycle, an offset upstanding flange 450 is provided on the curved cam 340 which is provided with an inclined upper edge 451. When the curved cam 340 is in the seven inch record indexing position shown in FIG. 14, the ten inch record indexing position shown in FIG. 8 or the twelve inch record indexing position shown in FIG. 9, the inclined end portion 341 on the tone arm indexing lever 263 engages the edge of the curved cam 340 in such position that the indexing lever 263 moves over the top edge of the upstanding flange 450 without striking the same. However, when the curved cam 340 is held in the position shown in FIG. 15 during the last record changing cycle the indexing lever 263 first rides up over the inclined upper edge 451 of the flange 450 as the tone arm is moved to its extreme outward position, and, as the tone arm is thereafter moved inwardly, the indexing lever 263 moves along the edge of the curved cam 340 until it engages the edge of the upstanding flange 450 (FIG. 23) and is restrained from further movement thereby. When the tone arm indexing lever 263 strikes the flange 450 the tone arm 52 is positioned over the rest 65 so that as the record changing cycle is completed and the elevating rod 238 is lowered the tone arm 52 is seated on the rest 65. Preferably, the tone arm is provided with an undercut portion which engages the rest 65 so that the tone arm 52 is prevented from moving inwardly until it is released from the rest 65 by upward movement of the tone arm. In this connection it will be understood that the upstanding flange 450 does not interfere with movement of the indexing lever 263 during record changing cycles other than the last record changing cycle, even though the curved cam 340 is moved against the member 54 at the end of each record changing cycle, for the reason that the indexing lever 263 is moved to one of the size indexing positions, i.e., engagement with one of the edges 358, 359, or 361 shortly after the mid-point of the record changing cycle and well before the curved cam 340 is moved against the member 54 by the lug 354 on the cycling slide 161. It will also be noted that movement of the indexing lever 263 is not impeded by the flange 450 as the tone arm is moved outwardly due to the inclined upper edge 451 of the flange 450.

In order to turn off the machine at the end of the last record changing cycle, there is provided means responsive to holding of the tone arm 52 in the rest position for de-energizing the motor 91. More particularly, a flexible control wire 455 (FIG. 23) is pivotally secured at one end thereof to the hub portion 108 of the bell crank 104 and extends loosely through an aperture in the flange portion 456 of the end flange 313 which is secured to the base plate 50. The intermediate portion of the control wire 455 is positioned beneath a right angle pin 457 secured to the base plate 50 and the free end of the control wire 455 is provided with a notch portion 458 (FIG. 4) and terminates in an inclined end portion 459. The tone arm mounting bracket 233 is provided with a transversely extending locking arm 460 the end portion of which is adapted to engage the notch 458 of the control wire 455 during the last record changing cycle as will be described in more detail immediately hereinafter. The control wire 455 is provided with an offset portion 461 (FIG. 4) to permit the control wire 455 to clear the flange 375 on the cycling slide 161.

In order to de-energize the motor 91, a pair of flat switch blades 465 and 466 (FIGS. 23 and 24) are mounted on the upturned flange 191 of the base plate 50 by means of suitable insulating spacers, so that the switch members 465 and 466 are insulated from the base plate 50 and from each other. A flexible cam plate 467 is also mounted on the flange 191 in insulated relation to the switch members 465 and 466 and the cam plate 467 is connected to the switch member 466 by means of the insulating member 468. The switch memmbers 465 and 466 are provided with the cooperating contacts 469 and 470 thereon which are closed when the cam plate 467 is in its unflexed position shown in FIG. 23. The switch members 465 and 466 may be connected by suitable lead wires 471 and 472 in series with a suitable power source to the motor 91 so that when the contacts 469 and 470 are closed power is applied to the motor 91 and when these contacts are open the motor is deenergized, as will be readily understood by those skilled in the art.

It will be recalled that during each record changing cycle the reset wheel 380 is given a single revolution by engagement with the motor drive shaft 94 at substantially the end of the record changing cycle. During this single revolution of the reset wheel 380 the bell crank 104 is pivoted on the post 106 with the result that the control wire 455, which is pivotally mounted on the hub 108 of the bell crank 104, is correspondingly reciprocated. However, at substantially the end of a normal record changing cycle the tone arm has already been positioned over the run-in groove of the next record so that the locking arm 460 on the tone arm mounting bracket 233 is positioned inside of and does not engage the notch 458 in the control wire 455. It will also be understood that during a record changing cycle other than the last record changing cycle, the tone arm mounting bracket 233 is moved upwardly as the elevating rod 238 is raised so that the locking arm 460 is moved above the edge of the notch 458 in the control wire 455 and the arm 460 moves over the upper end of the control wire 455 without striking the same as the tone arm is moved to its outermost position and is then moved inwardly to engage the run-in groove of a record during the normal record changing cycle.

During the last record changing cycle the tone arm is restrained at the rest position by engagement of the indexing lever 263 with the edge of the flange 450. Accordingly, when the tone arm is lowered onto the rest 65 the locking arm 460 is also lowered into engagement with the inclined end portion 459 of the control wire 455, and, when the bell crank 104 is pivoted by the reset wheel 380 at substantially the end of the last record changing cycle, the control wire 455 is moved outwardly so that the inclined end portion thereof rides under the outer end of the locking arm 460 until the notch 458 is positioned behind the locking arm 460 in the manner shown in FIG. 23. Since the tone arm 52 is prevented from moving inwardly by engagement with the rest 65 the locking arm 460 functions to hold the control wire 455, and hence the bell crank 104, in the position shown in FIG. 23 as the reset wheel 380 completes its revolution. With the bell crank 104 held in the position shown in FIG. 23, the reset wheel 380 continues to rotate the end portion 385 of the connecting link 383, engages the curved end portion 475 of the cam plate 467 and moves the cam plate 467 outwardly to the position shown in FIG. 24 in which position the switch contacts 469 and 470 are opened so that the power circuit to the motor 91 is broken and the machine is de-energized. It will be noted that the end 385 of the connecting link 383 cams the plate 467 outwardly only when the bell crank 104 is held in the locked position shown in FIG. 23 so that the switch contacts 469 and 470 are not opened during a record changing cycle other than the last record changing cycle. Thus, if the bell crank 104 is pivoted back by the spring 109 as the reset wheel 380 continues to move from the position shown in FIG. 23, the arm 384 of the bell crank 104 is moved outwardly so as to displace the end 385 of the connecting link 383 laterally away from the curved end portion 475 of the cam plate 467 so that the end 385 does not strike the cam 467 during the remaining of the reset wheel rotation, as will be evident from FIG. 3 which shows the bell crank 104 in the 78 r.p.m. position.

In order to move the idler wheel 101 and the turret 96 to a neutral position when the motor 91 is de-energized so that flats are not produced on the peripheries of these members, if the machine is left idle for a considerable length of time an upstanding flange 476 (FIGS. 5 and 6) is provided on one end of the bell crank lever 97 which supports the multi-step turret 96. Accordingly, when the bell crank 104 is pivoted by the reset wheel 380 to the position shown in FIG. 23, the curved edge portion 477 of the lever 103 which supports the idler wheel 101, engages the edge of the flange 476 and pivots the bell crank 97 so that the turret 96 is moved out of engagement with the motor drive shaft 94 to the position shown in FIG. 23. Also, when the bell crank 104 is pivoted to the position shown in FIG. 23, the idler 101 is moved out of engagement with the rim 120 of the drive wheel 90 and is also moved out of engagement with the steps of the turret 96 so that no flats are produced on the peripheries of either the turret 96 or the idler 101 when the machine is shut off. In this connection it will be understood that the members 96 and 101 are momentarily moved to the above described neutral position during each record changing cycle as the reset wheel 380 moves through the position shown in FIG. 23, although the members 96 and 101 do not remain in the neutral position since the control wire 455 is not locked during a normal record changing cycle but instead the spring 109 moves the idler 101 back into engagement with one of the steps on the turret 96 while at the same time the turret 96 is moved back into engagement with the motor drive shaft 94. It will also be noted that during this momentary neutral position of the members 96 and 101 the machine remains operatively driven through engagement of the drive shaft 94 with the reset wheel 380 so that power is continuously applied throughout the normal record changing cycle.

If the operator wishes to turn off the machine manually during a particular playing cycle, he merely lifts the tone arm 52 off the record and seats it on the rest 65. As the tone arm 52 is moved outwardly to the rest 65 the locking arm 460 engages the notch 458 and moves the control wire 455 outwardly so that the bell crank 104 is pivoted to the position shown in FIGS. 23 and 24, and is held in this position. Since the reset wheel normally occupies the position shown in FIG. 24, the end 385 of the connecting link 383 is moved laterally against the curved end portion 475 of the cam plate 467 as the bell crank 104 is pivoted so that the switch contacts 469 and 470 are opened and the motor 91 is de-energized in the manner described above. In this connection it will be understood that during the playing cycle the tone arm mounting bracket 233 is positioned relatively close to the base plate 50, as shown, for example, in FIG. 16, so that the locking arm 460 can engage the notch 458, whereas during the record changing cycle the tone arm mounting bracket 233 is elevated to the position shown in FIG. 17 during movement of the tone arm so that the locking arm passes above the top edge of the notch 458 during the normal record changing cycle.

In order to place the record changer in operation again after it has been shut off by the above described automatic shut-off mechanism, there is provided means responsive to depression of the operate button 67 for releasing the control wire 455 from engagement with the locking arm 460. More particularly, a transversely extending release rod 480 (FIG. 23) is connected at one end thereof to the rod 311 and is provided with a right angle end portion 481 which extends over the end portion of the control wire 455. In the normal position of the operate button 67, the end portion 481 of the release rod 480 is positioned well above the inclined end portion 459 of the control wire 455, so that the end portion 481 does not interfere with the above described operations during the shut-off cycle. However, when the button 67 is depressed the rod 311 is rotated so that the end portion 481 is moved downwardly against the inclined end portion 459 of the control wire 455 and moves the notch portion 458 thereof down and out of engagement with the edge of the locking arm 460. As soon as the notch 458 is unhooked from the locking arm 460 the spring 109 functions to pivot the bell crank 104 so that the contacts 469 and 470 are closed and the idler wheel 101 and turret 96 are returned to their driving positions. At the same time that the end 481 moves downwardly to release the control wire 455, the end 316 (FIG. 21) of the reject control wire 315 moves upwardly against the trip arm 183 so that the trip arm 183 is moved to the position shown in FIG. 22 and a record changing cycle is initiated in the manner described above. It will therefore be evident that the motor 91 is again energized, the turret 96 and idler 101 are returned to their driving positions, and a new record changing cycle is initiated merely by depressing the operate button 67 after the machine has been turned off.

The rest 65 positions the tone arm 52 at a point somewhat inside the maximum outward position of the tone arm 52. Accordingly, when the record changing cycle is initiated in the manner described above, by depressing the operate button 67, after the machine has been turned off the tone arm is first raised upwardly as the elevating rod 238 moves up the incline 162, and, when the flange 256 on the cycling slide 161 has moved forwardly by an amount sufficient to align the levers 257 and 255, the tongue 248 engages the notch 250 on the fan portion 249 of the tone arm return bracket 240 so that the tone arm is thereafter driven from the cycling slide 161. As the cycling slide continues to move forward the tone arm 52 is moved outwardly beyond the position of the rest 65. Accordingly, if the needle selecting arm 69 is in the 78 r.p.m. needle position the 78 r.p.m. speed indexing rod 70 is struck in the manner described above during the first record changing cycle so that the above described automatic speed changing mechanism is fully operative during the first record changing cycle to shift the speed of the turntable 51 to 78 r.p.m. at the end of the first record changing cycle if a 78 r.p.m. record is detected. In this connection it will be understood that the rest 65 is of sufficient height so that when the tone arm 52 is resting thereon the tongue 248 does not engage the notch 250 so that the tone arm 52 is not initially connected to the tone arm return bracket 240. Accordingly, when the first record changing cycle is initiated in the manner described above by depressing the operate button 67, the lug portion 354 on the cycling slide 161 moves forwardly so as to permit the cam 340 to move sidewise and cam the end portion 341 upwardly so that the indexing lever 263 is lifted above the edge of the flange 450, with the result that the tone arm return lever 257 is immediately snapped back to the seven inch position by the spring 267 since the flange 256 has not moved forwardly by an amount sufficient to prevent this movement. However, since the tongue 248 and notch 250 are not engaged the snap movement of the lever 257 does not operate to move the tone arm inwardly since the tone arm 52 is not connected to the tone arm return lever 257 until the flange 256 registers the levers 257 and 255 at a point just before the mid-point of the record changing cycle. Accordingly, with this arrangement the tone arm is merely lifted off of the rest 65 and remains in that position until the levers 255 and 257 are aligned, at which time the tone arm is moved outward slightly so as to permit the arm 69 to engage and move the rod 70 if a 78 r.p.m. record is to be played.

In connection with the above described shut-off action of the reset wheel 380 at substantially the end of the last record changing cycle, it will be noted that the cam plate 467 is cammed outwardly by the connecting link 383 during a small fraction of one revolution of the reset wheel and the reset wheel is driven at high speed from the motor drive shaft 94 so that the switch contacts 469 and 470 are opened very quickly. Accordingly, the arrangement of the present invention permits the use of the simple and inexpensive switch blades 465 and 466 while providing an arrangement which opens the switch contacts quickly so that arcing is avoided and Underwriters' specifications are met. In this connection it will be understood that in conventional record changers a toggle action shut-off switch, which is quite expensive, is required to meet Underwriters' specification for minimum arcing.

45 r.p.m. slip-on spindle arrangement

It will be recalled from the above description of the record changer in FIGS. 1 to 24, inclusive, that the changer described in connection therewith is arranged to play 45 r.p.m. records, which conventionally have large spindle apertures, with suitable inserts which are provided with apertures which fit the standard centering spindle 56. In conventional record changers these large centering aperture 45 r.p.m. records are played without inserts by employing a so-called slip-on spindle which fits over the standard centering spindle and is actuated by the moving parts of the standard centering spindle so that large aperture 45 r.p.m. records are supported on the slip-on spindle and may be released one at a time to the turntable during successive record changing cycles. In the event that it is desired to play 45 r.p.m. records without employing inserts for these records, the record changer of the present invention may be modified as shown in FIGS. 25 to 27, inclusive, so that a standard 45 r.p.m. slip-on spindle may be used to play 45 r.p.m. records without inserts and means are provided for automatically adjusting the speed of the turntable 51 to 45 r.p.m. during periods when the slip-on spindle is in use.

Referring now more particularly to FIGS. 25 to 27, inclusive, it is pointed out that the record changer embodiment shown therein is identical in many respects to the record changer shown and described in detail above in connection with FIGS. 1 to 24, inclusive, and corresponding parts of these embodiments have been given the same reference numerals. However, in the embodiment in FIGS. 25 to 27, inclusive, the turntable 51 is provided with an aperture 500 which is adapted to receive a downwardly extending pin 501 on a 45 r.p.m. slip-on spindle indicated generally at 502 when the spindle 502 is positioned on the turntable 51. In this connection it will be understood that the centering spindle 503 of the embodiment shown in FIGS. 25 to 27, inclusive, is of the conventional type which will support standard aperture records thereon and release the same to the turntable 51 during successive record changing cycles upon movement of the shaft 504 thereof under the control of the bell crank lever 205 (FIG. 16), while at the same time cooperating with the slip-on spindle 502 so that large aperture 45 r.p.m. records may be supported on the spindle 502 and may be released to the turntable 51 upon movement of the shaft 504, as will be readily understood by those skilled in the art. In the embodiment shown in FIGS. 25 to 27, inclusive, the spoke 118 of the drive wheel 90 is provided with a pair of upstanding flanges 505 and 506 at a point intermediate the length thereof and a flat lever 507 is supported between the flanges 505 and 506 by means of the pin 508 and extend generally parallel to the spoke 118. One end of the lever 507 is provided with an annular end portion 509 which is positioned about the bearing 145 of the turntable 51 and is adapted to be engaged by the pin 501 when the slip-on spindle 502 is positioned on the turntable 51. When the pin 501 engages the annular portion 509, the lever 507 is moved to the position shown in full lines in FIG. 26. However, when the slip-on spindle 502 is removed the outer end of the lever 507 tilts downwardly of its own weight so that the annular end portion 509 thereof tilts upwardly to the position shown in dotted lines at 510 in FIG. 26. The outer end of the lever 507 is provided with a downwardly extending portion 511 and an outwardly extending end portion 512 which are positioned beyond the rim 120 of the drive wheel 90.

In order to control the position of the speed control slide 400 in accordance with the position of the lever 507 so that the speed control slide 400 is automatically moved to the 45 r.p.m. position during periods when the slip-on spindle 502 is positioned on the turntable 51, an extension arm 515 is secured to the transverse portion 516 of the speed control slide 400. The arm 515 has an upstanding portion 517, FIG. 27, which terminates in an offset portion 518 which is positioned in the path of the end portion 512 of the lever 507.

When standard centering apertures records are being played and the slip-on spindle 502 is not positioned on the turntable 51, the outer end of the lever 507 is tilted downwardly so that the end portion 512 occupies the position shown in dotted lines at 520 in FIGS. 26 and 27. When the end portion 512 is in the position 520 it passes beneath the right angle extension 518 of the arm 515 as the drive wheel 90 rotates so that it does not strike the extension 518 during playing cycles or record changing cycles. Accordingly, when a record changing cycle is initiated for a standard centering aperture record, the speed slide 400 is moved forwardly to the position shown in dotted lines at 521 in FIG. 25 by engagement of the flange 410 on the cycling slide 161 with the edge 411 of the speed control slide 400 in the manner described in detail above. It will be noted that when the speed control slide 400 is moved to the position 521 the extension arm 518 also moves forwardly to the position shown in dotted lines at 522 in FIG. 25. However, in this position the tip of the extension arm 518 is positioned beyond the downturned portion 511 of the lever 507 so that no portion of the lever 507 strikes the arm 518 as the drive wheel 90 is rotated. The speed control slide 400 is then positioned in accordance with the playing speed of the released record in the manner described in detail above and lever 507 does not interfere with such speed selection since the end portion 512 occupies the position shown in dotted lines at 520 in FIG. 26 and rides under the extension arm 518.

When it is desired to play large centering aperture records, the slip-on spindle 502 is positioned on the turntable 51 so that the pin 501 engages the annular portion 509 of the lever 507 and depresses this lever to the position shown in full lines in FIG. 26. When this occurs the end portion 512 of the lever 507 is moved upwardly into the path of the extension arm 518 on the speed control slide 400. Accordingly, as soon as the drive wheel 90 is rotated one revolution the end portion 512 strikes the extension arm 518 and moves the speed control slide 400 rearwardly to the 45 r.p.m. position shown in full lines in FIGS. 25 and 26. Preferably, the forward end of the speed control slide 400 is provided with an inclined edge 525 which connects the 33⅓ r.p.m. seat 408 with the 45 r.p.m. seat 409 so that as the hub portion 105 of the bellcrank 104 moves downwardly on the post 106 it strikes the inclined edge 525 and moves the speed control slide 400 slightly rearwardly so that the end portion 512 of the lever 507 does not "tick" the extension arm 518 as the drive wheel 90 continues to rotate during the succeeding playing cycle. In this connection it will be understood that movement of the speed control slide 400 rearwardly by engagement of the end portion 512 with the extension arm 518 is synchronized with the movement of the cycling slide 161 due to the fact that the lever 507 is supported on the drive wheel 90 which also carries the connecting pin 160 which drives the cycling slide 161. Accordingly, when the record changing cycle is initiated the flange 410 engages the edge 411 of the speed control slide 400 and moves it forwardly during the first half of the record changing cycle. However, during this interval the lever 507, which is positioned approximately one hundred and twenty degrees ahead of the connecting pin 160 has not yet engaged the speed control slide 400. As the drive wheel 90 continues to rotate, the flange 410 is moved back away from the edge 411 so as to permit the speed control slide 400 to be struck by the end portion 512 and moved to the 45 r.p.m. position during the last half of the record changing cycle. It will also be understood that the machine is normally turned off when the slip-on spindle 502 is first positioned on the turntable 51 so that the machine is normally turned on by initiation of a record changing cycle. However, it will be understood that if the slip-on spindle 502 is positioned on the turntable 51 and a record changing cycle is not immediately initiated, the mechanism is not jammed since the speed control slide 400 is free to move during the playing cycle and the end portion 512 strikes the extension arm 518 and moves the slide 400 to the 45 r.p.m. position. If the slide 400 is in the 78 r.p.m. position, when the slip-on spindle is positioned on the turntable the end portion 512, of course, does not engage the extension arm 518. However, during the next record changing cycle the slide 400 is again moved forwardly to the 33⅓ r.p.m. position in the manner described above and is then moved rearwardly to the 45 r.p.m. position by the end portion 512. When the slip-on spindle 502 is removed, the end portion 512 drops down below the extension arm 518 so that the machine operates in the manner described in detail above to adjust the speed of the turntable 51 automatically in accordance with the playing speed of the released record. It will be noted that the pin 501 on the slip-on spindle 502 engages the annular portion 509 and maintains the lever 507 in the position shown in full lines in FIG. 26 even though relative movement between the turntable 51 and the drive wheel 90 occurs. Thus, during successive record changing cycles, when the drive wheel 90 is slowed down to 16⅔ r.p.m. in the manner described above during the record changing cycle the pin 501 rides on the annular surface 509 as the turntable 51 coasts so that the lever 507 is maintained in the correct position for 45 r.p.m. speed indexing.

When the slip-on spindle 502 is positioned on the turntable 51 the speed of the turntable is automatically adjusted to 45 r.p.m. for all sizes of records if the needle arm 69 is set at the microgroove position. This will be readily apparent when it is realized that the size indexing finger 55 and its associated indexing mechanism functions independently of the above described automatic speed control mechanism to position the tone arm 52 for different sizes of records. In this connection it will be recalled that the end of the inclined portion 341 of the tone arm indexing lever 263 normally engages the offset flange 417 on the speed control slide 400 when a seven inch record is played and moves the speed control slide 400 rearwardly to the 45 r.p.m. position in the manner described in detail above. However, when the slip-on spindle 502 is employed, the end portion 512 strikes the extension arm 518 and moves the slide 400 rearwardly to the 45 r.p.m. position before the indexing lever 263 has a chance to engage the offset flange 417 so that the lever 263 is positioned adjacent the flange 417 in the seven inch position. It will also be understood that if only seven inch 45 r.p.m. records are to be played, the embodiment shown in FIGS. 1 to 24, inclusive, will operate satisfactorily with the correct combination of centering spindle and 45 r.p.m. slip-on spindle since the speed of the turntable 51 is automatically adjusted to 45 r.p.m. for seven inch records in this embodiment and the only modification is that of providing suitably actuated means for supporting and releasing the large centering aperture records to the turntable. However, the embodiment shown in FIGS. 25 to 27, inclusive, is adapted to play 45 r.p.m. records of all three sizes in the event that ten and twelve inch 45 r.p.m. records are put on the market at some later date.

In the event that it is desired to provide a record changer which will play all three sizes of 33⅓ r.p.m. records in intermixed sequence or all three sizes of 45 r.p.m. records in intermixed sequence or all three sizes of 78 r.p.m. records in intermixed sequence without requiring manual speed adjustments on the part of the operator, it is merely necessary to eliminate the offset flange 417 on the speed control slide 400 in the embodiment shown in FIGS. 25 to 27, inclusive. When the flange 417 is eliminated the speed of the turntable 51 is automatically adjusted to 33⅓ r.p.m. when a standard centering aperture record is positioned on the spindle 503 and the needle selecting arm 69 is in the microgroove needle position. On the other hand, the speed of the turntable 51 will automatically be adjusted to 45 r.p.m. when the slip-on spindle 502 is positioned on the turntable 51 and 45 r.p.m. records of all sizes are played, provided the needle selecting arm 69 is in the microgroove needle position. Furthermore, standard centering aperture 78 r.p.m. records of all three sizes may be positioned on the spindle 503 and played in intermixed sequence and the speed of the turntable 51 will automatically be adjusted to 78 r.p.m. when the needle selecting arm 69 is in the 78 r.p.m. needle position. It will, therefore, be evident that the present invention provides an arrangement whereby the speed of the turntable 51 is automatically adjusted in accordance with the size of the centering aperture of the records to be played and will play all three sizes of the selected record type in intermixed sequence. Furthermore, no adjustments on the part of the operator are required to change from large centering aperture records to small centering aperture records other than the normal operation of positioning the slip-on spindle over the standard spindle 503 and positioning the pin 501 within the aperturer 500 in the turntable 51. In this connection it will be understood that if it is desired to provide a record changer which will play only 33⅓ r.p.m. records of all three sizes and 45 r.p.m. records of all three sizes the embodiment shown in FIGS. 25 to 27, inclusive, may be considerably simplified by eliminating all of the 78 r.p.m. speed indexing mechanism and the offset flange 417. Furthermore, the separate drive wheel 90 may be eliminated if an inexpensive machine is desired and a certain amount of wear can be tolerated in the idler wheel 101 when the turntable is slowed down to 16⅔ r.p.m. during record changing cycles. If the drive wheel 90 is eliminated the lever 507 would be pivotally secured to the underside of the turntable 51, the idler wheel 101 would engage the rim 147 of the turntable 51, and the connecting pin 160 would also be secured to the underside of the turntable 51 so that the record changing mechanism would function in a manner identical to that described in detail above in connection with FIGS. 1 to 24, inclusive, with the exception that the coasting feature of the turntable 51 would not be provided. In this connection it will also be understood that the drive wheel 90 may also be eliminated in the three-speed record changer embodiment. However, when 78 r.p.m. records are played and the turntable is slowed down from 78 r.p.m. to 16⅔ r.p.m. during record changing cycles, considerable wear on the driving gears may be experienced and the mass of the turntable 51 and records thereon may cause the record changing cycle to be considerably faster than if the drive wheel 90 is used.

The speed control slide 400 may also be adjusted automatically to the 45 r.p.m. position when 45 r.p.m. large aperture records are to be played by means of the alternative embodiment shown in FIGS. 28 to 30, inclusive. In the embodiment shown in these figures substantially all of the elements are identical to those described in detail above in connection with the record changer figures 1 to 24, inclusive, and corresponding reference numerals have been employed in connection therewith. However, in the embodiment shown in FIGS. 28 to 30, inclusive, the width of the record changer is increased slightly to provide room for a well which is adapted to receive a conventional 45 r.p.m. slip-on spindle when the spindle is not in use. More particularly, a cover plate 533 is pivotally secured to the top cover plate 64 of the record changer by means of the hinge 535 and is normally biased to the closed position by means of the spring 536a. Immediately below the cover plate 533 the base plate 50 is provided with an opening 537 therein and a bracket 536 is secured to the underside of the base plate 50 so as to define a well which is adapted to receive the 45 r.p.m. slip-on spindle 502 when the cover plate 533 is depressed, as is best illustrated in FIG. 30. When the slip-on spindle 502 is removed from the above described well, the cover 533 moves upwardly to the position shown in FIG. 29 due to the biasing force of the spring 536a.

In order to provide means responsive to selection of the slip-on spindle 502 by the operator and removal thereof from the spindle receiving well for automatically adjusting the speed control slide 400 to 45 r.p.m. position, there is provided a right angle bracket 538 which is positioned on the base plate 50 and is provided with a horizontal end portion 539 which is positioned above the upper edge of the speed control slide 400. A control arm 540 is slidably mounted on the upper surface of the extension 539 by means of the pins 541 and 542 which are positioned in the slots 543 and 544 in the control arm 540 so that forward and backward movement of the control arm 540 is limited by the slots 543 and 544. The control arm 540 is provided with a downturned end portion 545 which extends over and is adapted to engage the transverse portion 516 of the speed control slide 400. A spring 546 is connected between an upstanding lug 547 on the end of the control arm 540 and a lug 548 on the underside of the cover plate 533.

When the slip-on spindle 502 is positioned on the bracket 536 so that the cover plate 533 is depressed to the position shown in FIG. 30, the spring 546 is completely slack so that the control arm 540 is free to move in either direction and is not biased by the spring 546. Accordingly, when the first record changing cycle is initiated after slip-on spindle 502 is positioned in the well, the speed control slide 400 is moved forwardly to the 33⅓ r.p.m. position by engagement of the flange 410 thereof with the edge 411 on the slide 400. As the slide 400 moves forwardly to the 33⅓ r.p.m. position shown in dotted lines at 549 in FIG. 28, the control arm 540 is also moved forwardly to the position shown in dotted lines at 550 in FIG. 28 by engagement of the end portion 545 thereof with the transverse portion 516 of the slide 400. Since the spring 546 is slack when the spindle 502 is positioned in the well, the control arm 540 thereafter remains in the position shown in FIG. 30 during successive record changing cycles and has no effect upon the record changing mechanism.

When it is desired to play large aperture 45 r.p.m. records, the spindle 502 is removed from the well so that the cover plate 533 moves upwardly to the position shown in FIG. 29 and covers the opening. When this occurs the spring 546 is tensioned so that it tends to urge the control arm 540 rearwardly. Accordingly, during the next record changing cycle after the spindle 502 is removed from the well, the speed control slide 400 is moved forwardly to the 33⅓ r.p.m. position by engagement of the flange 410 with the edge 411 of the slide 400 and the control arm 540 moving forwardly with the speed control slide 400 so that the spring 546 is further tensioned. During the last half of the record changing cycle, the spring 546 urges the speed control slide 400 rearwardly to the 45 r.p.m. position by engagement of the end portion 545 of the control arm 540 with the transverse portion 516 of the speed control slide 400. In this connection it will be understood that the 45 r.p.m. position of the control arm 540, i.e., the position shown in FIG. 28 in full lines, is determined by the extent of the slots 543 and 544 therein which limit the forward and rearward movement of the control arm 540. Accordingly, once the slip-on spindle 502 has been removed from the well the spring 546 functions to position the speed control slide 400 in the 45 r.p.m. position during each record changing cycle in the manner described above. However, it will be noted that the control arm 540 does not interfere with movement of the speed control slide 400 to the 78 r.p.m. position since such movement is away from the end portion 545 of the control arm 540 and both the members 539 and 540 are positioned above the speed control slide 400 to permit movement thereof to the 78 r.p.m. position.

Since the operator will have to remove the slip-on spindle 502 to play standard centering aperture records, as soon as the spindle 502 is positioned within the well and the cover plate 533 is depressed, the spring 546 is again slackened so that the control arm 540 thereafter exercises no control over the position of the speed control slide 400 and the machine functions in the manner described in detail above in connection with FIGS. 1 to 24, inclusive, in providing automatic speed changing operation. It will also be understood that the embodiment shown in FIGS. 28 to 30, inclusive, may also be modified in the manner described above in connection with the embodiment shown in FIGS. 25 to 27, inclusive, so that automatic speed changing may be made on the basis of the size of the centering aperture for all three sizes of records. Thus, if the flange 417 on the speed control slide 400 is eliminated the embodiment shown in FIGS. 28 to 30, inclusive, will function to adjust the speed of the turntable 51 to 33⅓ r.p.m. for all sizes of standard centering aperture records, when the needle selecting arm 69 is in the microgroove position and will also automatically adjust the turntable speed to 45 r.p.m. for all sizes of large aperture 45 r.p.m. records when the slip on spindle 502 is employed. It will also be understood that the drive wheel 90 may be eliminated in the embodiment shown in FIGS. 28 to 30, inclusive, if desired, as described in detail in connection with the embodiment shown in FIGS. 25 to 27, inclusive.

16⅔ r.p.m. record playing arrangement

In the event that it is desired to play extremely long playing records, such as the 16⅔ r.p.m. records which have been placed on the market only to a very limited extent and are primarily concerned with extended recitations from the Bible and the like, the record changer described in detail above in connection with FIGS. 1 to 24, inclusive, may be readily modified in the manner shown in FIGS. 31 and 32 so that a group of 16⅔ r.p.m. records of all different sizes may be played in intermixed sequence by the operator. The embodiment shown in FIGS. 31 and 32, is substantially identical to the embodiment shown and described in detail in connection with FIGS. 1 to 24, inclusive, with the addition of a 16⅔ r.p.m. control lever 560 which is pivotally mounted on the base plate 50 by means of the pivot pin 561. One end of the lever 560 is provided with an upturned end portion 562 which is of slightly less height than the flange 375 on the cycling slide 161 and is adapted to engage the underside of the arm 107 of the bellcrank 104 in a manner to be described in more detail hereinafter. The outer end of the lever 560 is provided with an upturned portion 563 to which is secured an operating handle 564 which extends through the curved slot 565 in the cover member 58. The lever 560 is urged into engagement with the stop 566 on the base plate 50 by means of the spring 567 when the lever 560 is in the position shown in full lines in FIG. 31 and a projection 568 on the lever 560 is adapted to engage the depression 569 in the base plate 50 so as to hold the lever 560 in the automatic position shown in dotted lines at 570 in FIG. 31 against the force of the spring 567.

During normal operation of the record changer the lever 560 is held in the position shown in dotted lines at 570 in FIG. 31 by engagement of the detent 568 with the depression 569 so that the end portion 562 of the lever 560 is positioned behind the arm 107 of the bellcrank lever 104. When the lever 560 is in this position it has no effect upon the bellcrank 104 and this bellcrank is positioned along the post 106 in the manner described in detail above to provide the desired playing speed. However, when it is desired to play 16⅔ r.p.m. records the handle 564 is moved toward the 16⅔ r.p.m. position until the edge 571 of the upturned end portion 562 of the lever 560 strikes the side of the bellcrank arm 107. In this connection it will be understood that the end 562 of the lever 560 cannot be immediately moved to a position beneath the bellcrank arm 107 for the reason that the bellcrank 104 is positioned below the upper edge of the end portion 562 during a normal playing cycle. However, as soon as the next record changing cycle is initiated, the hub 105 of the bellcrank 104 is cammed upwardly to the top edge of the flange 375 in the manner described in detail above by movement of the cycling slide 161. When this occurs the arm 107 of the bellcrank 104 is moved upwardly by an amount sufficient to permit the end portion 562 of the lever 560 to move under the arm 107 until the lever 560 engages the stop 566 under the bias of the spring 567. Accordingly, as the cyling slide 161 returns to its rest position at the end of the record changing cycle, the flange 375 is removed from beneath the hub 105 so that the bell crank 104 then rests on the upper edge of the end portion 562 of the lever 560. In this position the idler wheel 101 is still adapted to engage the 16⅔ r.p.m. step 150 on the turret 96. It will, therefore, be evident that when the bellcrank 104 is pivoted by the reset wheel 380 at the end of the record changing cycle it will reengage the step 150 on the turret 96 so that the drive wheel 90 is thereafter driven at a speed of 16⅔ r.p.m. for the next playing cycle. Furthermore, the end 562 of the lever 560 will remain beneath the arm 107 of the bellcrank 104 as long as the lever 560 is in the 16⅔ r.p.m. position so that all succeeding records will be played at a speed of 16⅔ r.p.m. It will also be noted that the above described arrangement does not interfere with movement of the speed control slide 400 so that the mechanism controlling this speed slide is not jammed during record changing cycles, although the speed of the turntable is not controlled by the speed control slide 400 when the lever 560 is in the 16⅔ r.p.m. position. This will be readily apparent when it is realized that the speed slide 400 may be moved forward and backward beneath the hub 105 since it is positioned between the post 106 and the end portion 562 of the lever 560.

When it is desired to change to automatic operation, the handle 564 is merely moved to the automatic position in which the detent 568 engages the depression 569 so as to hold the lever 560 in the position shown in dotted lines at 570 in FIG. 31 against the force of the spring 567. When this occurs, support for the bellcrank arm 107 is withdrawn so that the bellcrank hub 105 engages one of the steps at the end of the speed control slide 400, and the speed of the turntable 51 is thereafter automatically adjusted in accordance with the above described operation of the changer during successive record changing cycles. In this connection it will be understood that the handle 564 may be arranged to be detached from the end 563 if desired, so that operators who do not wish to play 16⅔ r.p.m. records will not be bothered by an auxiliary adjustment on the machine and there will be no possibility of improper operation of the machine for higher speed records since the end portion 563 does not extend above the upper cover plate 59. In this connection it will also be understood that any other suitable means may be provided for supporting the bellcrank 104 in the 16⅔ r.p.m. position when 16⅔ r.p.m. records are to be played. For example, the speed control slide 400 may itself be provided with a 16⅔ r.p.m. step portion which extends above the 33⅓ r.p.m. step 408 and is of the correct height to position the idler wheel in engagement with the 16⅔ r.p.m. step 150 on the turret 96, it being understood that suitable means would be provided for biasing the speed control slide 400 to the extreme forward position during each record changing cycle so that the 16⅔ r.p.m. step on the slide 400 would function to position the bellcrank 104 correctly for 16⅔ r.p.m. operation.

Turntable release mechanism

In some instances a situation may arise wherein the tone arm 52 is lowered onto the turntable 51 without a record being positioned on the turntable. In conventional record changers when such a condition occurs, the turntable continues to rotate while the needle engages the rough surface of the turntable so that the needle quickly becomes unusable. In accordance with a further embodiment of the present invention, the turntable 51 is arranged to be released from the driving mechanism at all times except when a record is positioned on the turntable 51 so that the above described situation is avoided and if the tone arm 52 is lowered to the turntable without a record being positioned thereon the turntable remains stationary. This embodiment is shown in FIGS. 41 and 42, wherein the clutch wheel arrangement shown in the embodiment described in detail in connection with FIGS. 1 to 24, inclusive, is replaced by a pawl and ratchet arrangement, the other portions of the record changer being identical so that corresponding reference numerals have been employed in connection therewith. More particularly, in the embodiments shown in FIGS. 41 and 42, the turntable 51 is provided with an opening 575 therein, at a point spaced from the center of the turntable, which is adapted to receive the end portion of a depressible pin 576 which is secured to the end of a flexible arm 577 mounted on the underside of the turntable 51. The end of the flexible arm 577 adjacent the pin 576 is proivded with a pair of downwardly extending ear portions 578 and 579 and a pawl 580 is pivotally mounted on a transverse pin 581 extending between the ear portions 578 and 579. An annular flat plate 582, which is provided with ratchet teeth 583 on the upper surface thereof, is mounted on the inner ends of the spokes of the drive wheel 90 in such position as to be engaged by the pawl 580 when the pin 576 is depressed by a record on the turntable 51.

When no records are positioned on the turntable 51 the flexible arm 577 lies flat against the under surface of the turntable 51 and the pin 576 occupies the position shown in full lines in FIG. 41 so that the tip end 584 of the pawl 580 is positioned above the ratchet teeth 583 so as not to be engaged thereby. In this connection it will be understood that the pawl 580 is so constructed that its own weight tilts the tip portion 584 thereof downwardly so that the rear arm 585 thereof strikes the under surface of the flexible arm 577. Accordingly, when no records are positioned on the turntable 51 this turntable is completely disengaged from the drive wheel 90 so that if the tone arm 52 is accidentally released to the turntable under these conditions the turntable does not rotate and needle damage is avoided. However, as soon as the first record is positioned on the turntable 51, the pin 576 is depressed by the weight thereof so that the tip portion 584 of the pawl 580 is moved downwardly into engagement with the ratchet teeth 583 on the plate 582. When the drive wheel 90 is rotated in a clockwise direction as viewed in FIG. 42 the pawl 580 is engaged by the teeth 583 with the result that the turntable 51 is driven in the same direction at the speed of the drive wheel 90.

When the drive wheel 90 is slowed down to 16⅔ r.p.m. during record changing cycles, as described in detail heretofore in connection with the embodiment shown in FIGS. 1 to 24, inclusive, the movement of the drive wheel 90 with respect to the turntable 51 is counterclockwise during which time the end portion 584 of the pawl 580 merely rides over the ratchet teeth 583 so that the turntable 51 coasts. However, as soon as the drive wheel 90 is brought up to the desired playing speed at the start of the next playing cycle the ratchet teeth 583 again engage the pawl 580 so as to drive the turntable 51 at the desired playing speed. It will be noted that in addition to providing the above described turntable release feature whereby damage to the needle is avoided, the embodiment shown in FIGS. 41 and 42 also provides an arrangement wherein the turntable 51 will not overcoast when changing from 78 r.p.m. records to 33⅓ r.p.m. records since the turntable 51 is disengaged from the drive wheel 90 until the first record is released thereon. Thus, considering the situation where a group of 78 r.p.m. records have been played so that the idler wheel 101 is positioned in engagement with the 78 r.p.m. step 153 on the multistep turret 96, if it is desired to play 33⅓ r.p.m. records the 78 r.p.m. records are normally removed from the turntable, the selected group of 33⅓ r.p.m. records are positioned on the spindle 56 and the needle selecting arm 69 is adjusted to the 33⅓ r.p.m. needle position. When the operator wishes to start playing the 33⅓ r.p.m. records he merely depresses the operate button 67. During the first part of the first record changing cycle the idler wheel 101 is held in engagement with the 78 r.p.m. step 153 so that the drive wheel 90 is driven at a speed of 78 r.p.m. for a fraction of a second. In the embodiment shown in FIGS. 1 to 24, inclusive, the clutch wheel 130 would attempt to drive the turntable 51 at 78 r.p.m. for this brief period and since the turntable is unloaded considerable rotational inertia may be imparted to the turntable 51 if the clutch wheel 130 does not provide sufficient slip, with the result that the turntable 51 overcoasts and is not slowed down to the desired playing speed of 33⅓ r.p.m. by the beginning of the next playing cycle. However, in the embodiment shown in FIGS. 41 and 42 the turntable 51 is completely disengaged from the drive wheel 90 until the first record is released to the turntable and by the time the first record is released onto the turntable the drive wheel 90 is driven at a speed of 16⅔ r.p.m. and hence cannot speed up the turntable so that no problem of overcoasting of the turntable is encountered. In this connection it will be understood that the 78 r.p.m. records may be left on the turntable 51 and 33⅓ r.p.m. records released on top of the 78 r.p.m. group after the needle selecting arm 69 has been changed. However, under these conditions the mass of the turntable 51 is substantially increased so that the drive wheel 90 cannot impart any substantial amount of rotational inertia to the turntable 51 during the small fraction of a second in which the idler 101 is held in engagement with the step 153 during the initial part of the first record changing cycle. It will, of course, be understood that during succeeding 33⅓ r.p.m. record changing cycles the drive wheel 90 will not be driven at 78 r.p.m. during any portion of the playing or record changing cycles so that overcoasting of the turntable does not occur.

78 r.p.m. microgroove record arrangement

While virtually all of the 78 r.p.m. records now on the market are of the so-called standard groove size requiring a three mil needle, there is some indication in the field that 78 r.p.m. microgroove records will have considerable attention in the future for high fidelity applications, these records having a groove size similar to the present day 33⅓ r.p.m. and 45 r.p.m. records, i.e., a groove size requiring a one mil needle. In the event that 78 r.p.m. microgroove records become popular, the embodiment shown in FIGS. 43 and 44 may be employed to play this new type of record without in any way detracting from the automatic speed changing features described in detail above in connection with the use of present day 33⅓ r.p.m., 45 r.p.m. and 78 r.p.m. records. The embodiment shown in FIGS. 43 and 44 is substantially identical to the embodiment shown and described in detail above in connection with FIGS. 1 to 24, inclusive, with the exception that the width of the changer is increased slightly and with the addition of specific elements described hereinafter for playing 78 r.p.m. microgroove records and corresponding elements of the two embodiments have been given the same reference numerals.

Referring now to the embodiment shown in FIGS. 43 and 44, in order to play 78 r.p.m. microgroove records, there is provided means for automatically positioning the speed control slide 400 in the 78 r.p.m. speed position independently of the mechanism normally employed to position the speed control slide 400. More particularly, a control lever 590 is pivotally mounted on the base plate 50 by means of the pivot pin 591 and is provided with an offset end portion 592 which is adapted to extend into the path of an upstanding flange 593 on the supporting flange 401 of the speed control slide 400. A spring 594 is connected between the pin 595 on the base plate 50 and the end portion 592 and the lever 590 is provided with a downwardly extending projection 596 which is adapted to be positioned in the opening 597 in the base plate 50 when the lever 590 is in the automatic position so as to act as a detent and hold the lever 590 in this position against the force of the spring 594. When the lever 590 is held in the automatic position shown in full lines in FIG. 43 by means of the detent 596, the end portion 592 of the lever 590 is held out of engagement with the flange 593 on the speed control slide 400 so that the lever 590 does not affect movement of the speed control slide 400 and the speed of the turntable 51 may be automatically adjusted by movement of the speed control 400 in the manner described in detail heretofore.

When it is desired to play 78 r.p.m. microgroove records the needle selecting arm 69 is adjusted to the microgroove needle position, i.e., the 33⅓ and 45 r.p.m. needle selecting position and the lever 590 is moved toward the 78 r.p.m. microgroove position shown in dotted lines at 598 in FIG. 43, by means of the handle 599 which is positioned on the end portion 600 of the lever 590 and extends through a suitable slot 601 in the upper cover plate 64. As soon as the detent 596 is moved out of engagement with the opening 597, the spring 594 functions to urge the end portion 592 of the lever 590 against the flange 593.

During the next record changing cycle, the slide 400 is moved forwardly by engagement of the flange 410 on the cycling slide 161 with the edge 411 on the speed control slide 400, the lever 590 being also carried forward thereby against the force of the spring 594. During the last half of this record changing cycle the spring 594 urges the end portion 592 rearwardly against the flange 593 and moves the speed control slide rearwardly to the 78 r.p.m. position shown in dotted lines at 602 in FIG. 43, in which position movement of the speed control slide 400 is limited by engagement of the screws 403 and 404 with the ends of the slots 405 and 406. When the speed control slide 400 is thus moved rearwardly to the position shown in dotted lines at 602 in FIG. 43 the bellcrank 104 is permitted to drop downwardly to the 78 r.p.m. position, in the manner described in detail above in connection with the embodiment shown in FIGS. 1 to 24, inclusive, so that the turntable 51 is driven at a speed of 78 r.p.m. even though the needle selecting arm 69 is in the microgroove needle position. In this connection it will be understood that when the needle selecting arm 69 is in the 33⅓ and 45 r.p.m. needle selecting position, the control rod 70 is not struck during the record changing cycle so that the control rod 421 does not function to adjust the position of the speed control slide 400. However, when the lever 590 is in the 78 r.p.m. microgroove position, the speed control slide 400 is adjusted in the manner described above during each record changing cycle to the 78 r.p.m. position so that the speed of the turntable 51 is automatically adjusted to 78 r.p.m. and independently of the position of the needle selecting arm 69. In this connection it will be understood that the handle 599 may be detached from the end portion 600 so that the lever 590 is not accessible if only automatic speed changing operation is desired.

In the event that a separate lever control is not desired for 78 r.p.m. microgroove records, means may be provided for striking the 78 r.p.m. speed indexing rod 70 even though a microgroove needle is in playing position. For example, an arrangement such as shown in FIG. 45 may be employed wherein the hub 65 of the transducer which projects forwardly from the end portion 68 of the tone arm 52 is provided with a fan shaped extension 606 which is adapted to strike the control rod 70 in both a 78 r.p.m. microgroove needle position and in a 78 r.p.m. standard groove needle position. More particularly, a three-position three-needle cartridge is employed, and when the fan portion 606 is positioned as shown in full lines in FIG. 45 a microgroove, i.e., one mil, needle is in playing position. Accordingly, during successive record changing cycles, the end portion 607 of the fan 606 strikes the 78 r.p.m. speed indexing rod 70 so that the speed of the turntable 51 is automatically adjusted to 78 r.p.m. in the manner described in detail heretofore. If 78 r.p.m. standard groove records are to be played the fan portion 606 is rotated to the position shown in dotted lines at 608 in FIG. 45, which is approximately ninety degrees displaced from the 78 r.p.m. microgroove position, and in the 78 r.p.m. standard needle position a three mil needle is positioned to engage the record. Accordingly, when the fan 606 is in the position 608, the end portion 609 of the fan 606 strikes the rod 70 and causes the turntable to rotate at 78 r.p.m. for standard groove records. When the fan portion 606 is rotated further counterclockwise to the position shown in dotted lines at 610 in FIG. 45, which position is approximately ninety degrees displaced from the position 608, another microgroove needle is positioned to engage the record, and when the fan 606 is in the position 610 the speed indexing rod 70 is not struck so that automatic speed change between 33⅓ r.p.m. and 45 r.p.m. is provided in the manner described in detail above.

In the event that it is desired to use a conventional two-needle cartridge wherein the two needle selecting positions are displaced one hundred eighty degrees, an arrangement such as shown in FIG. 46 may be employed wherein a semi-circular control member 615 is rotatably mounted on the hub portion 616 of the transducer and is provided with a substantially triangular recess 617 which is adapted to receive the needle selecting arm 618 of the transducer. When the needle selecting arm 618 is in the 33⅓ and 45 r.p.m. position shown in FIG. 46 the cartridge is designed to position a one mil needle in playing position and no portion of the control member 615 strikes the speed control rod 70. However, when the control member 615 is rotated ninety degrees to the position shown in dotted lines at 619 in FIG. 46 the end portion 620 of the control member 615 strikes the control rod 70 even though the needle selecting arm 618 has not been moved. Accordingly, the speed of the turntable 51 is adjusted to 78 r.p.m. with a microgroove needle in playing position when the control member 615 is adjusted to the position shown in dotted lines at 619 in FIG. 46. If it is desired to play 78 r.p.m. standard groove records, the control member 615 is rotated further clockwise so that it moves the needle selecting arm 619 to a position one hundred and eighty degrees displaced from its position shown in FIG. 46 in which position the control member 615 engages the rod 70 in all positions of the needle selecting arm 618 within the recess 617. When the needle selecting arm is thus positioned, a standard three mil needle is moved to the playing position so that standard 78 r.p.m. records may be played. In the alternative, a standard two-position cartridge such as shown in FIG. 4 may be employed and a movable flap portion may be positioned on the end of the speed control arm 70 which may be adjusted so as to be struck by the hub portion 77 of the cartridge when in a 78 r.p.m. microgroove position and may be moved to a 78 r.p.m. standard groove position in which only the end 85 of the needle selecting arm 69 strikes the rod 70. In this connection it will be understood that the control lever 590 shown in the embodiment of FIGS. 43 and 44 is not required in the event that the alternative arrangements discussed in connection with FIGS. 45 and 46 are employed since in these latter embodiments the speed control rod 70 is employed to make the 78 r.p.m. speed change at all times.

Manual play arrangement

In the event that a manual play type of operation is desired wherein the operator may replay the same record several times without initiating a record changing cycle or play only selected portions of a record by manually moving the tone arm on the record, the embodiment shown in FIGS. 37 to 40, inclusive, may be employed. The embodiment shown in FIGS. 37 to 40, inclusive, is substantially identical to the embodiment shown and described in detail above in connection with FIGS. 1 to 24, inclusive, with the addition of means for restraining the trip arm 183 from sidewise movement so that the velocity tripping portion of the automatic tripping mechanism is disabled. However, in this embodiment of the invention a record changing cycle may still be initiated by pressing the operate button 67 so that the operator may play each record as many times as desired and then select the next record by merely depressing the operate button 67, the speed of the turntable 51 being automatically adjusted in accordance with the size and speed of the released record in the manner described in detail above.

Referring now to FIGS. 37 to 40, inclusive, there is provided a control rod 625 which is pivotally supported at one end in the bracket 626 which is secured to the base plate 50 and a handle 627 which is secured to one end of the control rod 625 projects upwardly through a slot 628 in the top cover plate 64. The free end of the rod 625 rests on the cycling slide 161 beneath the trip arm 183 and is provided with an offset end portion 630 which rests flat on the cycling slide 161 when the handle 627 is in the automatic position shown in full lines in FIG. 37. When the handle 627 is in the automatic position the control rod 625 has no effect upon movement of the trip arm 183 and the velocity trip action described above in connection with FIGS. 1 to 24, inclusive, is provided.

When it is desired to change to manual operation, the handle 627 is moved to the position shown in dotted lines at 631 in FIG. 37 so that the rod 625 is rotated approximately ninety degrees and the end portion 630 is moved to a substantially vertical position as shown in dotted in lines FIGS. 37 and 38, in which position the offset portion 632 of the rod 625 is positioned adjacent the edge of the trip arm 183 and prevents the trip arm 183 from being moved beyond the edge of the flange 180 on the cam riser 168, as is best illustrated in FIG. 40. Accordingly, when the handle 627 is in the position 631 the trip arm 183 is prevented from moving off the flange 180 so that as the run-out groove of the record is encountered and the tone arm 52 moves rapidly toward the center of the record the trip arm 183 is restrained from sideward movement so that it remains positioned on top of the flange 180 and holds the cam riser 168 horizontal so that a record changing cycle is not initiated. In this connection it will be understood that the above described action of the control rod 625 is independent of the delay trip action provided by the wire 295 so that the tone arm 52 may be moved back and forth rapidly by the operator during manual playing without actuating the automatic tripping mechanism.

In the event that the handle 627 is thrown to the manual position 631 at a time when the trip arm 183 has been moved off the flange 180 to the position shown in FIG. 39, the end portion 630 of the control rod 625 engages the underside of the trip arm 183 and lifts it upwardly. When the tone arm 52 is moved outwardly during the next portion of the record changing cycle, the trip arm 183 is moved back over the edge of the flange 180 beyond the offset portion 632 of the control rod 625 and drops down onto the flange 180 so that the cam riser 168 is moved to a horizontal position in which automatic velocity tripping is prevented. During the next playing cycle the trip arm 183 is prevented from moving off the flange 180 by the offset portion 632 so that manual playing is provided.

In the event the operator wishes to release another record to the turntable 51 while the machine is in the manual play position, he merely depresses the operate button 67 and the end portion 316 of the reject control wire 315 engages the underside of the trip arm 183 and moves it upwardly out of engagement with the flange 180 on the cam riser 168 so that a record changing cycle is initiated in the manner described in detail above in connection with the embodiment shown in FIGS. 1 to 24, inclusive. Preferably the offset portion 632 is of sufficient height that the trip arm 183 is prevented from moving sidewardly during the above described reject operation so that the trip arm 183 is held in a position to engage the flange 180 as the record changing cycle is completed. However, it will be understood that the end portion 630 of the control rod 625 is of sufficient length to support the trip arm 183 in its extreme sideward position so that the trip arm 183 is at all times prevented from moving beneath the end portion 630 so that jamming of the tripping mechanism is prevented. In this connection it will be understood that the lug 287 on the cycling slide 161 prevents excessive sideward movement of the trip arm 183. It will also be noted that since the trip arm 183 is normally restrained from sideward movement by the offset portion 632, when the machine is changed from manual play to automatic operation by movement of the handle 627, the trip 183 is always positioned correctly to engage the flange 180 and hold the cam riser 168 in a horizontal position.

Alternative automatic speed changing mechanism

In the embodiment shown in FIGS. 33 to 36, inclusive, a turntable drive mechanism is provided wherein individual turrets are employed for the three different playing speeds instead of the multi-step turret 96 provided in the embodiment shown in FIGS. 1 to 24, inclusive, so that the idler wheel is not moved vertically for automatic speed changing but instead is moved sidewise into engagement with the desired speed turret by means of an automatic speed changing mechanism. In the embodiment shown in FIGS. 33 to 36, inclusive, the speed of the turntable 51 is reduced to 33⅓ r.p.m., i.e., the lowest playing speed, during the record changing cycle. However, it will be understood that an additional 16⅔ r.p.m. turret may be provided to further reduce the speed of the turntable during the record changing cycle if it is desired to increase the duration of the record changing cycle.

Considering first the details of the turntable drive mechanism, in the alternative embodiment shown in FIGS. 33 to 36, inclusive, it is first pointed out that many of the details of the embodiment shown in FIGS. 33 to 36, inclusive, are identical to those described in detail above in connection with the embodiment shown in FIGS. 1 to 24, inclusive, and corresponding elements therein have been given the same reference numerals. In the embodiment shown in FIGS. 32 to 36, inclusive, the base plate 50a is provided with an irregular shaped opening 640 for the turntable drive mechanism and a motor 641 is mounted on a base plate 642 which is secured to the underside of the base plate 50a by means of the screws 643. The drive shaft 644 of the motor 641 extends through the mounting plate 642 and through a turret carriage plate 645 which is rotatably mounted on the mounting plate 642 concentrically with the shaft 644. An idler wheel 646 is mounted on the end of a slide plate 647 having a pair of arms 648 and 649 which are slidably mounted in the grooved edges of a swivelable block 650 which is rotatably mounted on the post 651 secured to the mounting plate 642. A sleeve bearing 655 for the 33⅓ r.p.m. turret 656 is mounted on one corner of the carriage plate 645 and the turret 656 is driven from the motor drive shaft 644 by means of the belt 657. The 45 r.p.m. turret 658 is also rotatably mounted on the carriage plate 645 and is driven from the motor drive shaft 644 by means of the belt 659. A spring 660 is connected from a lug 661 on the mounting plate 642 to the end of the slide plate 647 so that the idler wheel 646 is biased into engagement with the rim 120 of the drive wheel 90 and into engagement with either the 33⅓ r.p.m. turret 656, the 45 r.p.m. turret 658, or the motor drive shaft 644, in which latter case the turntable is driven at a speed of 78 r.p.m.

The cariage plate 645 is provided with an offset arm portion 665 which is positioned beneath a notched speed indexing bar 666 (FIG. 35) which is pivotally supported on the base plate 50a at one end thereof by the bracket 667, the tip end portion of the indexing bar 666 resting on the stepped end flange 668 of a speed control lever 669 which lever is pivotally mounted on the base plate 50a by means of the pivot pin 670. The lever 669 is also provided with an upturned flange portion 671 which is provided with an aperture at the upper end thereof adapted to receive and support one end of a lost motion control link 672, the other end of which is secured to the tone arm return lever 257. The speed control lever 669 is also provided with an upstanding flange 673 which is provided with an inclined upper edge 674. The cycling slide 161a of the embodiment shown in FIGS. 32 to 36, inclusive, is provided with an offset arm 675 (FIG. 34) which is adapted to engage the edge of the upstanding flange 673 on the lever 669 and the cycling slide 161a is provided with a side extension portion 676 the outer edge of which is adapted to engage the sleeve bearing 655 during the record changing cycle in a manner to be described in more detail hereinafter. In other respects the cycling slide 161a is substantially identical to the cycling slide 161 shown and described in detail in connection with the embodiment of FIGS. 1 to 24, inclusive.

Considering now the operation of the above described turntable drive mechanism and automatic speed changing mechanism in the embodiment shown in FIGS. 32 to 36, inclusive, it will be evident that the position of the carriage plate 645 determines the speed of the idler wheel 646 and hence the speed of the turntable 51 and the arm 665 of the carriage plate 645 can be moved from the 33⅓ r.p.m. position shown in full lines in FIG. 34 to the 45 r.p.m. position shown in dotted lines 680 in FIG. 34, a spring 681 which is connected between the arm 665 and a lug 682 on the base plate 50a normally urging the arm 665 toward the 45 r.p.m. position. When a record changing cycle is initiated in the manner described above by permitting the cam riser 168 to tilt upwardly into the path of the connecting pin 160, the cycling slide 161a is moved forwardly during the first half of the record changing cycle. As the cycling slide 161 moves forwardly, the edge portion 683 thereof strikes the bearing sleeve 655 which is secured to the carriage plate 645 and pivots the carriage plate 645 to the position shown in full lines in FIG. 34 in which position the 33⅓ r.p.m. turret 656 is positioned in engagement with the idler wheel 646 so that the turntable speed is reduced to 33⅓ r.p.m. for the remainder of the record changing cycle. It will be noted that the edge of the extension portion 676 holds the carriage plate 645 in the 33⅓ r.p.m. position as the cycling slide 161a moves forwardly and then returns to substantially its rest position.

In order to reset the speed control bar 666 to the 33⅓ r.p.m. position during each record changing cycle the arm 675 on the cycling slide 161a strikes the edge of the upstanding flange 673 on the lever 669 and moves this lever to the position shown in full lines in FIG. 34 in which position the tip of the speed control bar 666 rests on the 33⅓ r.p.m. step 685 on the end flange 668. When the speed control bar 666 is thus positioned on the 33⅓ r.p.m. step 685, the arm 665 of the carriage plate 645 engages the notch 686 on the speed control bar 666 so that if the lever 669 remains in the 33⅓ r.p.m. position shown in full lines in FIG. 34 the carriage plate 645 is held in the 33⅓ r.p.m. position against the force of the spring 681. Since ten inch and twelve inch records are to be played at 33⅓ r.p.m. the lever 669 should remain in the 33⅓ r.p.m. position for the next playing cycle if a ten inch or twelve inch record is released to the turntable. Accordingly, the control wire 672 is of sufficient length that the T-shaped head portion 687 thereof does not engage the flange 671 when the tone arm return lever 257 is moved to either the twelve inch or ten inch tone arm indexing positions. However, when a seven inch record is positioned on the turntable, the tone arm return lever 257 is moved to the seven inch tone arm indexing position indicated in dotted lines at 688 in FIG. 34 and as the tone arm lever 257 moves to the position 688 the head portion 687 engages the flange 671 and moves the speed control lever 669 to the position shown in dotted lines at 689 in FIG. 34 in which position the tip of the speed control bar 666 is positioned on the 45 r.p.m. step 690 of the end flange 668. When the control bar 666 is positioned on the step 690 the arm 665 of the carriage plate 645 is free to move rearwardly under the force of the spring 681 until it strikes the notch 691 on the speed control bar 666 and when the arm 665 is in engagement with the notch 691 it occupies the position 680 shown in dotted lines in FIG. 34 in which position the 45 r.p.m. turret 658 is positioned in engagement with the idler wheel 646 so that the turntable 51 is rotated at 45 r.p.m. during the next playing cycle. In this connection it will be understood that movement of the arm 665 from the 33⅓ r.p.m. position position to the 45 r.p.m. position is substantially instantaneous so that the idler wheel 646 contacts the 78 r.p.m. drive shaft 644 only momentarily. It will also be noted that the tone arm return lever 257 is moved forwardly by the flange 256 on the cycling slide 161a before the arm 675 on the cycling slide 161a strikes the flange 673 of the lever 669 so that the control wire 672 does not prevent movement of the lever 669 to the 33⅓ r.p.m. position during the next record changing cycle.

In order to adjust the speed of the turntable to 78 r.p.m. when the needle selecting arm 69 is positioned in the 78 r.p.m. needle selecting position, the 78 r.p.m. speed indexing mechanism described in detail above in connection with FIGS. 1 to 24, inclusive, is employed and the intermediate portion of the control rod 421 is adapted to engage the edge 695 of the flange 673 when the 78 r.p.m. speed indexing rod 70 is struck. More particularly, when the rod 70 is struck by the end 85 of the needle selecting arm 69 the control rod 421 is moved forwardly so that the intermediate portion thereof moves up the inclined edge 674 of the flange 673 and drops down in front of the edge 695 of the flange 673. As the tone arm moves inwardly from its extreme outward position, the rod 421 is moved away from the spindle 56 by the force of the spring 318 (FIG. 4) so that the speed control lever 669 is pivoted until it strikes the stop 696 on the base plate 50a in which position the tip of the speed control bar 666 is positioned on the 78 r.p.m. step 697 of the end flange 668. In this connection, it will be understood that the steps 685, 690 and 697 on the end flange 668 are provided with rounded corners so that the tip of the speed control bar 666 can slide easily back and forth over these steps as the speed control lever 669 is pivoted, as is best illustrated in FIG. 36.

When the control bar 666 is position on the step 697 the arm 665 of the carriage plate 645 is moved rearwardly by the spring 681 until it strikes the notch 698 on the speed control bar 666, in which position the carriage plate 645 is positioned so that the drive shaft 644 engages the idler wheel 646 and drives the turntable at a speed of 78 r.p.m. When the speed control slide 161a returns to its rest position, the tip of the control rod 421 is cammed upwardly by the inclined portion 431 of the flange 430 on the cycling slide 161a so that the intermediate portion of the rod 421 is lifted upwardly above the edge 695 of the flange 673 and springs back to its rest position shown in FIG. 34. In this connection it will be understood that the carriage plate 645 is held in the 33⅓ r.p.m. position during substantially the entire record changing cycle and it is only after the edge 683 of the slide 161a has moved out of engagement with the bearing sleeve 655 that the arm 665 is moved into engagement with the selected notch on the speed control bar 666, so that each record changing cycle is performed substantially entirely at 33⅓ r.p.m.

In the embodiment shown in FIGS. 33 to 36, inclusive, the drive wheel 90, the tone arm mounting arrangement, the tone arm indexing arrangement, the last record rest positioning mechanism and the automatic tripping mechanism all function in a manner substantially identical to that described above in connection with the embodiment of FIGS. 1 to 24, inclusive. However, in the embodiment of FIGS. 33 to 36, inclusive, the motor 641 is not automatically turned off at the end of the last record changing cycle, a simple on-off switch 700 being shown, for simplicity, as controlling energization of the motor 641. However, it will be understood that a simple pressure operated switch may be readily associated with the rest 65 so that when the tone arm 52 is positioned on the rest 65 at the end of the last record changing cycle the switch is opened and the motor 641 is turned off. Furthermore, a simple linkage associated with the rod 311 may be provided so that when the operate button 67 is depressed the switch associated with the rest 65 is again closed so that a record changing cycle may be again initiated. It will also be understood that the changer of FIGS. 33 to 36, inclusive, may be further simplified by eliminating the drive wheel 90 so that the idler wheel 646 drives the rim of the turntable directly, it being understood that the turntable is then provided with a suitable connecting pin 160 for driving the cycling slide 161a and controlling the automatic tripping mechanism. While the speed of the turntable 51 is reduced only to 33⅓ r.p.m. during the record changing cycle in the embodiment shown in FIGS. 33 to 36, inclusive, it will be understood that a 16⅔ r.p.m. turret may be mounted on the carriage plate 645 and driven from the shaft 644 by a suitable belt, the 16⅔ r.p.m. turret being cammed into engagement with the idler 646 by movement of the cycling slide 161a so that the change is made at 16⅔ r.p.m. It will also be understood that the alternative speed changing mechanism shown in FIGS. 33 to 36, inclusive, may be employed in conjunction with the embodiments shown in FIGS. 25 to 32, inclusive, and FIGS. 37 to 46, inclusive, by providing suitable means for controlling the speed control lever 669 in the same manner as the speed control slide 400 is controlled therein, as will be readily apparent to those skilled in the art.

While there have been described what are at present considered to be the preferred embodiments of the invention, it will be understood that various modifications may be made therein which are within the true spirit and scope of the invention.

What is claimed is:

1. In a record changer, a rotatable turntable for supporting a record to be played, means for rotating said turntable, a tone arm having a pickup mechanism adapted to be connected to reproduction apparatus, said tone arm being moved outwardly beyond said turntable during a record changing cycle, said pickup mechanism having first and second stylii of different sizes and being adjustable to a first position in which said first stylus is adapted to engage a record positioned on said turntable and having a first playing speed and is adjustable to a second position in which said second stylus is adapted to engage a record positioned on said turntable and having a different playing speed, and automatic speed control means controlled in part by movement of said tone arm during a record changing cycle for controlling the speed of said turntable rotating means in accordance with the position to which said pickup mechanism is adjusted so that said turntable is automatically rotated at the correct playing speeds for said first and second stylii.

2. In a record changer, a rotatable turntable, a driving member driven at constant speed, a variable speed driven member, one of said members being provided with a plurality of steps of different diameter along the longitudinal axis thereof, said driven member engaging said turntable to rotate the same, a tone arm provided with a stylus adapted to engage a record positioned on said turntable, automatic record changing means for depositing records on said turntable during successive record changing cycles and positioning said tone arm on the deposited record, said record changing means including a cycling member which is movable over a given path during the record changing cycle, and automatic speed control means jointly responsive to movement of said tone arm outwardly beyond the path of records deposited on said turntable and movement of said cycling member during the record changing cycle for moving one of said driving and driven members relative to the other in the direction of said longitudinal axis to render a particular one of said steps effective to rotate said turntable at the playing speed of the record deposited on said turntable.

3. In a record changer, a rotatable turntable for supporting records to be played, a tone arm including a pickup mechanism adapted to be connected to reproduction apparatus, a control member on said tone arm operable to either one of two positions, automatic record changing means for depositing records on said turntable during successive record changing cycles and positioning said tone arm on the deposited record, and automatic speed control means controlled by the position of said control member and movement of said tone arm during the record changing cycle for rotating said turntable at a first playing speed when said control member is in one of said positions and for rotating said turntable at a different playing speed when said control member is in the other of said positions.

4. In a record changer, a rotatable turntable for supporting records to be played, a tone arm including a pickup mechanism adapted to be connected to reproduction apparatus, a first control member on said tone arm operable to either one of two positions, automatic record changing means for depositing records on said turntable during successive record changing cycles and positioning said tone arm on the deposited record, a second control member mounted beyond the edge of said turntable and movable from a first position to a second position, said second control member being positioned to be engaged by said first control member and moved from said first to said second position as said tone arm is moved during the record changing cycle and then only when said first control member is in one of said two positions, and means responsive to movement of said second control member to said second position for rotating said turntable at a first playing speed when said control member is in one of said positions and for rotating said turntable at a different playing speed when said control member is in the other of said positions.

References Cited

UNITED STATES PATENTS

| | | | |
|---|---|---|---|
| 2,526,188 | 10/1950 | Andres | 274—9.1 |
| 2,689,734 | 9/1954 | Wennerbo et al. | 274—9.1 |
| 2,718,399 | 9/1955 | Martin et al. | 274—9.1 |
| 2,818,263 | 12/1957 | Dale | 274—10 |
| 2,997,303 | 8/1961 | Mueller | 274—9 X |

FOREIGN PATENTS 698,865  10/1953  Great Britain.

HARRY N. HAROIAN, Primary Examiner

U.S. Cl. X.R.

274—9